United States Patent [19]

Suzuki et al.

[11] Patent Number: 4,998,213

[45] Date of Patent: Mar. 5, 1991

[54] RECORDING APPARATUS

[75] Inventors: Takanobu Suzuki; Tsutomu Furusawa, both of Kanagawa, Japan

[73] Assignee: Fuji Xerox Co., Ltd., Tokyo, Japan

[21] Appl. No.: 206,850

[22] Filed: Jun. 15, 1988

[30] Foreign Application Priority Data

| | | | |
|---|---|---|---|
| Jun. 15, 1987 | [JP] | Japan | 62-147159 |
| Jun. 15, 1987 | [JP] | Japan | 62-147160 |
| Jun. 15, 1987 | [JP] | Japan | 62-147161 |
| Sep. 2, 1987 | [JP] | Japan | 217898 |

[51] Int. Cl.[5] .......... G01K 1/00

[52] U.S. Cl. .......... 364/519; 364/900

[58] Field of Search .......... 364/518–523, 364/235, 930; 400/4, 61, 62

[56] References Cited

U.S. PATENT DOCUMENTS

| | | | |
|---|---|---|---|
| 4,792,910 | 12/1988 | Lange | 364/519 |

FOREIGN PATENT DOCUMENTS

| | | | |
|---|---|---|---|
| 50-62644 | 5/1975 | Japan | 364/519 |
| 57-77140 | 5/1982 | Japan | 364/519 |
| 59-78371 | 5/1984 | Japan | 364/519 |
| 61-130320 | 6/1986 | Japan | 364/519 |
| 61-152591 | 7/1986 | Japan | 364/519 |
| 62-023393 | 1/1987 | Japan | 364/519 |
| 62-097440 | 5/1987 | Japan | 364/519 |
| 62-116918 | 5/1987 | Japan | 364/519 |
| 62-179792 | 8/1987 | Japan | 364/519 |
| 62-194634 | 8/1987 | Japan | 364/519 |

*Primary Examiner*—Arthur G. Evans

*Attorney, Agent, or Firm*—Finnegan, Henderson, Farabow, Garrett, and Dunner

[57] ABSTRACT

A recording apparatus for recording image data, the recording apparatus permitting an user to readily select and alter recording functions and add various other functions using portable storage means such as an IC card and reading means for reading control data from the storage means.

18 Claims, 40 Drawing Sheets

RECORDING APPARATUS

BACKGROUND OF THE INVENTION

The present invention relates to recording apparatus such as copying machines, facsimiles, printers, etc. for recording image data and more particularly to a recording apparatus which permits its user to readily select or alter recording functions or add various other functions.

Copying machines with highly sophisticated functions has been recently energetically developed. Taking copying magnification as a functional example, copying machines which allow users to select one of several copying magnifications, in addition to those copying machines which carry out only equimagnification copying operation, have been put on the market. Moreover, there have appeared those copying machines wherein the copying magnification can consecutively be changed. As for development, copying machines usable for multicolor recording or recording with selected colors, using more than one kind of toner, as well as those used to reproduce monochromatic pictures using only one kind of toner are already in use. With respect to the method of handling originals, there are some copying machines equipped with mechanisms for automatically replacing originals and others designed to successively copy double-spread two pages of each bookbinding original one page after the other without moving the original.

The advantage of copying machines having highly sophisticated functions is that they are generally more serviceable than those without having such functions and therefore offer a wide range of applications. However, a copying machine capable of performing a multifunction tends to complicate its operation and consequently necessities a larger console panel on which operating keys are disposed. As a result, users to whom those additional functions are not essential will have to use relatively expensive machines and products which often induce them to misoperation. Accordingly, potential customers are classified into groups and copying machines are being developed in such a manner as to realize functions most suitable for each group. Notwithstanding, attempts at supplying a market with a plurality of models intended for such groups make each model less competitive in price because the number of products for manufacture invariably decreases as long as they are designed for special use. In a case where the requirements for functions of a machine change at the side of the user, on the other hand, the user will have to replace the copying machine and thus ultimately be unable to put it to economical use.

Although a description has been given of copying machines by way of example, facsimiles, printers, etc. have also posed similar problems.

An object of the present invention is therefore to provide a recording apparatus which permits the addition or alteration of recording functions as its user desires.

SUMMARY OF THE INVENTION

In a first embodiment of the present invention, a recording apparatus comprises reading means for reading portable storage media such as IC cards; an additional control data storage unit for storing the additional recording-apparatus control data read by the reading means; a basic control data storage unit for storing basic recording-apparatus control data; and a recording apparatus control unit for controlling the recording apparatus by reading the control data stored in the basic control data storage unit and the additional control data storage unit both and, when the basic control data and the additional control data overlap, further by giving priority for use to the additional control data over the basic control data in the overlapping part.

In a second embodiment of the present invention, a recording apparatus comprises a memory for storing recording function data representing various functions potentially performable by a recording apparatus; card reading means for reading cards such as IC and magnetic cards; comparator means for comparing the recording data read by the card reading means with the recording function data stored in the memory; and function-performance control means for setting up the functions proved by the comparator means to be consistent with the recording function data as those performable by the recording apparatus.

In a third embodiment of the present invention, a recording apparatus comprises reading means for reading function data for use in controlling various functions of the recording apparatus from storage media such as set IC cards; function data conversion means for converting function data to what can be implemented for its own; and recording means for recording image data derived from the function data thus converted by the function data conversion means.

In a fourth embodiment of the present invention, a recording apparatus comprises a recording apparatus body 12C to which various additional devices 11-1~11-N can be fitted; storage means 13C for storing programs for controlling the additional devices 11-1~11-N; additional device identifying means 4C for identifying the kinds of operational additional devices (e.g., 11-1, 11-2) fitted to the recording apparatus body 12C; program selecting means 15C for setting effective the programs for the additional devices 11-1, 11-2 identified by the additional device identifying means as the operational ones fitted to the recording apparatus body 12C; and a control unit 16C for controlling the recording apparatus using the programs selected by the program selecting means 15C and a program for controlling the recording apparatus body.

BRIEF DESCRIPTION OF THE DRAWINGS

FIG. 2 is a system configuration of a copying machine;

FIG. 3 is an external view illustrating an example of the system configuration of the copying machine above;

FIG. 4 is a schematic block diagram of the copying machine above;

FIG. 5 is a top view of a console panel of the copying machine above;

FIG. 6 is a circuit diagram outlining a circuit configuration of the copying machine above;

FIG. 7 is a developed block diagram of FIG. 6, centering around a main CPU;

FIG. 8 is a block diagram illustrating the details of a circuit configuration around a photosensitizer drum of the copying machine above;

FIG. 9 is a timing chart illustrating the operations of a main motor and a developing solenoid when first development is made by a sub-developing device and when second development is made by a main developing device;

FIG. 10 is a timing chart illustrating the operations of the main motor and the developing solenoid when first development is made by the main developing device and when second development is made by the sub-developing device;

FIG. 11 is a block diagram illustrating the details of an exposure system and the periphery of a console control unit of the copying machine above;

FIG. 12 is a block diagram illustrating the details of a power supply and a fixing device of the copying machine above;

FIG. 13 is a block diagram illustrating the details of a circuit configuration of a copy paper conveying system;

FIG. 14 is a schematic block diagram of a DADF;

FIG. 15 is a perspective view of a sorter;

FIG. 16 is a schematic side view illustrating the conveying system centering around an intermediate tray;

FIG. 17 is a perspective view illustrating the system configuration of the copying machine fitted with an editor pad;

FIG. 18 is a top view of the editor pad;

FIG. 19 is a top view illustrating the editor panel and a display panel;

FIG. 20 is a block diagram illustrating a circuit configuration of a large capacity tray;

FIG. 21 is a diagram illustrative of the relation between the copying machine body and control data stored in two IC cards;

FIG. 22 is a flowchart illustrating the operation of writing additional control data by inserting IC cards;

FIG. 23 is a block diagram showing the principal part of a circuit configuration in the portion where IC cards in an IC card device are connected;

FIG. 24 is a diagram illustrating the flow of the data read from IC cards to a base machine; and FIG. 25 is a diagram illustrating the flow of the program read from IC cards to the base machine.

FIG. 35 is a top view of the principal part of a console panel of a copying machine Model A;

FIG. 36 is a top view of the principal part of a console panel of a copying machine Model B;

FIG. 37 is a diagram illustrating the mode of converting the density in Model A to that in Model B;

FIG. 38 is a diagram illustrating the mode of converting the density in the reversed direction of FIG. 37;

FIG. 39 is a diagram illustrating the mode of converting the set number of sheets in Model A to that in Model B;

FIG. 40 is a diagram illustrating the mode of converting the set number of sheets in the reversed direction of FIG. 39;

FIG. 41 is a diagram illustrating the mode of converting the editing functions in Model A to those in Model B;

FIG. 42 is a diagram illustrating the mode of converting the editing functions in the reversed direction of FIG. 41;

FIG. 43 is a flowchart illustrating the operation of an IC card device when data is read from the IC card in Model B;

FIG. 44 is a flowchart illustrating the mode of converting the density data;

FIG. 45 is a flowchart illustrating the mode of converting the set number of sheets;

FIG. 46 is a flowchart illustrating the mode of converting the editing functions;

FIG. 47 is a flowchart illustrating the operation of the IC card device when data is written to the IC card in Model B; and FIG. 48 is a flowchart illustrating the mode of converting the density data when it is written to the IC card.

DETAILED DESCRIPTION OF THE INVENTION

A detailed description will subsequently be given of the present invention applied to a copying machine. For the convenience of describing the present invention, the following headings are provided for the respective articles:

(0) Basic principle of embodiments of this invention.
(1) System configuration of copying machine.
(2) Software package.
 (2-1) Advantage of software combination;
 (2-2) Examples of differentiation
(3) Construction of copying machine.
(4) Circuit configuration of copying machine.
(5) Detailed circuit configuration of copying machine.
 (5-1) Periphery of photosensitizer drum;
 (5-2) Switching mechanism of developing device;
 (5-3) Optical system;
 (5-4) Fixing device;
 (5-5) Control of console;
 (5-6) Billing counter;
 (5-7) Power supply;
 (5-8) Conveying system;
 (5-9) DADF;
 (5-10) Sorter;
 (5-11) Intermediate tray;
 (5-12) Editor pad;
 (5-13) Large capacity tray.
↓ (6) Control of copying machine by IC cards.
 (6-1) Kinds of control data;
 A (6-2) Flow of control;
 (6-3) Example of control in detail;
 (6-4) Size of program; ↓ B
 ↑ (6-5) Transfer of program. ↑
↓ (6) Control of copying machine by IC cards.
 (6-1) Storage contents of IC card;
 C (6-2) Function data reading from IC card;
 (6-3) Details of IC card device;
 ↑ (6-4) Data writing to IC card.
↓ (6) Programs stored in copying machine.
(7) Storage of programs in copying machine.
(8) Upgrading of functions of copying machine.
(9) Data reading by IC card.
 D (9-1) Advantage of IC card;
 (9-2) Construction of IC card device;
 (9-3) Data reading.
↑ (10) Modified embodiment.

Among the aforesaid headings, A is applied to first and second embodiments only; B to the first embodiment only; C to a third embodiment only; and D to a fourth embodiment only.

(0) Principle of first embodiment.

Figure 1:
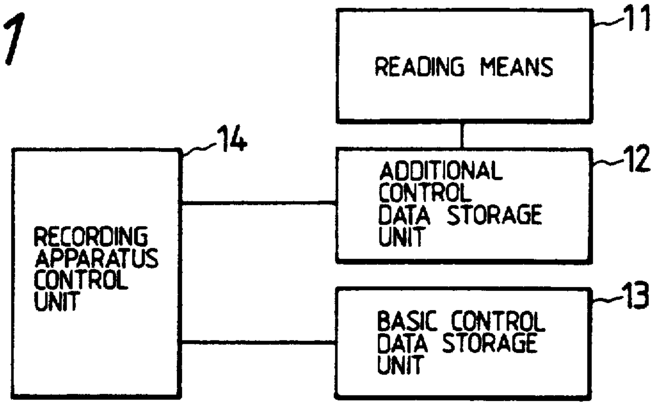
FIG. 1 is a block diagram illustrating the principle of a first embodiment of the present invention.

As viewed from the principle of the first embodiment illustrated in FIG. 1, a recording apparatus comprises reading means 11 for reading portable storage media such as IC cards; an additional control data storage unit 12 for storing the additional recording-apparatus control data read by the reading means 11; a basic control data storage unit 13 for storing basic recording-apparatus control data; and a recording apparatus control unit 14 for controlling the recording apparatus by reading the control data stored in the basic control data storage unit 13 and the additional control data storage unit 12 both and, when the basic control data and the additional control data overlap, further by giving priority for use to the additional control data over the basic control data in the overlapping part.

A plurality of IC cards set as storage media in the reading means on an application basis will be convenient in the case. In order to indicate the contents of the additional control data stored in the storage media by applications, the surfaces of the cards should be better given different color classification or given identification characters or symbols, depending on the kind of the control data.

The reading means need not necessarily be responsible for reading only the storage media such as IC cards but may be a reader/writer provided with a reading function so that it is capable of writing the history of the recording apparatus and data concerning the number of copies to the storage media.

Moreover, the additional control data stored in the storage media such as IC cards may be recording function control data or another usable by a specified person such as a serviceman for the maintenance of the recording apparatus.

In this embodiment, the additional control data supplied from the portable storage media to the recording apparatus body for storage is employed to make available the easiest-to-operate recording apparatus to customers.

(1) System configuration of coping machine.

Figure 2:
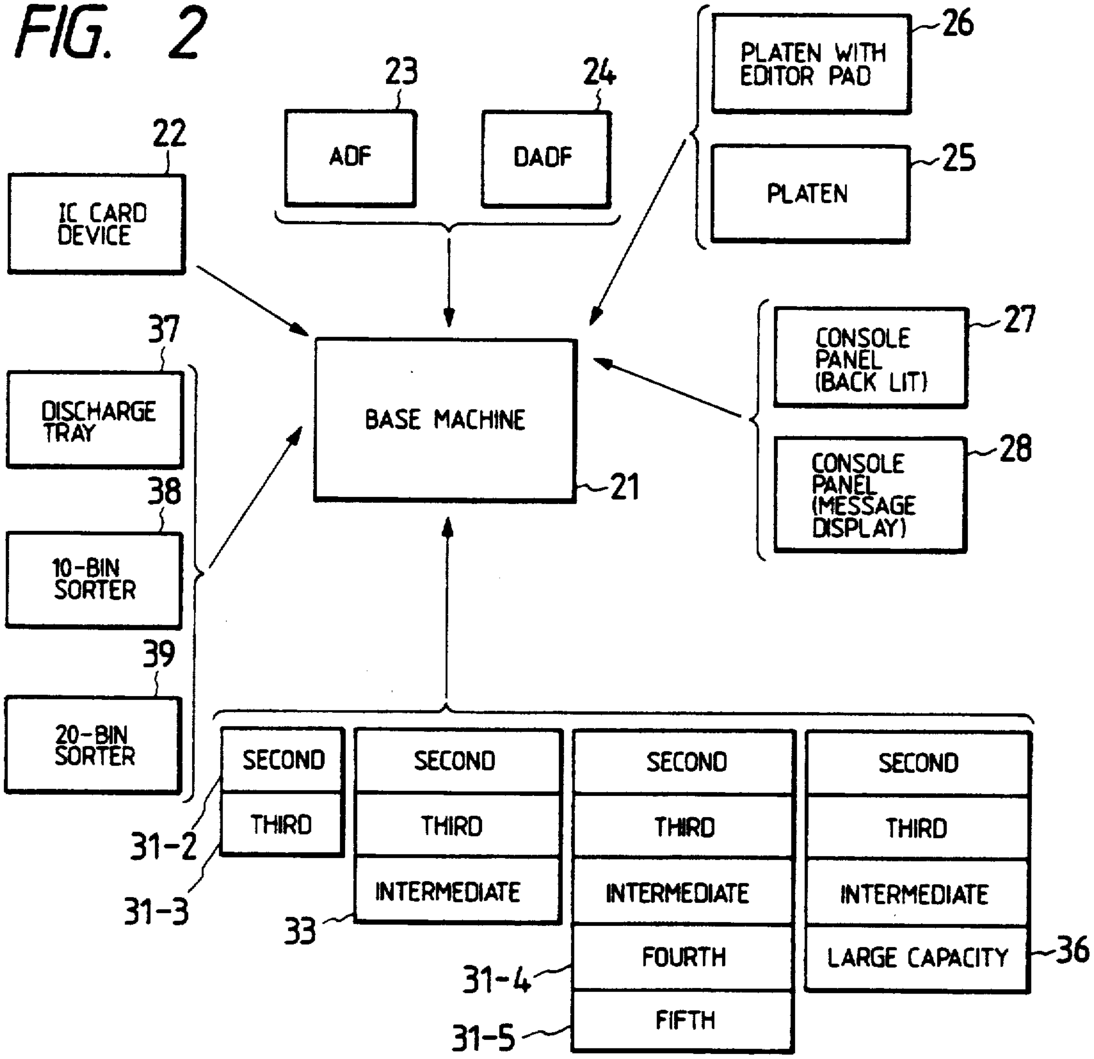
FIGS. 2~25 are illustrative of a recording apparatus embodying the present invention and the modified example thereof.

FIG. 2 is a system configuration of a copying machine.

In this embodiment, as shown in FIG. 2, the copying machine wherein IC cards are utilizable is designed so that desired additional devices are fitted to a base machine 21 as a basic component in order to upgrade its functions. The base machine in this case is equipped with a feed tray of one stage and a manual feed tray and used to make a copy of an original by manually setting the original on a platen glass plate. The following additional devices can be fitted to the base machine:

(1) IC card device 22.

An IC card device 22 is used to supply necessary data to the base machine 21 using IC cards on one hand and to write data from the base machine 21 to the IC cards on the other. Data (coordinate data) is read by means of an editor pad as will be described later, when the editor pad is connected to the IC card device 22 to carry out the input operation. The IC card device 22 in this embodiment is designed to control the IC card and the editor pad alternately but it is not possible to read data simultaneously using both of them.

The IC card for use in the IC card device in this embodiment has an ISO type interface with a memory capacity of 32 kilo-bytes. The use of IC cards permits not only the storage of complicated data therein but also the automated and multifunctional operation of a copying machine. By providing IC cards classified by industries or customers, for instance, a copying machine operating method agreeable to each group of owners can be implemented even if the copying machine has complicated functions. Accordingly, copying machines become quite easy to operate without errors.

Although the copying machine in this embodiment is equipped with only the IC card device as a card reader, it may be fitted with another card reader, to say nothing of a magnetic card reader, if necessary.

(2) ADF 23 and DADF 24.

An ADF 23 is generally called an automatic original feeder and designed to feed originals one after another onto the platen glass plate of the base machine 21 and to discharge the original after completion of development; only one predetermined side of the original is exposed to light. On the other hand a DADF 24 is of a duplex type, i.e., an automatic original feeder for copying both sides of an original.

The DADF 24 operates to convey an original in such a manner that one side of the original faces the platen glass plate to effect a first exposure and then to turn the exposed original upside down before returning it to the tray of DADF 24. As a result, what is opposite to the exposed side is then exposed when the original is fed again. The base machine 21 is arranged so that two sides of copying paper can be used independently for copying while it is equipped with the additional devices as will be described later.

As the ADF 23 and the DADF 24 are usable for the copying machine in this embodiment, copy-making operation can be done automatically to copy both sides of originals and copies in combination.

The ADF 23 is basically the same in construction as any of the automatic original feeders heretofore for use in copying machines. In the case of this embodiment, however, originals are inserted left to right facing the apparatus to prevent them from overflowing the base machine 21.

(3) Ordinary platen 25 and platen 26 with editor pad.

An platen 26 with an editor pad is provided with a coordinate input device called an editor pad for editing originals on the platen. An ordinary platen 25 is not equipped with such a mechanism.

(4) Console panel.

There are two kinds of console panels: one 27 which is of a back lit type and the other 28 with a message display. The console panel 27 of the back lit type has a display panel on which messages are arranged in predetermined locations and the messages are selectively lit by a lamp or the like in order to make them readable.

The console panel 28 with a message display adopted in this embodiment is formed with liquid crystal elements whose advantage is that various messages can be displayed anytime within a relatively small area of display. Decision on which one of the console panels should be employed may be made on a copying machine basis in consideration of complication in the system configuration and operability of the copying machine.

(5) Addition of feed tray.

There has already been proposed a typical form of adding a large capacity tray as disclosed in Japanese Patent Application (OPI) No. 77140/82. In this embodiment, however, feed trays in combination which can meet the needs of customers have been adopted. A detailed description has been given of the combination of such feed trays in, e.g., Japanese Utility Model Application (OPI) No. 194634/87 by the present applicants under "Multistage Paper Feed Copying Machine."

(a) Second and third feed trays 31-2, 31-3.

With the addition of these two feed trays, copying paper of maximum three different sizes can be fed to the base machine 21.

(b) Second and third feed trays 31-2, 31-3 and intermediate tray 33.

An intermediate tray 33 in this case is employed to accommodate copying paper temporarily when one side of the paper is used for copying a plurality of times or when both sides thereof is alternately used for copying.

(c) Second and third feed trays 31-2, 31-3, intermediate tray 33, and fourth and fifth feed trays 31-4, 31-5.

(d) Second and third feed trays 31-2, 31-3, intermediate tray 33, and large capacity tray.

A large capacity tray herein described is a feed tray capable of accommodating several thousand sheets of copying paper.

(5) Discharged copying paper receiving device.

Copying paper is normally received by a discharge tray 37. There are provided a 10-bin sorter 38 and a 20-bin sorter 39 in this system. Consequently, copies can be sorted by maximum 10 or 20 distributees if the 10- or 20-bin sorter is set.

As set forth above, the additional devices can be fitted selectively to the base machine 21 in the copying machine system and therefore the most suitable copying machine is offered to the customer. Moreover, the functional upgrading of the copying machine can be attained as business routine on the part of the customer changes.

The purchase of a single unit of base machine 21 may often be fit for customers who do not want to obtain enlarged or contracted copies of originals or a large number of copies at a time. On the other hand, those who need a large number of copies or complicated copy-making operation may often be required securing the intermediate tray 33 and the large capacity tray. This coping machine system is designed for each additional device to be simply replaced and detached in order to meet such versatile requirements, whereas an independent CPU (Central Processing Unit) is provided for a group of additional devices to effect decentralized control operation by a plurality of CPUs. By this is meant that products for which customers seek become readily available and, in addition to this merit, that the possibility of newly attaching additional devices teach them an innovation in copy-making operation. In view of this, the copying machine system appeals to customers a great deal in that it helps increase the productivity of office business processing.

(2) Software package.

(2-1) Advantage of software combination.

The system configuration of the copying machine as described above can also be detailed by reference to the software combination thereof. More specifically, since various additional devices can be fitted to the copying machine, the software is provided so that it conforms to the system configuration corresponding to an arrangement of additional devices.

One of the reasons for the adoption of such software package is (i) that, if control programs for use in operating all of the additional devices are to be provided in the base machine 21, the memory capacity required would become enormous. Another reason is (ii) that, when additional devices are newly developed in a future or when any improvements are made in the existing ones, they can be utilized without the replacement of the ROM (Read Only Memory) in the base machine 21 or the addition of a new one.

Accordingly, there are provided two areas in the base machine 21: a basic storage area for use in controlling the basic part of the copying machine; and an additional storage are where the programs read from IC cards are stored. In the additional storage area, various programs for controlling the ADF 23, the DADF 14 the console panel 28, etc. are stored. When an IC card is set in the IC card device 22 after the predetermined additional devices are fitted to the base machine 21, a program necessary for copy-making operation is read out and loaded on the additional storage device. The program thus loaded is used to control the copy-making operation in cooperation with the program written to the basic storage are or as what is given priority over the other.

(2-2) Examples of differentiation.

The program stored in the IC card controls the functions of the copying machine in this embodiment. Accordingly, one mode of using the copying machine can be differentiated from the other by replacing the card with a new one which stores a different program. A description will subsequently be given of the differentiation by referring to some examples.

As a first example, a copying machine for common use is installed in a building housing a number of independent business institutions or in a company or factory having different departments or sections. The installation of a copying machine for common use in the latter case is required in view of budget control and an instrument such as a copy-riser is normally employed to control service conditions on a department or section basis.

It is also assumed that the copying machine has a relatively high-grade system configuration comprising, as shown in FIG. 2, a base machine 21, an IC card device 22, a DADF 24, a sorter 38, a console panel 28, second-fifth feed trays 31-2~31-5 and an intermediate tray 33. The joint users or sections include those who need no DADF 24, sorter 38 nor additional devices.

If all the expenses for the use of the copying machine were to be divided among the users or sections whose operational requirements differs with the copying volume, those taking copies of little volume would be very much opposed to introducing a copying machine equipped with various additional devices and this makes it extremely difficult to mediate between the high- and low-degree users or sections.

Such a problem can be solved by allowing an IC card to each user or section according to the operation rate so as to let the users or sections wishing high-grade functions bear greater basic expenses in proportion to the operation rate. In this manner, many functions can be utilized. The owner of the highest grade IC card, for instance, is allowed to freely use the DADF 24, the sorter 38, the second~fifth feed trays 31-2, 31-5 and the intermediate tray 33 by operating the copying machine while the IC card is set in the IC card device 22 to ensure the improved efficiency of business. On the other hand, the user who does not want to have copying paper sorted can save the expenses by setting an IC card lacking a sorting program and employing the uppermost bin of the sorter 38 as a discharge tray.

As a second example, assuming that a trader is running a self-copy service store using IC cards.

There are a plurality of copying machines disposed in the store, the copying machines being equipped with IC card devices, respectively. Each customer asks for an IC card corresponding to the desired mode of service, so that he can take copies on a self-service basis by setting the IC card in the desired copying machine. The customer who is unfamiliar with the operation of a copying machine may be given an IC card incorporating an operational instruction display function in the program and, by setting the IC card, can take copies errorlessly according to the operational data displayed on the console panel 28. Whether or not the use of the DADF 24 or the execution of multicolor recording is possible can be determined by a lend-lease IC card, whereas the storekeeper is capable of assigning a copying machine at a proper rate to a particular customer by limiting the copying machines for use. Moreover, the storekeeper is also able to take careful thought out measures such as offering copying-fee discount service to regular visitors because he can instantly charge the fee therefor by writing copy-making data to the IC card, the data including the number of sheets, the size of copying paper used and so on.

As a third example, a description refers to service using an IC card storing a program intended for a specified user. In patent attorneys' offices, copies of relatively large magnification, e.g., 200% enlarged copies are often taken because of the necessity for making full-scale copies when patent gazettes contracted by the photomechanical process are examined. Moreover, the original drawings will have to be contracted or enlarged fractionally as requested by the government agency when they are submitted thereto. In the resident-card copy-making sections of municipal offices or ward offices, on the other hand, certified copies or abstracts of the originals are prepared with the deletion of image data in columns thereof where the data should be treated in confidence so as to protect the data of persons other than those claimed and their privacy.

In that manner, some users may demand to use copying machines in the special modes of use. If the functions of copying machines are set to meet such requirements, their console panels will become complicated in construction and moreover the ROMS inside the copying machines also become large in size. Consequently, IC cards classified by special users are used to provide copying machines having functions most suitable for such users by letting them set the IC cards therein.

In the case of patent attorneys offices, for instance, the purchase of IC cards for special use allows them to simply select 200% magnification or contraction in addition to several ordinary kinds of magnification or contraction as fixed ones. It also becomes possible for them to set magnification or contraction at a rate of, e.g., 1% within a range of required fine adjustments. In the aforesaid resident-card copy-making sections, instructions concerning kinds of resident cards, columns and items to be deleted, etc. can be given on liquid crystal displays by pressing keys such as ten keys and, by pressing the start key, the desired range of the original may be copied or the necessary contents thereof are edited before being recorded.

(3) Example of the construction of copying machine.

Figure 3:
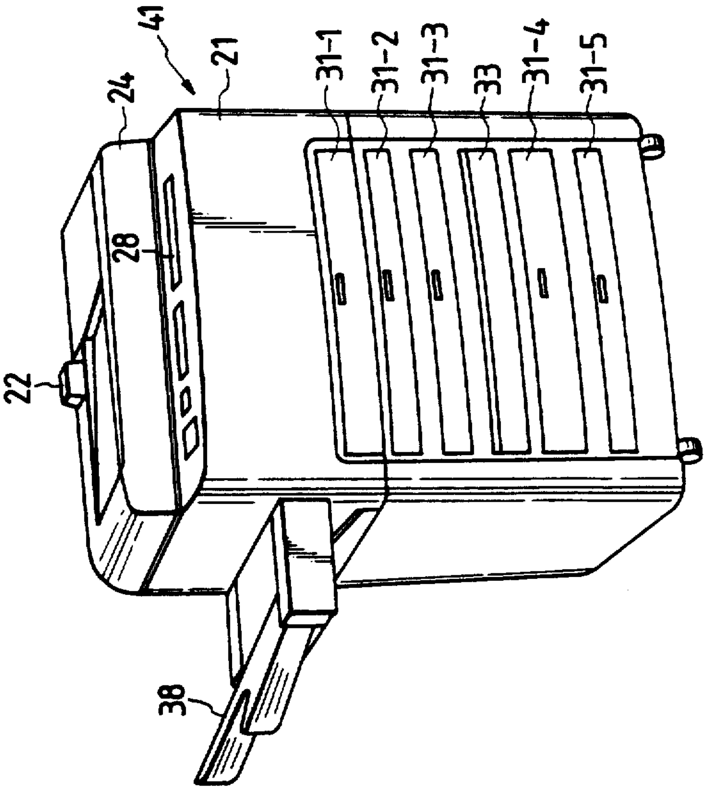

FIG. 3 is an external view illustrating an example of the system configuration of the copying machine in the aforesaid embodiment.

In the copying machine in this embodiment, the DADF 24 is installed on the base machine 21 and the IC card device 22 is arranged on the rear surface thereof. The console panel 28 with a message display is laid on this side surface of the base machine 21. A tray 41 for manual insertion (not shown) is fitted to the right side of the copying machine and the 10-bin sorter 38 to the left side thereof. The tray 41 is used for manual feeding and a plurality of sheets of paper can be simultaneously set before being fed successively.

As set forth above, the base machine 21 is fitted with the first feed tray 31-1 as a basic component. In this copying machine, the second and third feed trays 31-2, 31-3 are disposed under the first one, whereas the fourth and fifth feed trays 31-4, 31-5 are arranged with the intermediate tray 33 sandwiched therebetween. All of these feed trays 31-1~31-4 and the intermediate tray 33 can be slid out to this side, so that not only the improvement of operability but also economy of space for the installation of the copying machine is accomplished.

Moreover, this copying machine is neat and streamlined in design without the protrusion of the ADF (Automatic Draft Feeder) and the paper feed trays.

Figure 4:
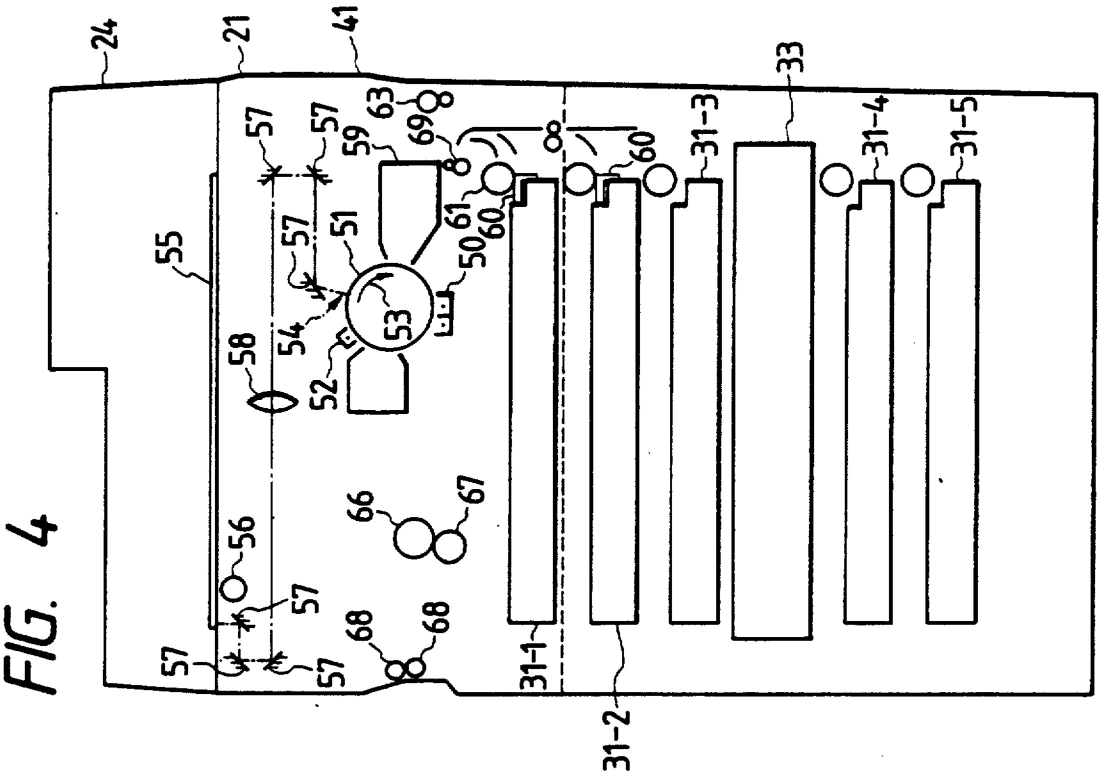

FIG. 4 is a schematic view of the copying machine, wherein a photosensitizer drum 51 is contained in the base machine 21. The photosensitizer drum 51 is uniformly charged by a charge corotron (charger) and turned at a fixed speed in direction of arrow 53, the charged surface thereof is exposed to light in an exposure range 54. Optical images of an original (not shown) placed on a platen glass plate 55 disposed on the base machine 21 are incident on the exposure range 54. For this purpose, an arrangement is made of an exposure lamp 56, a plurality of mirrors 57 for transmitting the light reflected from the surface of the original illuminated thereby and an optical lens 58. Some of them as prearranged are scanned for the purpose of reading the original.

Electrostatic latent images corresponding to the original are formed on the photosensitizer drum 51 by the image data exposed in the form of slits in the exposure range 54. The electrostatic latent image is developed by a developing device 59 and converted to a toner image. The toner image moves as the photosensitizer drum 51 turn and passes by a transfer corotron (transfer device) 50.

On the other hand, copying paper 60 contained on the first feed tray 31-1 fitted to the base machine 21 or manually fed along the tray 41 for manual insertion is sent out by a feed roll 61 or rolls 63 and guided by conveyer rolls 69 before being passed between the photosensitizer drum 51 and the transfer corotron 50. The toner images are transferred onto the copying paper 60 at this time. The copying paper 60 after the transfer is passed between a heat roll 66 and a pressure roll 67 and then subjected to heat fixing. Subsequently, the copying paper 60 is passed between a conveyer rolls 68, 68 and discharged onto a discharge tray (not shown).

The DADF 24 is fitted to the base machine 21 in this embodiment. Both sides of the original can thus be placed successively on the platen glass plate 55. In this case, one side of each of the originals piled up in the original container of the DADF 24 is first set on the surface of the platen glass plate 55 and, at the point of time a copy is taken, the original is turned upside down and reset in the container. The original is then sent to the platen glass plate 55 again.

Although five trays 31-2～31-5, 33 have been installed under the base machine 21, simply a cabinet may be arranged instead so as to accommodate expendables. Moreover, the copying machine with the base machine 21 left intact may be mounted on a desk and used as a desktop copying machine. Needless to say, only the second feed tray 31-2 may be installed under the first feed tray 31-1, so that the copying machine with this arrangement is mounted likewise on a desk.

Figure 5:
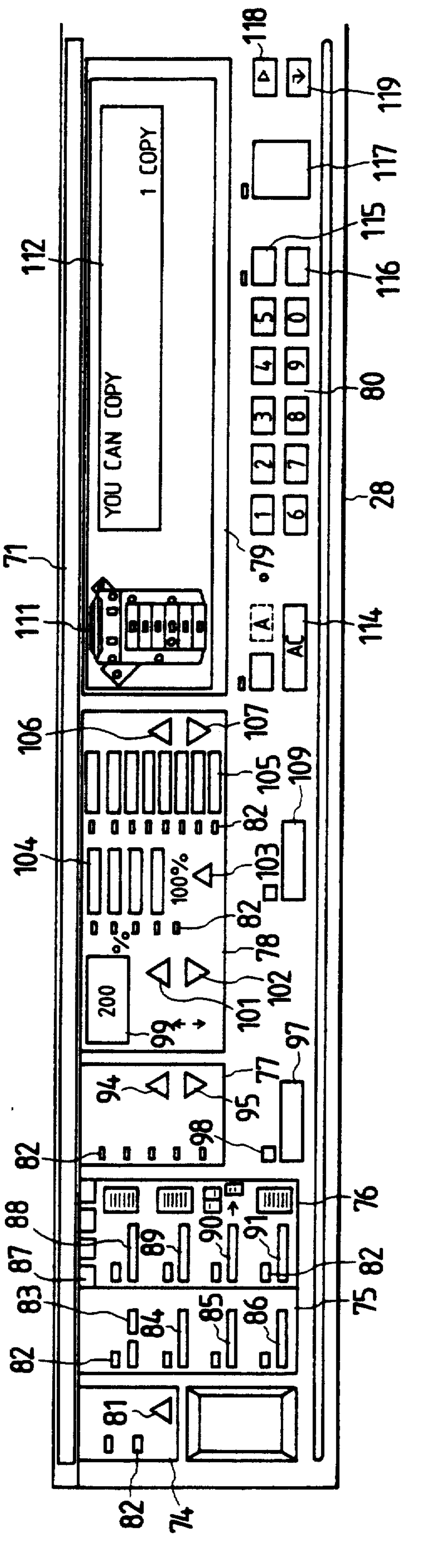

FIG. 5 is a top view of a console panel of the copying machine. The details of the art of display control as described hereinafter by the present applicants have been disclosed in Japanese Utility Model Application No. 130320/86 as "Display Unit" and Japanese Utility Model Application (OPI) No. 179792/87 as "Character Display Unit" Japanese Utility Model Application No. 130320/86, for instance, discloses the provision of a graphic display area through a dot pattern in a copying machine, suggesting the use of the graphic display area in order to make various kinds of display. In a copying machine capable of copying part of an original, moving and deleting a picture, for instance, an image sensor reads an image in the area intended while the original is placed on the platen with the suggestion of displaying its contour in the graphic display area, whereby not only errors in area setting but also misoperation are prevented from occurring.

A plurality of console panels may be adopted. However, the console panel 28 with a message display is employed in the copying machine in the above-described embodiment.

A menu display plate 71 is arranged above the console panel 28 and the contents of the respective panel sections 74～79 are displayed with characters. A switch 81 and two display lamps 82 are disposed in the panel section 74 for the sorter among them so that the sorting mode may be selected when the sorter is connected. The sorting mode consists of a stack mode in which sheets of copying paper are successively stacked and a gathering mode in which they are sorted in bins.

A switch 83 for (i) editing or correcting.identifying images; a switch 84 for (ii) having images stored in a job memory; a switch 85 for (iii) implementing various copying forms; a switch 85 for (iv) taking duplex copies; and display lamps 8 for displaying whether or not these switches have been selected are disposed in the function selecting panel sections 75. By the (i) editing is meant the function of reading data for editing by means of the editor, whereas the correcting.identifying means the function of displaying the input data in a liquid crystal display for identification and replacing the data. The memory used in (ii) is a nonvolatile memory composed of a random access memory backed up by a battery. Other storage media such as an IC card, a magnetic card, a floppy disk, etc. are needless to say usable as a nonvolatile memory. Image density and magnification can be preset in this copying machine in order to reduce the operating load of the console panel 28 by the operator and the values thus preset are stored in the nonvolatile memory. When the switch 85 is pressed (iii), character data is displayed in the display panel section 79 of the console panel 28 and the desired function among "the other" ones can be selected.

The other functions in that case include (i) a continuous page copying function, (ii) a side canceling function and (iii) a binding-margin function. The continuous page copying function (i) among them is that of dividing an original extending over two pages like a book-binding original into two one-page sections while it is in the state of a double-spread page. The side canceling function (ii) is that of copying no image data on the periphery of the original so that the original looks as if it were surrounded with a "frame" on the periphery of the image data. The binding-margin function is such that a "binding margin" is set in the right-hand or left-hand side portion of a copy. The binding margin having a desired length can be set and its value may be key-boarded 80 at the console or selected from the values displayed then on the display panel 79.

(iv) Finally, the duplex copy means taking copies on both sides of copying paper, respectively. When the duplex copy is made, the copying paper 60 with the first one side used for copy in is delivered onto the intermediate tray 33 shown in FIG. 4 first. Subsequently, the copying paper 60 is again sent out of the intermediate tray 33 and the other side thereof is used for copying. For monochromatic copying by means of this copying machining as will subsequently be described, the one side thereof is used twice for copying. In this case, it has been so contrived that the inside and outside of the copying paper being accommodated on the intermediate tray 33 are turned upside down.

On the menu display plate 71 shown in FIG. 5 are four display lamps 87 disposed in the uppermost portion of the monochrome emphasizing panel section 76 under the portion where "For Emphasizing Monochrome" is displayed and used to indicate kinds of color developing agents (color). The lamp(s) corresponding to the color(s) presently set is lit because one or a plurality of color (out of four colors, e.g., red, blue, etc.) developing agents can be set in this copying machine.

Four switches 88~91 and display lamps 82 for displaying which one of the switches 88~91 has been set are disposed in the remaining portion of the monochrome emphasizing panel section 76. The marking color switch 88 among them is (i) used for marking color. If this switch is pressed to specify the area where marking is made, that area is recorded with a light color superposed thereon, for instance, and the intended effect of marking is produced.

The continuous color synthesizing switch 90 (ii) is used to record one color in the specified area of a copy. A figure to be displayed with color is placed on the, e.g., right-hand side of the platen glass plate 55 (see FIG. 4), whereas an original is set on the left-hand side thereof. When a copy is made in the aforesaid condition, the image data of the original is copied in black and the figure is drawn thereon in one color. If the figure specified is formed of dots, the colored figure adjusted to the desired density by the reproduction of the dots is then recorded in the specified area of copying paper. In addition, the names or designs of merchandise are set on one side of the platen glass plate 55, whereas offering prices written on paper are arranged on the other, so that the standing prices thereof are readily displayed as one pattern of copy-making operation.

When the partial color conversion switch 89 is selected (iii), only the specified area is copied in one color and the remaining portion is copied in black. On the other hand, the original is copied in one color when the monochromatic switch 91 is selected (iv).

In the copy density panel section 77 provided under the portion where "Copy Density" is displayed on the menu display plate 71 are display lamps 83 indicating which one of the five stage copy densities has been selected and shift keys 94, 95 for selecting one of the copy densities. The upper shift key 94, when pressed, is used to decrease the copy density, whereas the lower shift key 95 is used to increase the copy density. The copy density can be adjusted by changing the developing bias of the developing device 59 shown in FIG. 4; changing the quantity of light from the exposure lamp 56 (FIG. 4); and changing the quantity of charge given by the charge corotron 52 relative to the photosensitizer drum 51. In this embodiment, the developing bias can be adjusted to, e.g., 16 stages.

An automatic density adjusting switch 97 is arranged under the copy density panel section 77. When the automatic density adjusting switch 97 is pressed, an automatic density display lamp 98 is lit to provide an automatic density adjusting mode. In the automatic density adjusting mode, part of the light reflected from the original when the original is scanned and arriving at the photosensitizer drum 51 is taken by the half mirror and the potential of the developing electrode within the developing device 59 is set, depending on the proportional quantity of that part of light.

In the magnification.paper selection panel section 78 provided under "Optional Magnification" on the menu display plate 71 are a display section for setting the magnification desired on the left-hand side thereof and a paper selecting section on the right-hand side thereof.

A magnification table display 99 is provided in the section where magnification is set and displayed. In this copying machine, 50-to-200% magnifications can be set optionally on a 1% basis (linear magnifications) and the magnification set is displayed in the magnification table display 99. The magnification display is set by either operating shift keys 101, 102 optionally or selecting the predetermined fixed magnification.

When the optional magnification is set, the shift keys 101, 102 are operated. The upper shift key 101, when pressed, is used to increase the magnification by 1%, whereas the lower shift key 102 is used to decrease the magnification by 1%. While the shift keys 101, 102 are kept being pressed, the magnification increases continuously by 1%.

The selection of the fixed magnification is made by a fixed magnification key 103. The fixed magnification is displayed on magnification display plates 104 and, in this embodiment, can be selected from 141.4%, 86.5%, 81.6% and 70.7%. In addition, 100% as an equimultiple may be selected. Which one of the magnifications has been selected is made known by display lamps 82 disposed next on the left-hand side of the display plates 104.

In the copying paper selecting section above are eight display plates 105 for displaying paper sizes and shift keys 106, 107 for selecting one of the sizes. Display lamps 82 are disposed next to the eight kinds of display plates 105, the lamps 82 being used to display which one of the copying papers or sizes has been selected. The following are displayed in the display plates 105 in this embodiment:

(i) Display of tray for manual insertion.

When the tray 41 (FIG. 4) for manual insertion is selected, this operation is displayed. A conventional tray for manual insertion is designed to feed a sheet of copying paper at a time and it is only necessary for the operator to feed the copying paper with priority given thereto, whereas the operator need not select the tray for manual insertion. On the other hand, a plurality of sheets of copying paper can simultaneously be set on the tray 41 for manual insertion in this embodiment. If copying paper is set by having the tray 41 for manual insertion convey the paper, the plurality of sheets of copying paper may start being fed at the point of time they are being set. In order to avoid the situation above, the tray 41 for manual insertion is allowed to select copying paper.

(ii) A3 paper display.

This display is selected when copying paper of A3 size is used in the long direction.

(iii) B4 paper display.

This display is selected when copying paper of B4 size is used in the long direction.

(iv) A4 paper display.

This display is selected when copying paper of A4 size is used in the long direction.

(v) B5 paper display.

This display is selected when copying paper of B5 size is used in the long direction.

(vi) A4 crosswise paper display.

This display is selected when copying paper of A4 size is sued in the direction perpendicular to its long direction.

(vii) B5 crosswise paper display.

This display is selected when copying paper of B5 size is used in the direction perpendicular to its long direction.

(viii) Nonstandard paper display.

This display is selected when nonstandard paper is used.

An automatic paper/magnification selecting switch 109 is arranged under the magnification.paper selection switch 78. When this switch 109 is pressed, the automatic/magnification selecting switch 109 is selected and a combination of preset magnification and paper size is selected. The operator can thus learn whether or not the desired combination has been selected from the display lamp 82 lit in the magnification.paper selection panel section 78. In case the desired combination has not been attained, it is possible to change the combination by again pressing the automatic paper/magnification selecting switch 109.

The display panel section 79 is arranged to the right of the magnification.paper selection panel section 78. A pattern display 111 and a liquid crystal display 112 of the copying machine are arranged in the display panel section 79. The pattern display 111 is used to display by means of lamps lit to indicate the feed tray selected and the location clogged with paper. A sentence including Chinese characters can be displayed on the liquid crystal display 112 in this embodiment. In the example shown in FIG. 5, the copying machine is ready for operation wit one set copy. The liquid crystal 112 in this embodiment is a color liquid crystal display which is able to indicate the specified areas with colors, respectively.

The following keys or buttons are disposed under the display panel section 79:

(i) All clear button 114.

This button is used to restore the basic state, i.e., to return the operational mode of the copying machine to the priority one initially set wherein copying paper is selected.

(ii) Ten keys 80.

These keys are used to set the number of sheets of copying paper, input numerical values for specifying the contents of diagnosis when the copying machine is diagnosed.

(iii) Interruption button 115.

This button is used in case of emergency wherein some other copies must be taken while continuous copy-making operation is performed. It is also used to release the interruption in order to restore the original copy-making operation as soon as the interruption process is terminated.

(iv) Stop-clear button 116.

This button is used as a clear button to stop unfinished copy-making operation and to set the number of copies and the bin of the sorter.

(v) Start button 117.

This button is used to start copy-making operation.

(vi) Selection key 118.

This key is used to move a cursor in response to the message displayed, i.e., as a cursor key.

(vii) Set key 119.

The key is used as a return key to locate setting at the place specified by the cursor.

As set forth above, the basic operational area and the applicative operational area on the console panel in this embodiment are completely separated from each other; e.g., the selection of copying paper and copy density setting are carried out in the former, whereas the selection of functions and emphasis on monochromatic color are effected in the latter. In addition, errors in panel operation are minimized by giving assistance to the applicative operation by displaying characters including alphabets on the liquid crystal display.

(4) Circuit configuration of copying machine.

Figure 6:
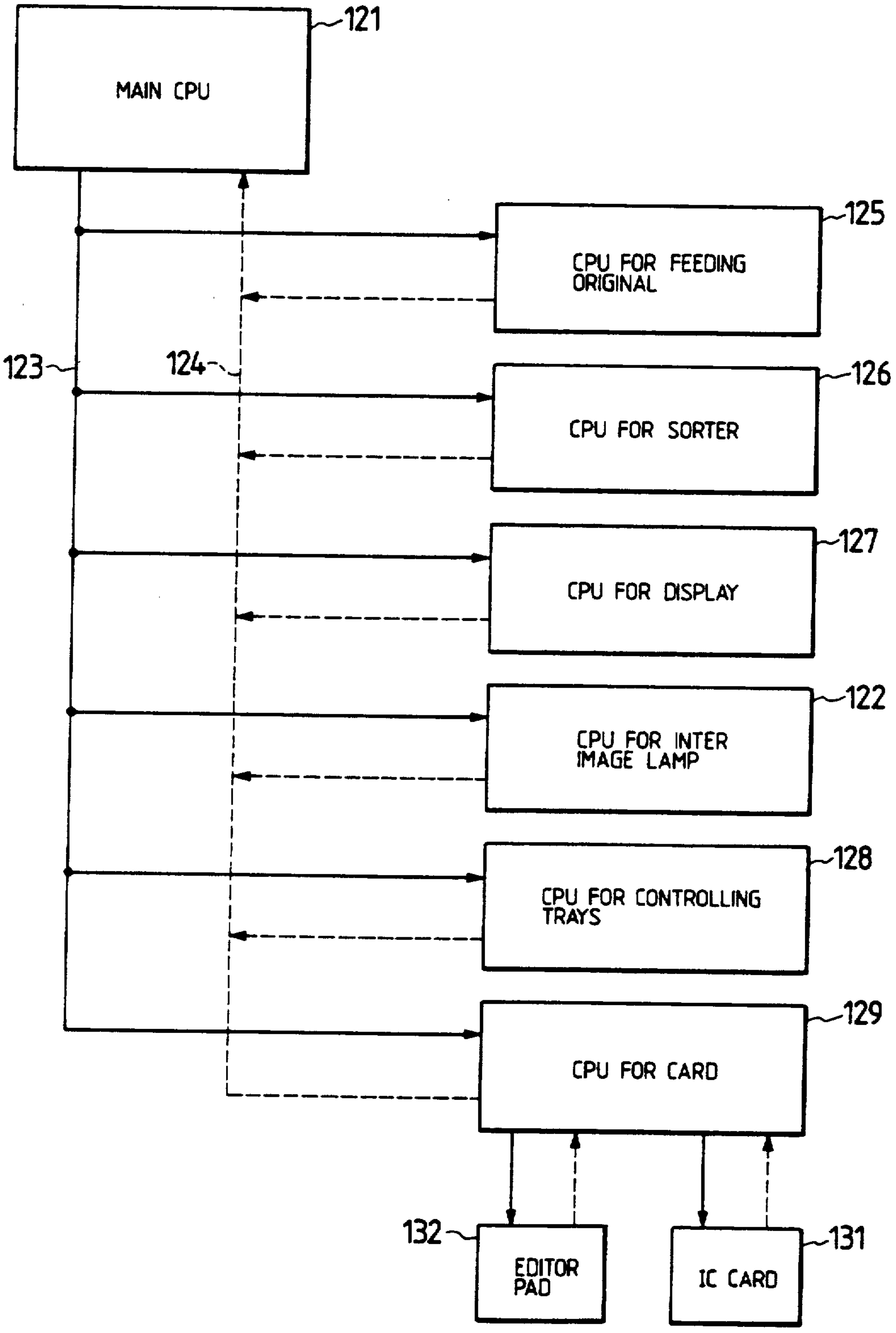

FIG. 6 is a schematic circuit configuration of the copying machine.

In FIG. 6, there is shown a decentralized CPU architecture for serial communication centering around a CPU 121 so as to make possible not only the optimum arrangement of a controller but also the provision of optimum cost performance. In view of the development of products such as copying machines, it is anticipated to shorten a period of software development and to improve the efficiency thereof. Further, it is ensured to simplify their wire furnaces, reduce production costs and to facilitate troubleshooting.

Since processing efficiency is increased by the decentralization of processing using a plurality of CPUs, programs prepared to the satisfaction of complicated high-speed processing can be provided using inexpensive 8-bit CPUs but not expensive 16-bit CPUs.

Moreover, the decentralization of processing facilitates the diffusion of models. In other words, even when new input/output devices are developed, the modification of programs on the part of the main CPU may become unnecessary, so that the alteration thereof is minimized.

With respect of the printed circuit boards on the main CPU side, the decentralization of the CPUs makes it unnecessary to store needless I/0 ports and programs. Accordingly, it becomes possible to reduce the cost of the printed circuit board to ensure a free equipment layout.

The base machine 21 in this copying machine is controlled by a main CPU (Central Processing Unit) 121 and a CPU 122 for an inter-image lamp within the base machine 21. The CPU 122 for an inter-image lamp in this case specializes in controlling the inter-image lamp.

The inter-image lamp is used to throw light on the photosensitizer drum 51 after exposure and to erase part of an electrostatic latent image before development. When an original of B5 size is copied equimultiplicably in the prior art, for instance, the area other than the B5 size on the photosensitizer drum 51 is illuminated so as to prevent a toner image from uselessly forming outside the area. The copying machine in this embodiment is, as will be described later, provided with the function of editing image too. When the formation of an electrostatic latent image may be restricted to a predetermined rectangular area or polygonal one, the partial deletion of the electrostatic latent image accordingly becomes needed to effect the aforesaid processing. In this case, a CPU independent of the main CPU 121 in the copying machine in this embodiment is employed because the inter-image lamp is being used to an extent greater than that in the prior art.

Xerox Co. is one of the manufacturers that has introduced such a decentralized processing system as what is employed to control a copying machine and Japanese Patent Application (OPI) No. 78371/84 by Xerox Co.

discloses the detailed contents of the art and relevant references in "Copying Machine Control Apparatus and Method of the Same."

The communication method adopted in the present invention is not the "Ether Network" intended for high-speed processing employed in the aforesaid Patent Application but equivalent to what is capable of obtaining the same effect with a 4,800 Baud current loop.

In the meantime, the present applicants have given a detailed description of the CPU 122 for an inter-image lamp in Japanese Utility Model Application No. 152591/86 entitled "Image Copying Machine" and Japanese Patent Application No. 023392/87 entitle "Image Erasing Device for Copying Machine."

In this embodiment, the copying machine is equipped with the following CPUs and connected with communication lines 123, 124. The main CPU 121 assumes the role of generalizing those CPUs and the CPU 122 for an inter-image lamp.

(i) CPU 125 for feeding original.

A CPU 125 for feeding originals controls the DADF 24 shown in FIG. 4. When the ADF 23 (FIG. 2) in place of the DADF 24 is used, the CPU contained therein is connected to the communication lines 123, 124.

(ii) CPU 126 for a sorter.

A CPU 126 is arranged in the 10-bin sorter 38. Another CPU is also installed for special use in the 20-bin sorter 39. The main CPU 121 finds out which one of the sorters 38, 39 has been connected and controls sorting correspondingly.

(iii) Display CPU 127.

A display CPU 127 is used to display various kinds of data with kanjis on the aforesaid display 112 fitted to the console panel 28 and an area for editing purposes. No special CPU is used when the console panel 27 of a back lit type (FIG. 2) is employed because complicated display control is unnecessary. If the liquid crystal display 112 is employed, the ten keys are used to designate figures being edited.

(iv) CPU 128 for controlling trays.

A CPU 128 for controlling trays is used to control the fourth and fifth trays 31-4, 31-5 among those newly added to the base machine 21, the large capacity tray and the intermediate tray 33. This CPU is located behind the tray cabinet containing each of the trays and controls them, depending on the tray thus connected. Among these trays, the intermediate tray 33 is equipped with its own motor for conveying copying paper and further the location of the copying paper placed on each tray differs with its size. Accordingly, the CPU needs to effect complicated control.

The mode of controlling each tray by the CPU 128 for controlling trays is as follows:

(i) Control of both or one of the fourth and fifth feed trays 31-4, 31-5 and the intermediate tray 33;

(ii) Control of the large capacity tray and the intermediate tray;

(iii) Control of only the intermediate tray;

(iv) Control of both or one of the fourth and fifth feed trays 31-4, 31-5.

(v) Control of only the large capacity tray; and (vi) CPU 129 for controlling cards.

The CPU 129 controls IC cards 131 used to store additional data for use in adding or correcting the functions of the copying machine in order that the data is read. When the IC card 131 is used to designate the coordinates of an original, further, the CPU 129 controls the reading/writing operation of the card 131. Moreover, the CPU 129 can also control an editor pad 132, though this operation is not employed in this embodiment. The editor pad 132 is used to input coordinates and will be described in detail later.

Figure 7:
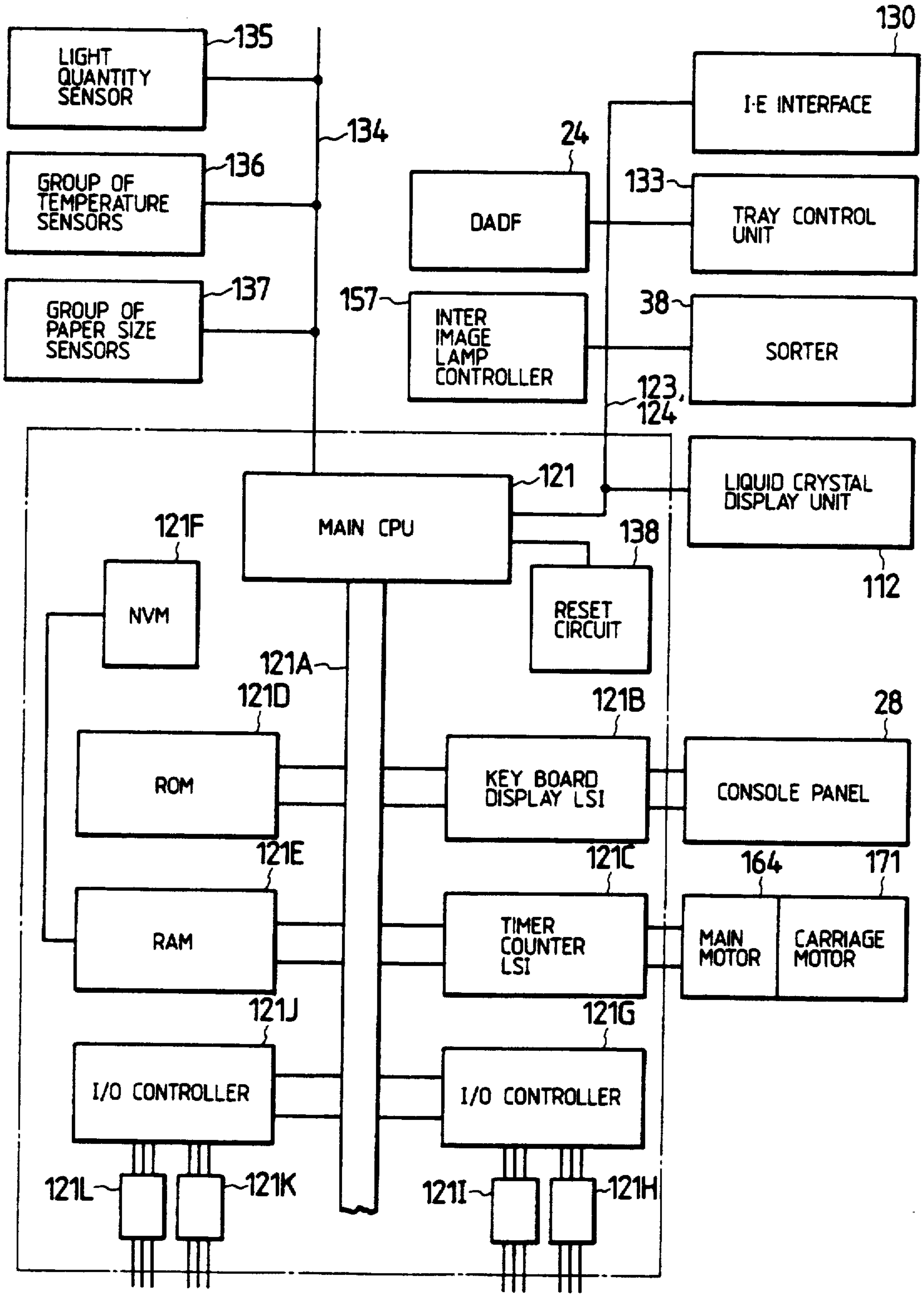

FIG. 7 is a detailed circuit configuration with the main CPU as a central figure acting the pivotal role in the copying machine of this embodiment.

Copying machines controlled by control apparatus such as CPUs and microcomputers have already been made known by a paper "A Programmable Digital Control System for Copying Machines" by Sikandar Sheikh of Xerox Co., IEEE Trans, Com, Vol IECI-21, No. 1, Feb. 1974 and Japanese Patent Application (OPI) No . 62644/75 "Electrophotographic Copying Process and Apparatus" as the first instance of a similar idea. Like the main CPU, other CPU modules are, needless to say, composed of one-chip CPUs, ROMs, RAMs, I/O, etc.

(i) The main CPU 121 is, as partially described in FIG. 6, connected via the communication lines 123, 124 to the following component parts:

(1) DADF 24.

(2) Sorter 38.

(3) Liquid crystal display 112.

(4) IC card.editor pad interface 130; an interface which is arranged in the IC card device 22 and causes data to be given to and received by the main CPU 121 when an IC card and an editor pad 132 are connected to the copying machine proper.

(5) Inter-image lamp controller 157.

(6) Control unit for controlling the fourth and fifth trays 31-4, 31-5, the intermediate tray 33, etc.

(ii) The main CPU 121 incorporates and A/D converter and is connected via an analog data line 134 to the following parts. There are 8-bit one-chip CPUs, e.g., uPD7810CW, uPD7811CW of Nippon Electric Co. and MB89713X of Fujitsu, Ltd.

(1) Light quantity sensor 135; used to detect the quantity of light derived from the exposure lamp 56 (FIG. 4) and control it.

(2) Group of temperature sensors 136; soft touch sensors for controlling fixing temperatures as will be described later.

(3) Group of paper size sensors 137; sensors for detecting the sizes of paper placed on the feed tray 31. Copying paper can be fed from maximum five kinds of trays according to the system configuration of the copying machine in this embodiment. Consequently, if four sensors for detecting the paper size are disposed on one feed tray, with digital data being used for processing purposes, 4-bit digital data will have to be sent to the main CPU 121 from one tray. This will also necessitate maximum 20 input ports in total, together with a number of connectors and cables constituting a harness; this construction is not preferable in view of not only cost and size reduction but also reliability.

In this embodiment, accordingly, the conditions specified by four sensors per tray of the copying machine are sent out as analog data. The analog data received by the main CPU 121 is converted into digital data therein, so that the maximum 16 sizes of copying paper put on each tray are identified.

(iii) Further, the main CPU 121 is reset at the time of the runaway or initialization of the reset circuit and also connected via a bus line 121a to the following parts.

(1) Keyboard display LSI 121B; a circuit for interceding with the console panel 28 for the data.

(2) Timer counter LSI 121C; a circuit for controlling the driving of a main motor 164 and a carriage motor 171.

(3) ROM 121D; a Read Only Memory having a capacity of 56K bytes and storing the basic control data of the copying machine.

(4) RAM 121E; a Radom Access Memory having a capacity of 6K bytes and temporarily storing data. The aforesaid nonvolatile memory (NVM) 121F is connected to this RAM 121E and capable of preserving the necessary data even when the power supply of the copying machine is cut off.

The necessary data stored in the nonvolatile memory (NVM) 121F includes (a) a setup value for use in regulating the registration of copying paper, (b) the quantity of erasing the tip portion of an image by the inter-image lamp as will be described later in detail, (c) a fine adjusting value for use in adjusting the vertical and horizontal magnifications when the equimultiple copying value is set, (d) each parameter adjusting value for use in adjusting the parameter on the copying machine production line such as the quantity of a binding margin when a copy is taken with a blank for providing the binding margin, and (e) data for use in detecting the operating condition of the copying machine such as the actual value resulting from the use of the feed counter on each feed tray 31.

(v) First I/0 controller 121G; an input/output controller for reading various data via a filter circuit 121H and driving various parts via a driver circuit 121I. Switches and sensors are connected to the filter circuit 121H and solenoids such as developing solenoids and clutches 233 contained in the feed trays 31-1 ~ 31-5 are also connected thereto as will be described later.

(vi) Second I/0 controller 121J; an input/output controller for reading various data via a filter circuit 121K and driving various parts via a driver circuit 121L. Switches and sensors are connected to the filter circuit 121K. The driver circuit 121L is equipped with a know D/A (Digital-Analog) converter and a PWM (Pulse Width Modulator) and used to set the developing bias of a developing device and the current value of the charge corotron 52 as the program is processed, which will be described later.

(5) Detailed circuit configuration of copying machine.

Referring to FIGS. 8 ~ 13, a detailed description will be given of the circuit configuration of the copying machine in this embodiment.

(5-1) Periphery of photosensitizer drum.

Figure 8:
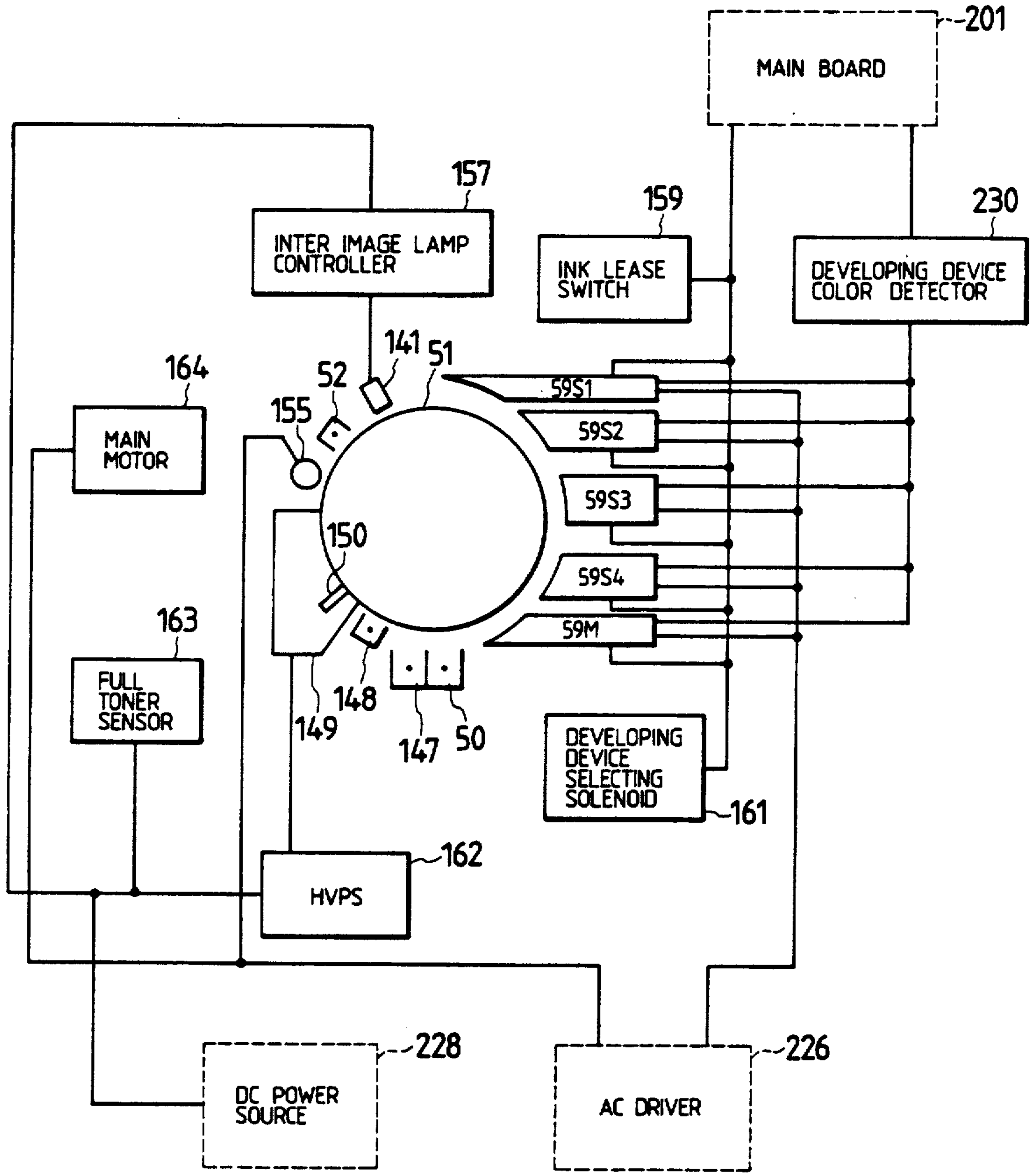

FIG. 8 is a block diagram illustrating the periphery of the photosensitizer drum 51.

On the periphery of the photosensitizer drum 51 are a charge corotron 52, an inter-image lamp 141, four kinds of sub-developing devices 59S1 ~ 59S4, a main developing device 59M, a transfer corotron 50, a detack corotron 147, a pre-clean corotron 148, a cleaning device 149 and a deelectrifying erase lamp 155 in this order. The first, second, third and fourth sub-developing devices 59S1, 59S2, 59S3, 59S4 use red, blue, green and light brown toner for developing, respectively.

The inter-image lamp 141 consists of a train of 128 light-emitting diodes disposed in a row and a plastic lens arranged in parallel with and in front of these diodes. The plastic lens (not shown) having a nonspherical convex surface in a position corresponding to each light-emitting diode is arranged so that, even when the light-emitting diodes adjacent to each other emit light, the intensity of the light on the photosensitizer drum 51 will not become uneven in the boundary therebetween. Moreover, the focal point of the plastic lens is made to shade off on the photosensitizer drum 51. Accordingly, when a triangular figure is processed (e.g., extracted or deleted), for instance, the difference in stage between the light-emitting diodes as a unit is considerably decreased in the boundary being processed.

An inter-image controller 157 is designed to control the on/off of the light-emitting diodes as 128 segments of the inter-image lamp 141. The cleaning device 149 is provided with a doctor blade 150 and used to peel the toner deelectrified by the pre-clean corotron 148 off the photosensitizer drum 51.

In the copying machine in this embodiment, a main motor 164 is started 0.2 second later than the contact of the doctor blade with the photosensitizer drum 51. Moreover, the doctor blade 150 is not separated from the photosensitizer drum 51 immediately after the main motor 164 stops but separated therefrom five seconds later; thereby the toner is prevented from contaminating the interior of the copying machine by scattering because of the vacuum suction strength.

The sub-developing devices 59S1 ~ 59S4 each are equipped with the following parts:

(i) Color sensor.

A color sensor for identifying which one of the color developing agents has been set in each developing device. Even if the sub-developing devices 59S are installed with the combination of red, blue, green and light brown colors, the color sensors can be used to detect the respective colors provided for the sub-developing devices 59S1 ~ 59S4. Each detection output is sent to a developing color detecting circuit 230 and transmitted to a main board 201.

(ii) Toner sensor.

A toner sensor for determining whether the supply of toner is needed.

(iii) Dispense motor.

A motor for churning the toner contained in a toner box and supplying it.

A main developing device 59M uses black toner for developing and has a toner sensor and the dispense motor. An ink lease switch 159, if pressed by the operator, is used to increase the quantity of toner. While one of the sub-developing devices 59S1 ~ 59S4 is selected, the ink lease switch 159, if pressed, operates to increase the quantity of toner being supplied to the sub-developing device involved. If the switch is pressed while the main developing device 59M is selected, the quantity of black toner increases.

A developing device selecting solenoid 161 is used to selectively switch the five developing devices, namely, the main developing device 59M and the sub-developing devices 59S1 ~ 59S4. The switching operation will be described later.

A high-voltage power supply (HVPS) 162 is used to form a parallel electric field in the main and subdeveloping devices 59M, 59S1 ~ 59S4 so as to improve the reproducibility of the solid portion (solid black one). A full toner sensor 163 is used to detect whether the toner has been recovered satisfactorily to a toner recovery container. The main motor 164 is used to drive the photosensitizer drum 51, a heat roll 66 or a conveyer system from the registration of timing at which the copying paper 60 is conveyed up to the discharging time.

(5-2) Switching mechanism of developing device.

Figure 9:
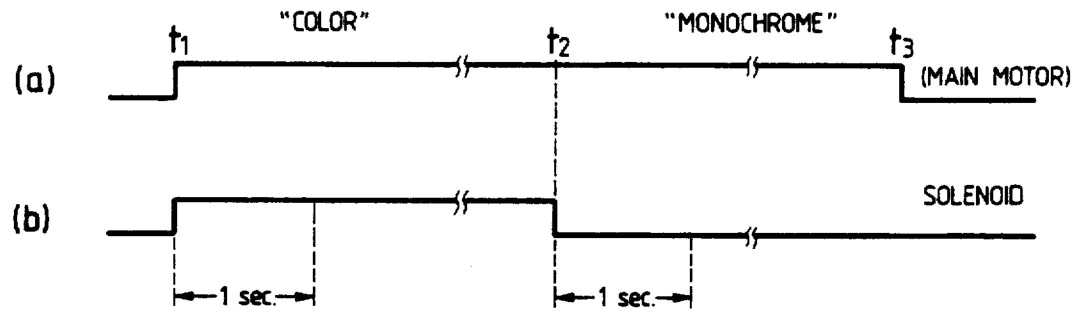

FIG. 9 is a timing chart illustrating the switching timing of the main developing device and the sub-developing devices. The timing chart exemplifies red color developing first carried out in the first developing device 59S1 and monochromatic developing secondly made in the main developing device. When the start button 117 (FIG. 5) of the copying machine is pressed in order to start copy-making operation, the main motor 164 is driven from time $t_1$ as shown in FIG. 9(*a*). The main motor 164 is being driven up to $t_2$, when the copy-making operation is completed in both two developing devices 59S1, 59M.

FIG. 9(*b*) represents the driving timing of the developing device selecting solenoid 161. The developing device selecting solenoid 161 is kept excited until red copy-making operation by the first sub-developing device 59S1 is terminated. A lever abuts against the peripheral face of a clutch (not shown) because of the excitation of the developing device selecting solenoid 161 in this copying machine. On receiving the driving force from the main motor 164, the clutch shifts by 72 degrees at a time and starts the rotation of five sets of cams (not shown), each having a protrusion. When one of the protrusions abuts against the first sub-developing device 59S1, it presses the first sub-developing device 59S1 toward the photosensitizer drum 51. The protrusions of the remaining cams are left most apart from the main developing device 59M and the other sub-developing devices 59S2~59S4 and the main developing device 59M and the other sub-developing devices 59S2~59S4 remain most apart from the photosensitizer drum 51.

There are five protrusions disposed on the periphery of the clutch and, when the lever abuts against the protrusion involved, the protrusion corresponding to the one cam is most strongly pressed against the first sub-developing device 59S1. Development with red color toner is made in that position. However, since the main developing device 59M in the initial state is arranged close to the photosensitizer drum 51 in this copying machine, the red color development is not started immediately at $t_1$ but kept on standby by one second. At this time, the aforesaid cam, in place of the main developing device 59M, sets the first sub-developing device 59S1 (or the other sub-developing devices 59S2~59S4) to the photosensitizer drum 51.

When the first sub-developing device 59S1 has completed the copy-making operation, the aforesaid five cams move to let the lever position the protrusion of the monochromatic cam, whereas the main developing device 59M is set to the photosensitizer drum 51 for one second after $t_2$. Then the monochromatic developing is carried out.

What has been described above refers to only red color marking but, when marking with a plurality of colors is made, one of the sub-developing devices 59S1~59S4 is successively selected in predetermined order as what is involved and the monochromatic developing is made after the completion of the operation above.

Figure 10:
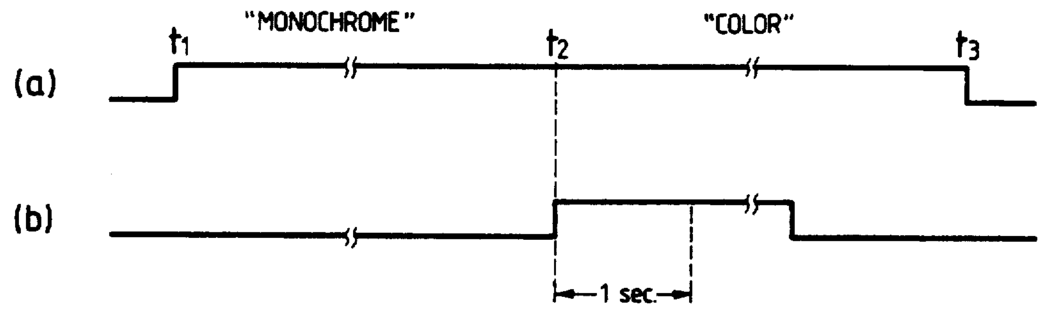

FIG. 10 refers, by way of example, to a case where the monochromatic developing is first made and subsequently followed by red color development. FIGS. 10(*a*), 10(*b*) are graphic presentations respectively illustrating the operation of the main motor 164 and the developing device selecting solenoid 161. In the case of FIG. 10, development is first carried out by the main developing device 59M and therefore one second of standby time is unnecessary at that point of time. However, one second has to be secured after the completion of the monochromatic development as the second one and the main developing device 59M has to be set again to the photosensitizer drum 51.

(5-3) Optical system.

Figure 11:
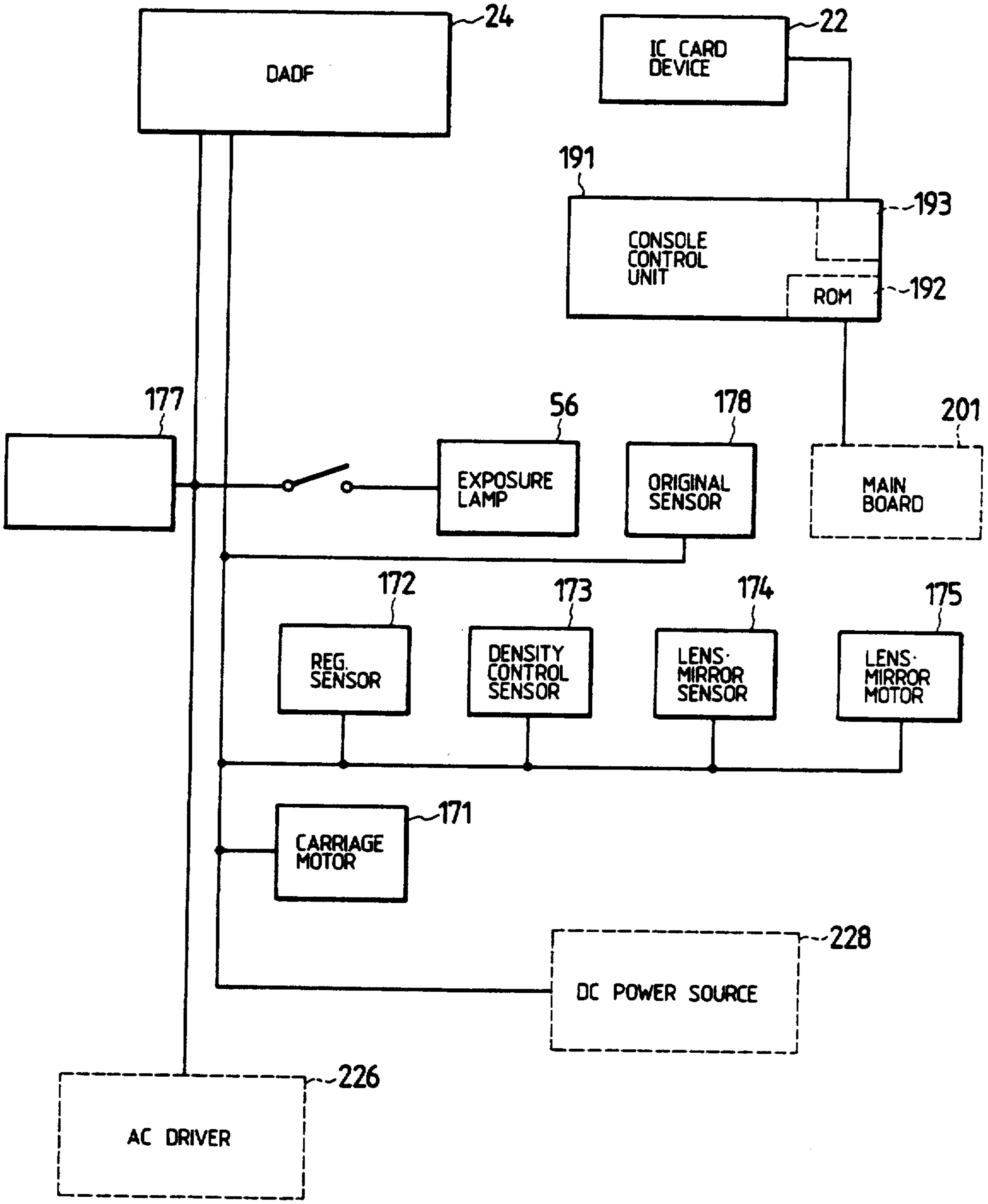

Referring to FIG. 11, an optical system will be described.

A carriage (not shown) provided with the lens and mirrors is reciprocally operated by a carriage motor 171. The carriage motor 171 includes a step motor and the position of the carriage returning to the home position is controlled by a registration sensor 172.

The registration sensor 172 is used to set the timing at which the optical system and the conveyance of the copying paper 60 is adjusted. In other words, the carriage is provided with an actuator for intercepting the transmission of light and, as the carriage moves, the registration sensor 172 detects the temporary interruption of the light rays. The signal detected thereby is used to determine the position or timing for implementing the registration or to determine the home position at the item the carriage is returned.

A density control sensor 173 is used to control the copy density of an original. As set forth above, the copying machine in this embodiment is so designed as to control the copy density by simultaneously adjusting the charge quantity given to the photosensitizer drum 51, the image exposure quantity and a bias voltage applied to the developing electrode. A lens mirror sensor 174 controls the movement of the optical lens 58 and the mirrors 57 (FIG. 4) and consists of one detecting element. A lens mirror motor 175 has also been redesigned to commonly drive the lens 64, the mirror 57 and the like that are separately driven in the conventional copying machine. The exposure lamp 56 has already been described. A fan 177 for the optical system is used to air-cool part of the optical system in order to remove heat from the platen glass plate 55. An original sensor 178 is used to detect the size of an original.

(5-4) Fixing device.

The relation of a fixing device to the others will subsequently be described by reference to FIG. 12.

The base machine 21 in this embodiment is provided with a main fuser lamp 181 and a sub-fuser lamp 182, i.e., two kinds of fuser lamps within the heat roll 66. The sub-fuser lamp 182 is shorter than the main fuser lamp 181 and slightly deviated from one end of the main fuser lamp 181. In this embodiment, the so-called corner registration method is employed, wherein the copying paper 60 in this copying machine is aligned with one side of the platen glass plate 55, whereby the required quantity of heat energy in the axial direction of the heat roll 66 differs with the size of copying paper 60 for use. In order to correct the deviation of the temperature distribution in the axial direction caused thereby, the power supplied to the sub-fuser lamp 182 is controlled, depending on the size of copying paper 60. The adoption of the sub-fuser lamp 182 makes it possible to satisfactorily prevent temperature variations in the fixing device.

A fuser outlet sensor 184 and an STS (Soft Touch Sensor) 185 both are connected to the fixing device. The fuser outlet sensor 184 is employed to detect whether the copying paper is discharged on the discharge tray without being accidentally rolled in between both the rolls 66, 67 after it is passed between the heat roll 66 and the pressure roll 67. The STS 185 is the temperature sensor of the fuser lamps 181, 182.

(5-5) Control of console.

Referring to FIG. 11 again, the control of the console will be described.

A console control unit 191 is provided with a message ROM 192 for displaying messages in alphabet. The IC card device (IC card reader/writer) 22 for reading and writing the IC card 131 (FIG. 6) and connecting the editor pad 132 (FIG. 6) via an interface board 193 can be connected thereto. The IC card device is, as described above, controlled by the card CPU 129 (FIG. 6). The console control unit 191 is connected to a main board 201 with the aforesaid main CPU 121 mounted thereon.

(5-6) Billing counter.

Figure 12:
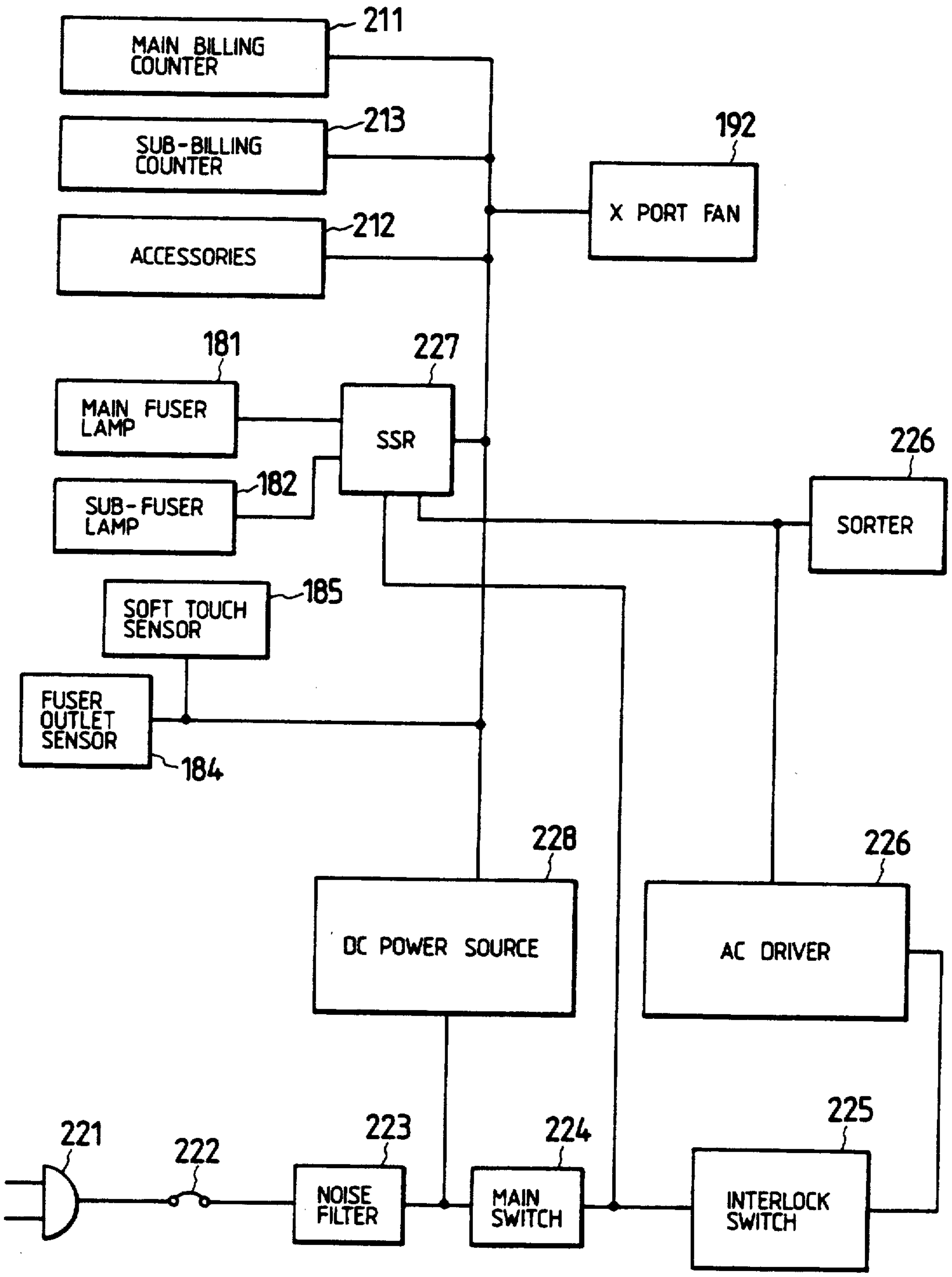

Referring to FIG. 12, a description will be given of a billing counter for use in collecting copying charges.

As the base machine 21 in this embodiment is capable of making copies in five colors, two kinds of billing counters are installed. A main billing counter 211 counts the number of copies taken, irrespective of the color. The values counted by the main billing counter 211 are employed as data for use in controlling counts even when accessories 212 such as a coin kit and a key counter are fitted to this copying machine. A sub-billing counter 213 is used to count the sum of the number of colors used for each color copy taken.

(5-7) Power supply.

Referring to FIG. 12, a power supply will be described.

The base machine 21 is connected to a commercial 100 V power supply. As to those put in overseas markets, it has been arranged that they can be connected to a 115 V/60 Hz or 220 V/50 Hz power supply. The power supplied via a plug socket is given to a main switch 224 through a circuit breaker 222 and a noise filter 223. The power is then supplied from the output of the main switch 224 via an interlock switch 225 to an AC driver 226, a fixing control element 227 and a DC power supply 228. Further, the power is supplied to the DADF 24 and the intermediate tray 33.

The AC driver 226 supplies the power to the following parts at a predetermined timing.

(i) Deelectrifying erase lamp 155 (FIG. 8).
(ii) Exposure lamp 56 and a fan for an optical system (FIG. 11).
(iii) Main fuser lamp 181 and the sub-fuser lamp 182 (FIG. 12).

The DC power supply 228 supplies to the following parts at a predetermined timing:

(1) Interlock switch 225 (FIG. 12).
(2) AC driver 226 (FIG. 12).
(3) High-voltage power supply device 162 (FIG. 8).
(4) Sorter 38 (FIG. 12).
(5) Fuser outlet sensor 184 (FIG. 12).
(6) Element 227 for controlling fixation (FIG. 12).
(7) Accessories 212 (FIG. 12).

Accessories includes a coin kit for having copies taken using, e.g., coins and a key counter for controlling copying-making operation in each section.

(8) Main billing counter 211 and a sub-billing counter 213 (FIG. 12).
(9) X-port fan 192 ( FIG. 12 ); a vacuum fan for sucking the copying paper conveyed in a conveyer passage called an X-port.
(10) Inter-image lamp controlled 157 (Fog. 8).
(11) Carriage motor 171 (FIG. 11).
(12) Registration sensor 172, density control sensor 173, lens mirror sensor 174 and mirror motor 175 (FIG. 11).
(13) Original sensor 178 (FIG. 11).
(14) Ink lease switch 159, air detecting sensors of sub-developing devices 59S1～59S4 and main developing device 59M and development selecting solenoid 161 (FIG. 8).
(15) Main board 201 (FIG. 8, etc.).

(5-9) Conveyer system.

Figure 13:
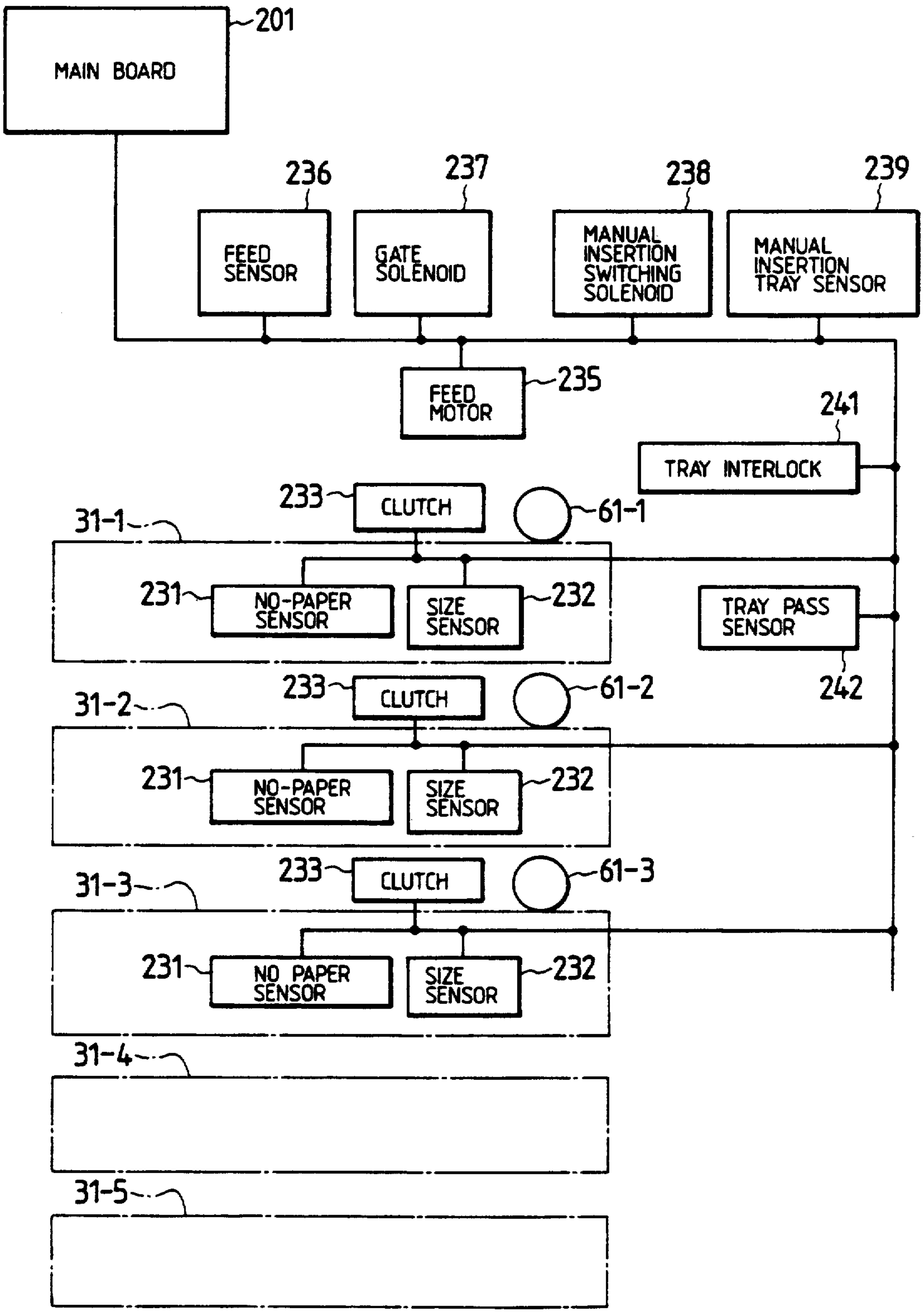

Referring to FIG. 13, a conveyer system for conveying copying paper will be described.

The first～fifth feed trays 31-1～31-5 are provided with no-paper sensors 231, size sensors 232 and clutches 233, respectively. The no-paper sensors 231 are used to detect the presence or absence of copying paper on the feed trays 31-1～31-5. Copying paper of the same size can be set on the plurality of feed trays in this copying machine and copying paper of the same size is automatically supplied from another feed tray when no copying paper is present on one of the feed trays. The size sensor 232 is used to identify the size of copying paper placed on the tray. The clutch 233 is a component part for controlling the on/off state of each of the feed rolls 61-1, 61-2 . . . being drive.

Copying paper is fed by a feed motor 235 for special use in feeding the paper. A step-motor is used as the feed motor 235. A feed sensor 236 detects whether copying paper is being properly conveyed. A gate solenoid 237 is used to true up the front edges of sheets of copying paper sent out once. The gate solenoid 237 is different from an ordinary type and use to control copying paper in such a manner that the paper is passed as it opens when energized.

More specifically, power is not supplied to the gate solenoid 237 in the standby state in which no copying paper arrives thereat and the gate is kept open. Power is then supplied to the gate solenoid 237 slightly before the arrival of copying paper and the gate is shut to check the passage of the copying paper. The gate solenoid 237 is subsequently deenergized and opened at the point of time the copying paper is conveyed again at the predetermined timing. The gate solenoid 237 is so controlled that its position less fluctuates at the point of time the front edge of copying paper is held in check. The copying paper is thus accurately positioned even while it is relatively strongly pressed against the gate solenoid 237.

A manual insertion switching solenoid 238 is used to switch the driving of a carrier roller for conveying copying paper sent out from the first feed tray 31-1 and a carrier roller for conveying copying paper manually fed from the tray 41 for manual insertion. A manual insertion tray sensor 239 detects the presence of copying paper when sheets of copying paper are fed from the tray 41 for manual insertion. A tray interlock switch 241 is fitted to a mechanism operated to remove the copying paper blocked. A tray pass sensor 242 detects the copying paper 60 supplied from the second and third feed trays 31-2, 31-3 and arranged near the connection of the base machine 21 and the feed trays 31-2, 31-3.

(5-9) DADF.

Figure 14:
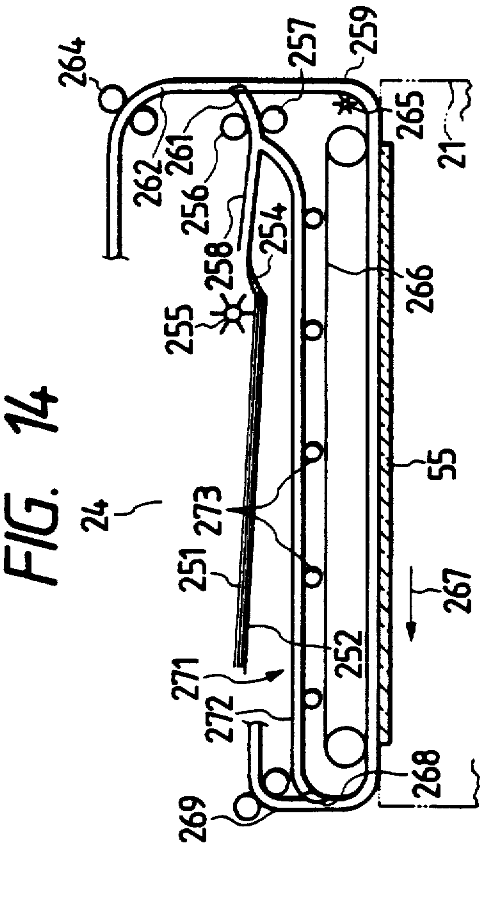

Referring to FIG. 14, the DADF 24 2ill be described in detail.

The DADF 24 is mounted on the platen glass plate 55 of the base machine 21 and provided with an original tray 252 on which originals 251 are placed. Originals 251 are piled on the original tray 252 in such a manner that the first side of each from which a copy is taken faces down.

A return pad 254 and a feed paddle 255 are disposed on one side of the original tray 252 from which originals 251 are sent out one after another. The original 251 thus fed is moved by a driving roller 256 and a driven roller 257 and passed through an S-shaped conveyer 258 before being pressed against a branch guide 261 arranged in the position where the S-shaped conveyer 258 and a vertical conveyer 259 intersect. The branch guide 261 is opened thereby and the original 251 is sent to an inverted conveyer 262.

When the rear end of the original 251 passes through the branch guide 261, the branch guide 261 is stopped on the S-shaped conveyer 258 side because of the action of a spring (not shown). Then the passage of the original 251 is detected by a sensor (not shown) arranged close to the branch guide 261. A driving roller 264 for inverting the original responds to the detection signal output and turns inversely. As a result, the direction in which the original 251 is conveyed is inverted and changed to what is roughly perpendicular to the platen glass plate 55.

The original 251 is being conveyed while one side of the original abuts against a side positioning guide (not shown) and thus adequately positioned. The original is further carried by an endless conveyer belt 266 up to a proper position on the platen glass plate 55. In this manner, a copy of the first side of the original 251 is taken.

After the completion of exposure of the first side, the original 251 is conveyed by the endless conveyer belt 266 in direction of arrow 267. When one side only is copied, a vertical conveyer 269 is selected by a guide on the outlet side and the original 251 is received by an original receiving part 271.

If the second side opposite to the first one is copied, a horizontal conveyer 272 is selected. The original 251 fed onto the horizontal conveyer 272 is conveyed by a carrier roller 273 in the direction opposite to the arrow 267 and further conveyed by the driving roller 256 and the driven roller 257 to the S-shaped conveyer 258. At this time, the underside of the original 251 is the second side which is opposite to the first side of the original placed on the original tray 252. Accordingly, the second side is copied when the original 251 is sent to the platen glass plate 55.

The original 251 is sent to the vertical conveyer 269 by the action of the guide 268 on the outlet side after the exposure of the second side and discharged onto the original receiving part 271.

(5-10) Sorter.

Figure 15:
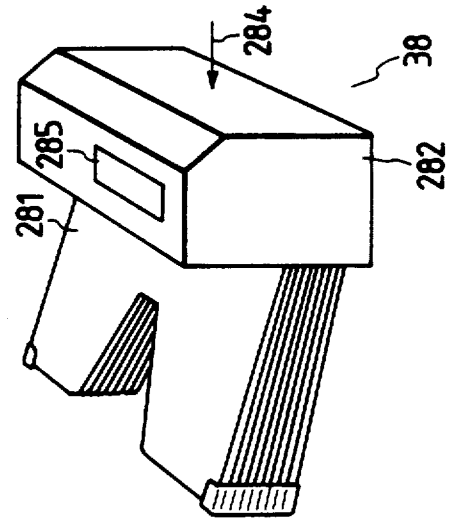

Referring to FIG. 15, the 10-bin sorter 38 will be described in detail.

FIG. 15 is an external view of the sorter. The 10-bin sorter 38 is constructed so that 10 sheets of bins 281 are integrally moved up and down. The sorter proper 282 consists of a driving source (bin motor) for moving them up and down, a cam and a cam switch for controlling the movement of each bin, and a down limit switch (both not shown) for detecting the arrival of the bins 281 at the lowest limit position.

Copying paper 60 is moved by the carrier rolls 68, 68 shown in FIG. 4 in direction of arrow 284 and fed into the sorter proper 282 and, at this point of time, discharged onto the bins located opposite to the conveyer passage. Some sorters are designed to switch the discharge passage by not moving the bins 281 but the sorter proper 282. Mode selection in the sorter 38 is effected by operating the panel 74 for a sorter shown in FIG. 5.

(5-11) Intermediate tray.

The intermediate tray 33 will subsequently be described.

Figure 16:
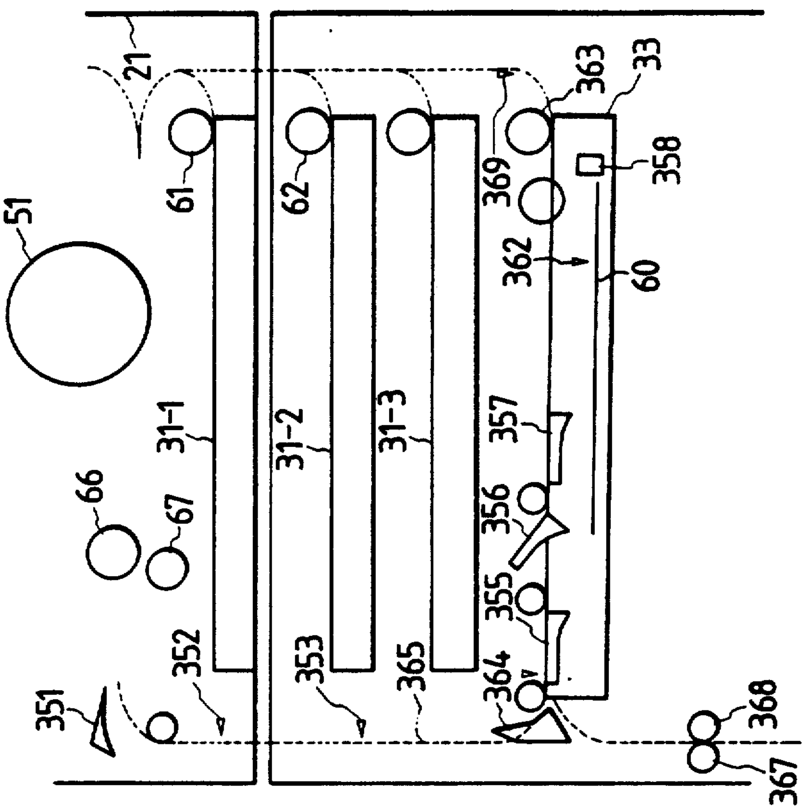

FIG. 16 shows the conveying system centering around the intermediate tray 33.

The copying paper 60 heat-fixed by the heat roll 66 in the base machine 21 is controlled in such a manner that it is discharged by a duplex gate solenoid installed in the base machine 21 onto the discharge tray or sent to the intermediate tray 33. A first duplex pass sensor 352 is disposed on the base machine 21 side, whereas a second duplex pass sensor 353 is located close to the second feed tray 31-2, the pass sensors being used to detect whether or not the copying paper 60 approaching the intermediate tray 33 is blocking the passage.

No feed roll for feeding the front edge of copying paper 60 up to the front edge of the tray is provided for the intermediate tray 33. As a result, three duplex solenoid gates 355~357 for carrying the copying paper 60 received up to a desired position, depending on this size, and "dropping" the paper onto the tray are provided. These duplex solenoid gates 355~357 have the solenoids operate selectively, depending on the size of the copying paper received, so that the corresponding gate opens or closes. A skew-roll solenoid gate 358 controls the copying paper 60 thus dropped in such a manner that one corner of the front edge thereof is caused to abut against the front edge of the intermediate tray 33 and uniformly arranges the front edges of sheets of copying paper received. Each time that operation equivalent to one sheet of paper is completed, the main billing counter 211 counts the value upward.

As already described, the intermediate tray 33 is controlled by the CPU 128 for controlling trays and copying paper is conveyed under the control of the duplex motor 361 (FIG. 8). A duplex no-paper sensor 362 is used to detect the presence or absence of copying paper 60 on the intermediate tray 33. A duplex clutch 363 is a mechanism for turning on/off the driving source feeding copying paper 60.

An inverter gate solenoid 364 is used to switch the operation to take duplex copies, make marking with a plurality of colors or to obtain synthesized copies. While the inverter gate solenoid 364 is directed as shown in FIG. 16, the copying paper 60 conveyed downwardly through a conveying passage 365 is guided by the inverter gate solenoid 364 and dropped before being conveyed upwardly by carrier rolls 367, 368. The direction in which the copying paper 60 has been conveyed is turned right in FIG. 16 before the inverter gate solenoid 364 and the paper is placed on the intermediate tray 33 with upside down. A duplex copy is taken if the conveyance of the copying paper in that state is restarted.

On the other hand, if the direction in which the copying paper 60 has been conveyed downwardly is turned right in FIG. 16 before the inverter gate solenoid 364, the copying paper 60 is placed with its surface side up again. A copy is then taken again on the same side if the conveyance of the copying paper in that state is restarted. When marking is made with N kinds of colors, one sheet of copying paper is normally put on the intermediate tray 33 N times and then subjected to monochromatic development before being discharged.

A duplex feed sensor 369 detects whether the copying paper sent out of the intermediate tray 33 has become lodged.

(5-12) Editor pad.

Figure 17:
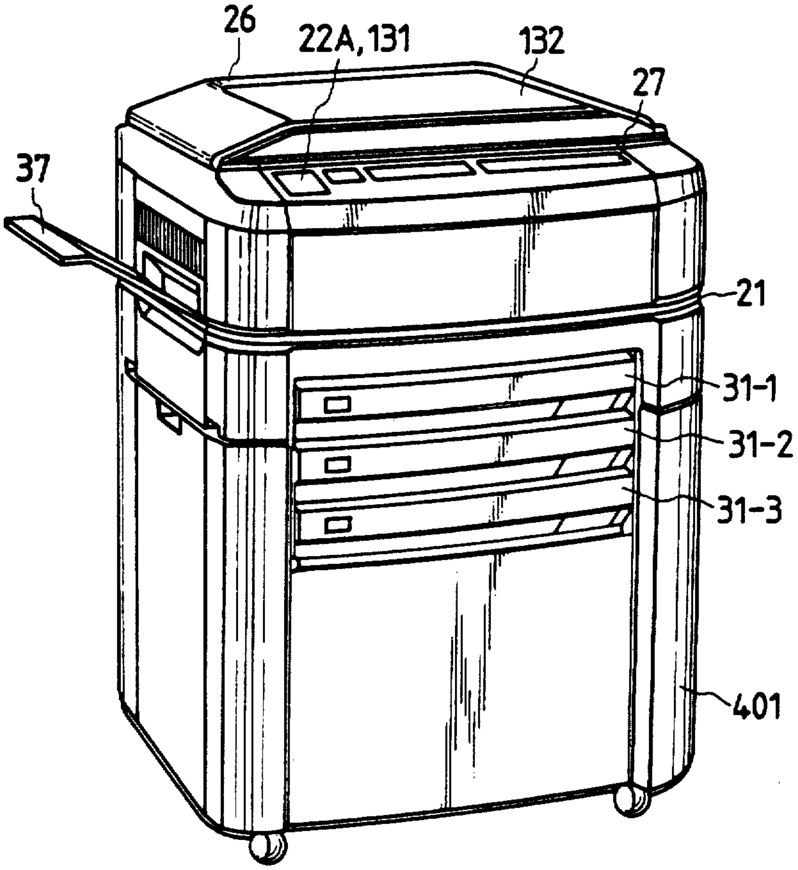
Figure 18:
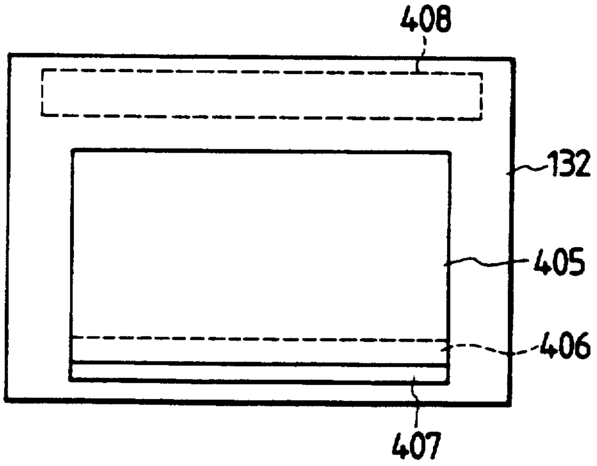

Referring to FIGS. 17 and 18, an editor pad 132 will be described in detail.

FIG. 17 shows the system configuration of a copying machine with an editor pad. More specifically, because the copying machine embodying the present invention is equipped with the DADF 24 mounted on the platen glass plate 55 as shown in FIG. 3, the platen 26 with an editor pad cannot be mounted thereon.

In the copying machine shown in FIG. 17, the platen with the editor pad is mounted on the base machine 21. The editor pad 132 is located in a square portion in FIG. 17. This copying machine is provided with a back lit type console panel. Moreover, a cabinet 401 containing only the second and third feed trays 31-2, 31-3 is arranged under the base machine 21. The base machine 21 is fitted with no sorter and the discharge tray 37 for receiving the discharged copying paper is installed. An IC card device 22A is disposed near the left end of the panel surface where the console panel is placed and the IC card 131 can be set thereon. An IC card incorporating a liquid crystal display plate is usable as a display plate while it is set in the IC card device so that a display function can be newly installed in a copying machine or added to a copying machine lacking in the display function.

As to the general construction of the copying machine, see FIG. 2. The editor pad 132 is extremely convenient for an coordinate input and usable as an independent unit for the copying machine shown in FIG. 3 as an embodiment of the present invention. In this case, the editor pad 132 may be placed on a desk or the like and directly connected to the IC card device 22 (FIG. 3) with a cord or coordinate data may be written to the IC card 131, which is then counted on the IC card device 22 for use.

FIG. 18 illustrates the construction of the editor pad. The editor pad 132 is provided with a rectangular coordinate input pad 405 which is 307 mm long and 432 mm wide. An area 10 mm wide on this side of the pad is employed as an editor panel 406. The editor pad 132 including the editor panel 406 is such that a first rubber pad with a resistance wire for designating a position on the abscisa and a second rubber pad with a resistance wire for designating a position on the ordinate are super posed with a spacer sandwiched therebetween. The position pressed by the finger of the operator or tip of a pen is sensed in the form of values on the abscisa and ordinate. On this side of the editor panel 406 is a display panel 407 for displaying various kinds of data. Moreover, a circuit board for processing coordinate data and a circuit board 408 for an interface circuit are disposed in the rear portion of the editor pad 132.

Figure 19:
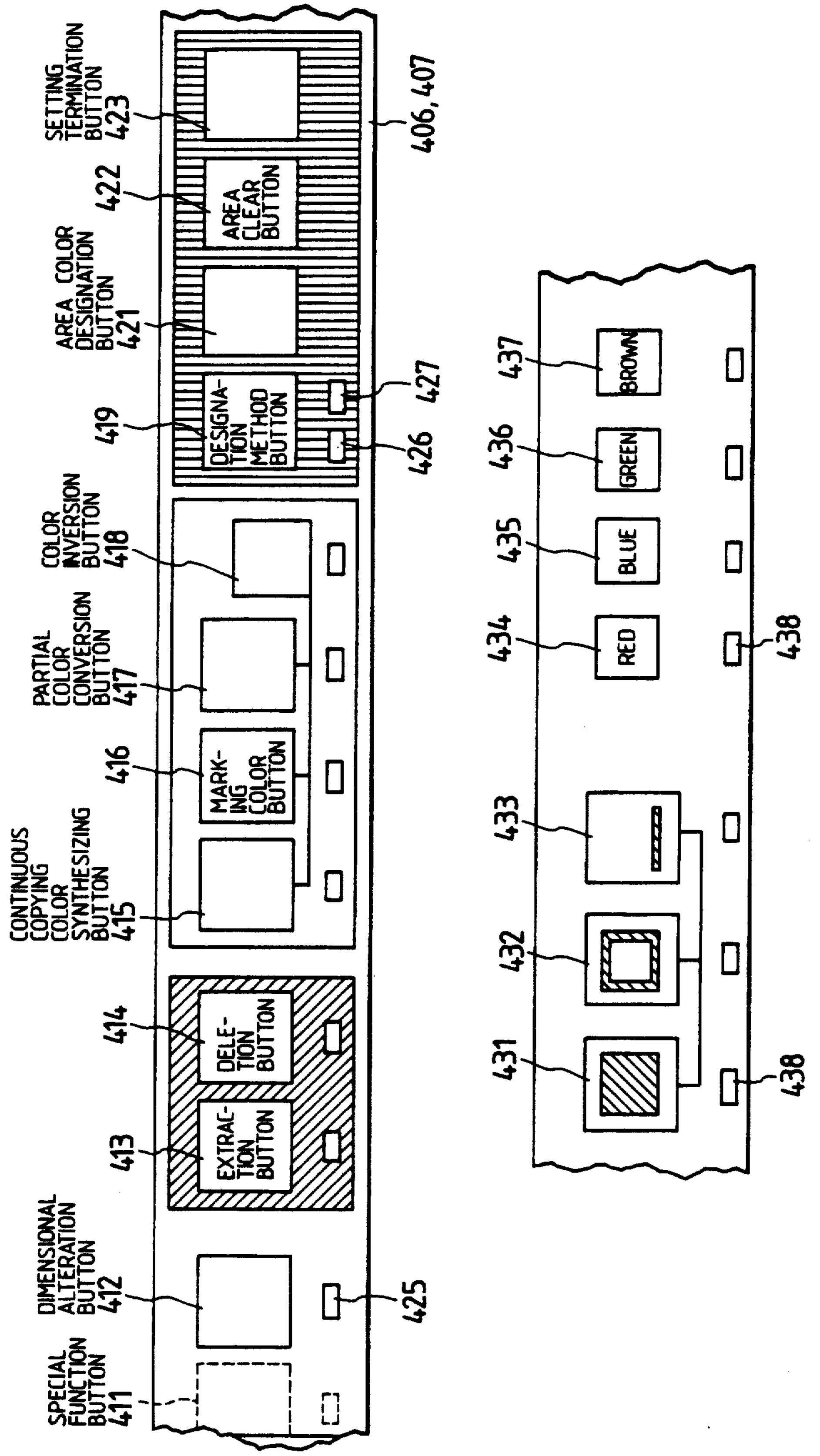

FIG. 19 shows the editor panel illustrated in FIG. 18 and the principal part of the display panel. The following buttons are disposed on the editor panel 406:

(i) Special function button 411 for use when special functions are employed.
(ii) Button 412 for dimensional alteration and redoubling, and used to specify contraction and magnification by designating distances.
(iii) Extraction button 413 for extracting the area specified, and used for monochromatic recording.
(iv) Deletion button 414 for deleting the area specified, and also used for monochromatic recording.
(v) Continuous copying color synthesizing button 415, which is a function button for specifying the function of continuous copying color synthesizing.
(vi) Marking color button 416, which is a function button for specifying the function of marking color.
(vii) Partial color conversion button 417 used to specify the function of converting partial color.
(viii) Color inversion button 418 used to convert the area specified by color to black and the area specified by black to color.

The continuous color synthesizing button 415, the marking color button 416, partial color conversion button 417 and the color inversion button 418 are all function buttons for color recording.

(ix) Designation method button 419 used to choose whether an area is specified with the coordinates of two points at both ends of a diagonal line of a rectangle or the coordinates of each point of a polygon.
(x) Area.color designation button 421 used when an area is specified.
(xi) Area clear button 422 used to release the designation of an area.
(xii) Setting termination button 423 used when the designation of one or plurality of areas is completed.

To the display panel corresponding to the first 8 buttons 411~418 are attached display lamps 425 for displaying whether respective 8 buttons 411~418 have been selected. As for the designation method button 419, a diagonal designation lamp 426 or a polygon designation lamp 427 is lit, depending on the designation selected.

(xiii) Normal marking button 431 used to specify the normal marking form for uniformly marking an area.
(xiv) Side marking button 432 used to mark, e.g., the specified area enclosed with a frame.
(xv) Line marking button 433 used to mark, e.g., the specified area like a thick underline.
(xvi) Color designation buttons 434~437 for specifying a color relative to a marking area because the marking color can be determined independently on an area basis. In this case, the color designation button 435 is used to specify red and the color designation button 435 to specify blue. The color designation button 436 is employed to specify green and the color designation button 437 to specify light brown. As set forth above, the copying machine in this embodiment permits colors other than the above-described ones to be set and, in this case, top covers attached to the surface of the color designation buttons 434~437 will have to be replaced with desired ones, respectively. Display lamps 438 are annexed to the buttons 431~437 for special use in marking, which have been described in (xiii)~(xvi), respectively, in order to display which one of the lamps has been selected.

(5-13) Large capacity tray.

A large capacity tray 471 in place of the fourth and fifth feed trays 31-4. 31-5 can be set in this copying machine. Although the construction of the copying machine in this embodiment is different from what includes the large capacity tray, a brief description thereof will subsequently be given.

Figure 20:
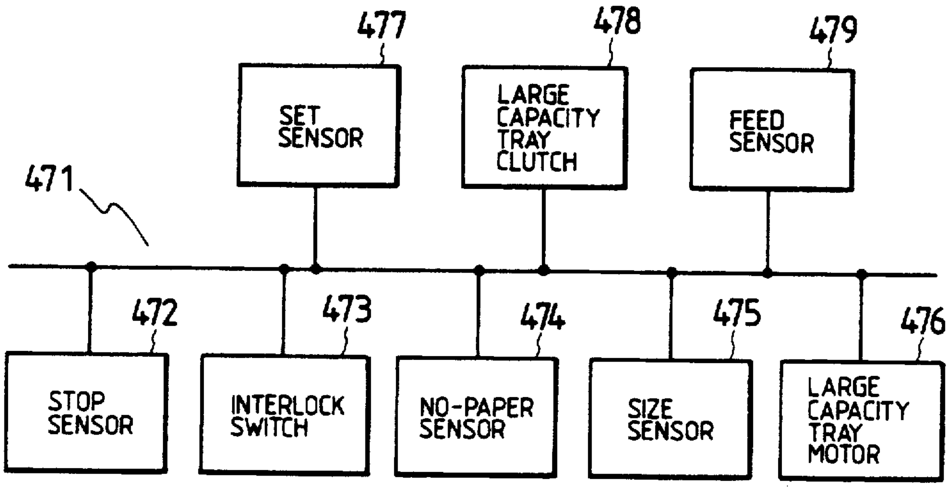

FIG. 20 is a block diagram illustrating the circuit configuration of a large capacity tray.

The large capacity tray 471 is employed to set 1,000~2,000 sheets of copying paper at a time and a number of copies can be taken without interruption. The large capacity tray 471 is equipped with the following circuit components. The large capacity tray 471 is supplied with alternating current from the output of the noise filter 223 shown in FIG. 8 and direct current from the DC power supply 228 via the main board 201 shown in FIG. 8 and operates these circuit components.

(i) Stop sensor 472.

A sensor fitted to the large capacity tray 471 equipped with an elevator mechanism for moving copying paper up and down and used to detect the lower limit position.

(ii) Interlock switch 473.

An interlock switch fitted to the front panel of the large capacity tray 471 and used to detect the opening and closing of the panel.

(iii) No-paper sensor 474.

A sensor for detecting that sheets of the copying paper contained are running short.

(iv) Size sensor 475.

A sensor for identifying the sizes of copying paper.

(v) Large capacity tray motor 476.

A motor for driving the elevator mechanism of the large capacity tray to move its copying paper container up and down.

(vi) Set sensor 477.

A sensor for detecting the upper limit position of the large capacity tray 471 equipped with the aforesaid elevator mechanism.

(vii) Large capacity tray clutch 478.

A clutch for controlling the feeding of copying paper.

(viii) Feed sensor 479.

A sensor for detecting the copying paper fed from the large capacity tray 471 but lodged in.

(6) Control of copying machine by IC cards.

(6-1) Kinds of control data.

Figure 21:
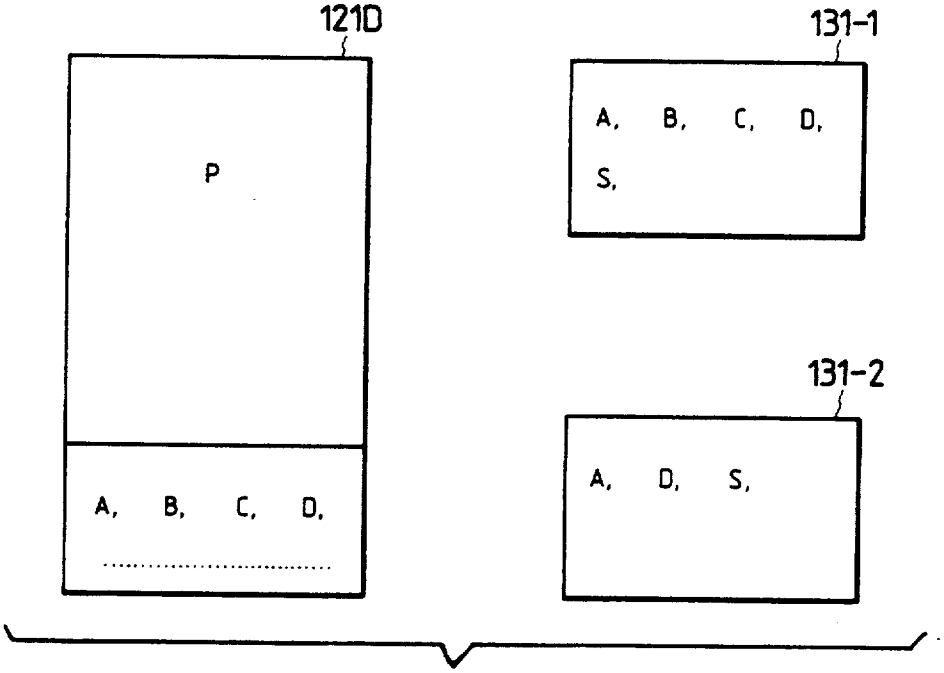

Next FIG. 21 shows the relation between basic control data and additional control data in the copying machine in this embodiment. As shown in FIG. 21, a ROM 121D is used to store a program P needed for the basic control of the copying machine including controlling the copying paper conveyer system and exposure, and programs Ao, Bo, Co, Do . . . for the execution of miscellaneous developments and variations, the programs constituting the basic control data as a whole.

On the other hand, the IC card has a plurality of forms, depending on the kind of additional control data stored therein. A first IC card 131-1, for instance, stores up programs $A_1$, $B_1$, $C_1$, $D_1$ and $S_1$, whereas a second IC card 131-2 keeps programs $A_2$, $D_2$ and $S_2$.

(i) The program A relates to contraction and magnification. The program Ao as the basic control data relates to one kind of fixed magnification (100%, equimultiple). the program $A_1$ among them as the additional control data stored in the first IC card 131-1 further includes control data for use in setting optional magnifications ranging from 200% to 50% with 1% as a shift unit, in addition to a fixed magnification. Moreover, the program $A_2$ as the additional data stored in the second IC card 131-2 further includes control data for use in setting 11 kinds of contractions and magnifications (50%, 61%, 70%, 81%, 86%, 93%, 115%, 11%, 141%, 163%, 200%).

(ii) The program B relates to the forms of copying originals. The program Bo among them as the basic control data relates to normal copying and one side copying by means of the ADF 23 and the DADF 24. The program $B_1$ as the additional control data stored in the first IC card 131-1 further includes control data for making feasible the function of copying two double-spread pages of a bookbinding original successively (continuous copying function) and that of copying both sides by the DADF 24. The program B is not added to the second IC card 131-2.

(iii) The program C relates to developing forms. The program Co among them as the basic control data deals with the control of one color development by means of the main developing device 59M or subdeveloping device 59S. The program $C_1$ as the additional control data stored in the first IC card 131-1 includes control data for use in preparing a two-color or multicolor document as in marking color processing for marking a specific area of an original with color. The program B is not added to the second IC card 131-2.

(iv) The program D relates to the forms of inputting coordinate data for use in marking color processing. The program Do among them as the basic control data deals with the control of coordinate input using the ten keys 80. The program $D_1$ as the additional control data stored in the first IC card 131-1 includes control data which permits coordinate data input by not only the ten keys 80 but also the editor pad 132 and other IC cards. Moreover, the program $D_2$ as the additional control data stored in the second IC card 131-2 includes control data which permits coordinate data input by not only the ten keys 80 but also the editor pad 132. With respect to the marking color processing, Japanese Patent Application No. 116918/87 dated May 15, 1987 by the present applicants and entitled "Marking Color Apparatus" discloses the details of such processing in the specification and drawings thereof.

(v) Program S relates to the commencement of copy-taking operation. The basic control data without the program S in storage permits the commencement of copy-taking operation only during operating hours a day from, e.g., 9 o'clock up to 12 o'clock in the morning and from one o'clock up to 5 o'clock in the afternoon. In other words, no copies can be taken during a noon recess and overtime work, so that copies of confidential or private papers and prevented from being pirated during those hours. The program $S_1$ and the additional control data stored in the first IC card 131-1 imposes no restriction on operating time relative to copy-taking operation. Moreover, the program $S_2$ as the additional control data stored in the second IC card includes data for use in writing data to the IC card 131-2 itself on the prohibition against copy-taking operation after 7 o'clock in the afternoon and data on the date, time and the number of paper sheets on the day copies are taken.

Admittedly, the first IC card 131-1 stores a range of programs wider in application than the range thereof stored in the second IC card 131-2. The surface of the first IC card 131-1 is colored golden, for instance, and thus distinguishable from the second IC card 131-2 colored silver. In this copying system, a third IC card 131-3 (not shown) with its surface colored green is provided and used to materialize other functions such as the self-diagnosis of the copying machine.

Functions usable via each storage medium such as an IC card, simultaneously with a symbol representing the post of an employee, e.g., a division or section manager or a clerk may be displayed on the surface thereof. On the surface of the storage medium, for instance, if the symbol and [ALL] are indicated, all the functions are usable at any time;

if the symbol and [CONTRACTION/MAGNIFICATION, ADF, HCF, DUPLEX] are indicated, the contraction and magnification, and the use of the ADF 23 and the DADF 24 are possible but any functions other than those specified are not usable.

(6-2) Flow of control.

As set forth above, the functions of this copying machine are altered according to the IC card 131 set in the IC card device. Accordingly, a proper copying form is implemented on the part of the individual owner of the IC card 131.

Figure 22:
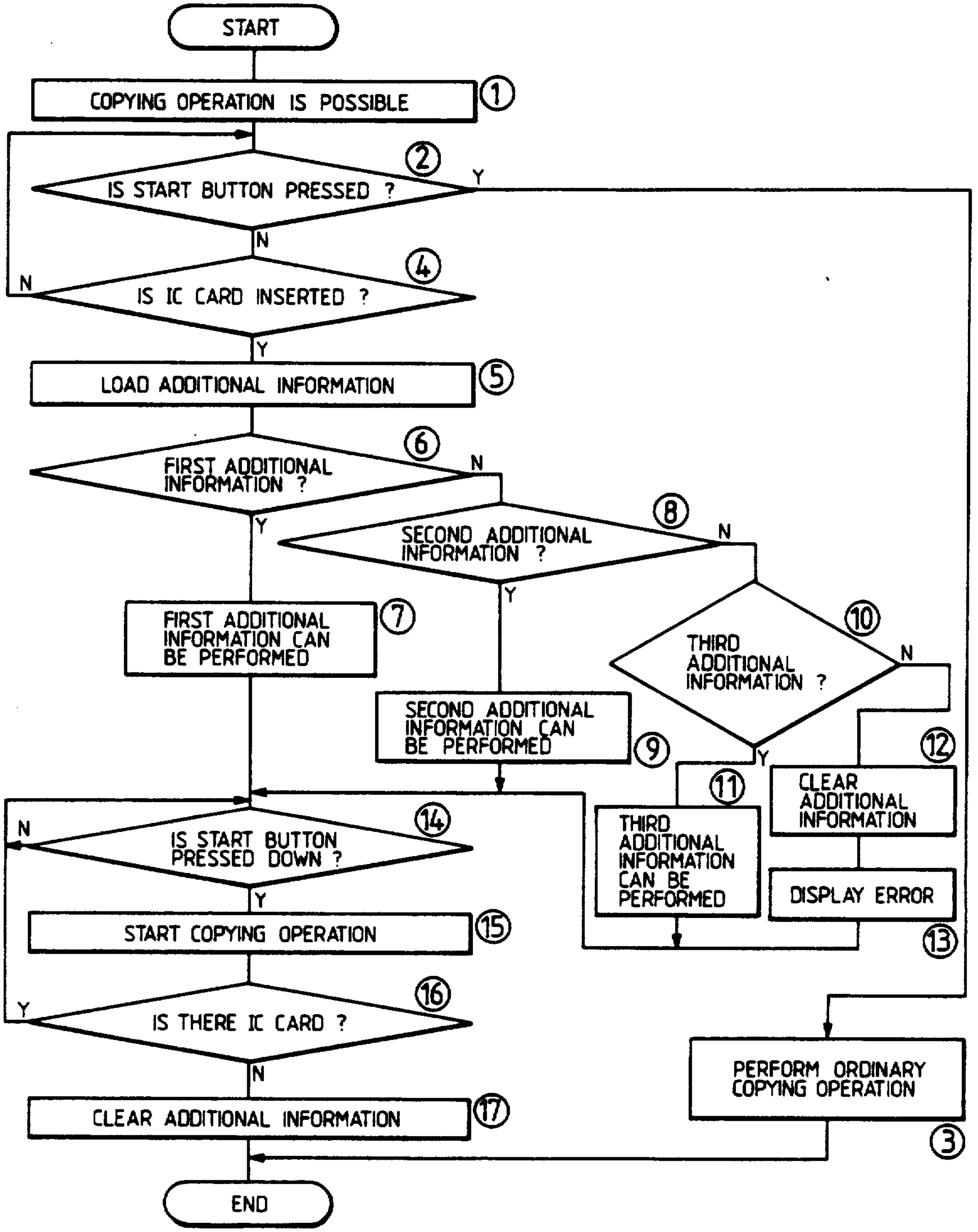

FIG. 22 is a flowchart illustrating the operation of writing the additional control data by inserting the IC card. When the power is supplied to the copying machine in this embodiment, there appears a display "Start Copy-Taking" on the liquid crystal display of the console panel 28 after the passage of predeterminal time and copy-taking operation becomes possible (Step 1). If the start button 117 is pressed in that state (Step 2, Y), the operator will be able to perform the normal copy-taking operation based on the basic control data (Step 3).

On the other hand, if the operator inserts the IC card 131 into the IC card device 22 in that condition (Step 4, Y), the card CPU 129 (FIG. 6) detects the insertion and reads the additional control data stored in the IC card 131. The additional control data thus read out is sent to the RAM 121E of the main CPU 121 by the large capacity transmission method and stored therein (Step 5). When first IC card 131-1 is inserted into the IC card device 22, the first additional control data is loaded (Step 6, Y). In other words, the programs $A_1$, $B_1$, $C_1$, $D_1$ and $S_1$, are written as the first data as described by reference to FIG. 21 and the copying machine is put in the mode in which it can execute these programs (Step 7). When the second IC card 131-2 is inserted into the IC card device 22, the second additional control data is loaded (Step 8, Y). That is, the programs $A_2$, $D_2$ and $S_2$ are written to the RAM 121E as the second data and the copying machine is in the mode in which it can execute these programs (Step 9). Further, when the third IC card 131-3 (not shown) is inserted into the IC card device 22, the third additional control data is loaded (Step 10, Y). That is, the program for use in the self-diagnosis of the copying machine and the program on the copying-taking operation incidentally required at the time of maintenance inspection are written to the RAM 121E as the third data and the copying machine is in the mode in which it can execute these programs (Step 11).

Assuming the copying machine is capable of receiving only the first third IC cards 131-1~131-3, the data deemed to be additional control data at the time of the insertion of any cards other than those above-described is cleared from the RAM 121E (Step 12), whereas an error display together with precautionary information to the effect that the copying machine operates with the basic control data are displayed on the liquid crystal display 112 of the console panel (Step 13).

When the aforesaid operations are completed, the copying machine monitors the action of the start button 117 (Step 14) and, when the button is pressed down, starts copy-making operation (Step 15). If the setting of the first IC card 131-1 is confirmed at that time, it becomes possible to take copies at the aforesaid optional magnification or make use of the continuous copying function or to provide color marking for the specified portion of an original. Even if attempts are made to take copies in the nighttime by inserting an IC card other than what is designed for use in this copying machine, an error display, simultaneously with "Restricted Time for Copy-Taking", appears on the liquid crystal display, and copy-taking operation is prohibited outside the prescribed time zone as in the case where the IC card is not inserted.

After completion of a series of copy-taking steps, the card CPU 129 checks whether the IC card 131 remains inserted in the IC card device (Step 16). If the IC card 131 remains inserted (Y), the CPU 129 keeps the additional control data loaded and is ready for the succeeding part of the copy-taking operation. When the IC card 131 is found extracted (N), on the contrary, the additional control data in the RAM 121E is cleared and the copying machine is caused to restore the functions innate in it (Step 17).

(6-3) Example of control in detail.

A detailed description will now be given of an example in which the IC card 131 is set in the IC card device 22 in order to perform the copy-taking operation by altering the contraction/manification ratio.

Figure 23:
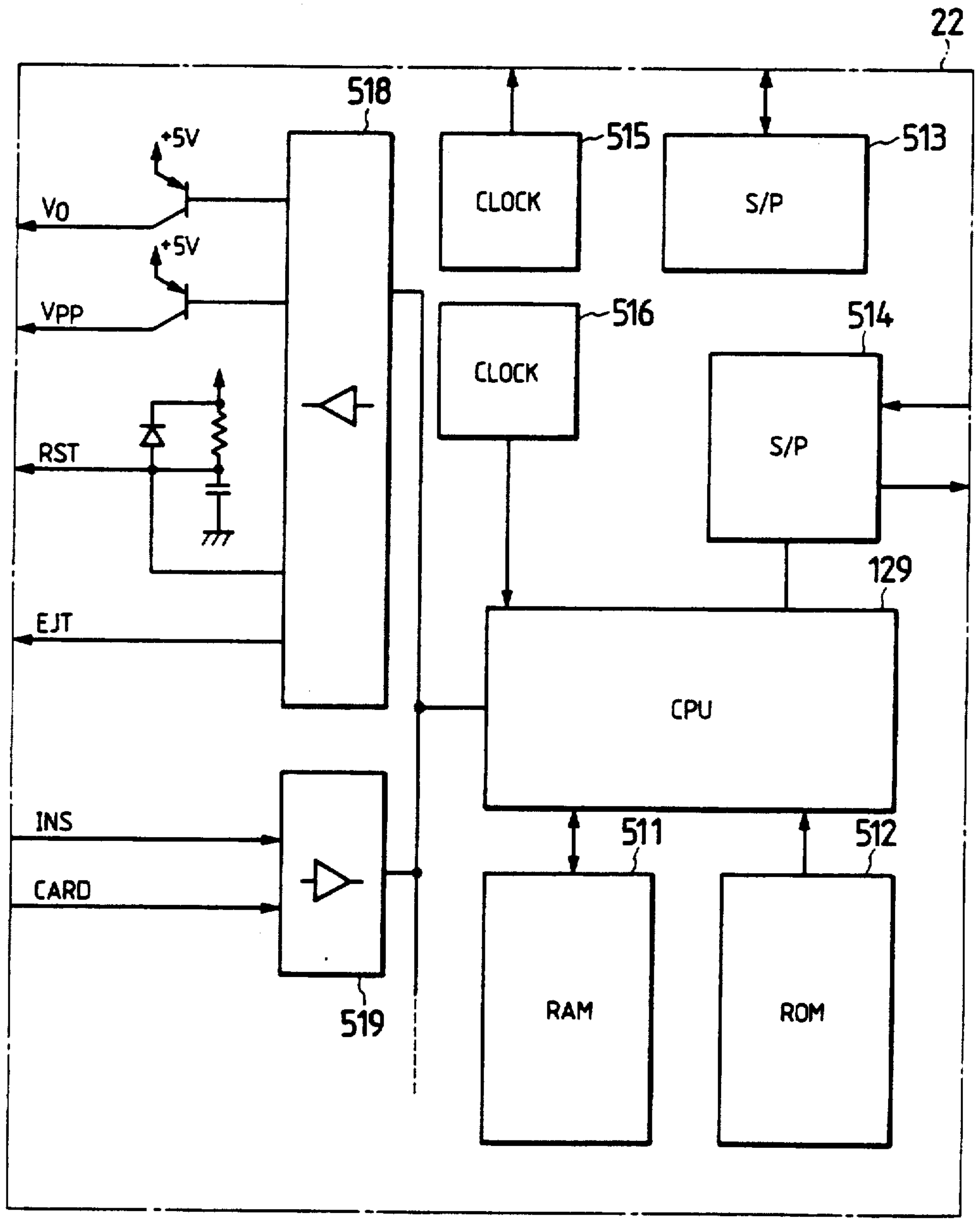

FIG. 23 shows the principal part of a circuit configuration in the connection of the IC card with the IC card device. The IC card device 22 is, as shown in FIG. 6, provided with the card CPU 129. The card CPU 129 is equipped with a RAM (Random Access Memory) 511 having a storage capacity 4K bytes and a ROM (Read Only Memory) 512 having a storage capacity of 4K bytes. The ROM 512 is a memory for storing a program for controlling the IC card device 22, whereas the RAM 511 is a scratch pad memory for temporarily storing various kinds of data.

The card CPU 129 is connected to two serial/parallel converters 513, 514. The first serial/parallel converter 513 exchanges serial data with the IC card set in the IC card device 22 and also exchanges parallel data with the card CPU 129. The second serial/parallel converter 514 exchanges serial data with the base machine 21 and, by effecting serial/parallel conversion or parallel/serial conversion, exchanges parallel data with the card CPU 129. Two clock generating circuits 515, 516 are provided in the IC card device 22. The first clock generating circuit 515 supplies a clock signal of 4.9152 MHz to the IC card, whereas the second clock generating circuit 516 supplies a clock signal of 7.3728 MHz to the card CPU 129.

The card CPU 129 supplies voltages Vo and $V_{pp}$ via an output port 518 to the IC card and also supplies a reset signal RST. Moreover, the card CPU 129 receives an insert signal INS and a card signal CARD from the IC card via an input port 519.

Figure 24:
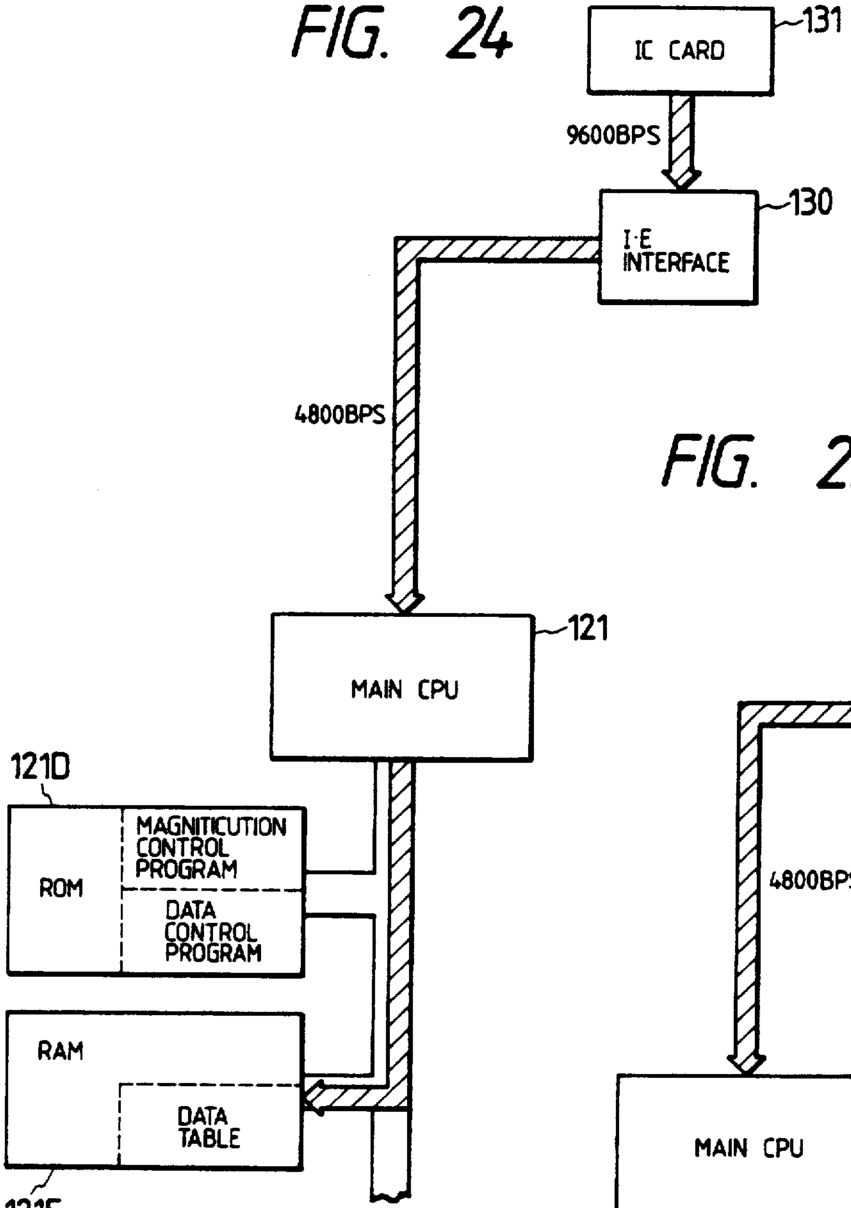

FIG. 24, which corresponds to FIG. 7, illustrates the flow of data read while the IC card 131 is set in the IC card device. When the IC card 131 is set in the IC card device 22, the base machine 21 detects the setting thereof and starts reading the data at predetermined timing. At this time, the data is transferred from the IC card 131 to the IC card device at a transfer speed of 9,600 BPS (Bits Per Second). That speed is converted into 4,800 BPS in the IC card device 22 so that the data is transfer in mass to the main CPU 121 as serial data. By the mass transfer is meant that the main CPU 121 specializes in exchanging the data with the IC card device 22 by temporarily interrupting the exchange of data with each additional device while stopping controlling copy-taking operation on the part of the base machine 21. Japanese Patent Application No. 097440/87 entitled "Serial Communication Control Method", dated Apr. 22, 1987, by the present applicants discloses the details of the mass transfer.

While the additional control data is not stored in the IC card 131, the mass transfer is carried out and the recording function data may be communicated by the normal time sharing transfer. In this case, communication is possible even while the copying machine is operating to take copies.

The program stored in the IC card and fed to the main CPU 121 is stored in the RAM 121E. then the magnification control program stored in the ROM 121D is employed to start magnification control operation, whereas the magnification control parameters written to the RAM 121E are used to start the copy-taking operation with a desired magnification.

When the first IC card 131-1 is set, for instance, a data table of 151 contraction/magnification stages from 50% to 200% with 1% as a shift unit is read and simultaneously the contraction/magnification ratio is so controlled by the shift keys 101, 102 shown in FIG. 5 that the ratio is specified on a 1% shift basis. The data table of 151 contraction/magnification stages includes the following parameters written as values corresponding to the respective stages.

(i) Position data of the optical lens 58 (FIG. 4).

(ii) Position data of the plurality of mirror 57 (FIG. 4).

(iii) Control data of the optical motor for moving the carriage (not shown).

(iv) ON/OFF control data of the inter-image lamp 141 (FIG. 8).

(v) Data for setting the quantity of light of the exposure lamp 56 (FIG. 4).

(vi) ON/OFF control data of the side erase lamp (not shown).

(vii) Timing data of carriage return.

When the contraction/magnification ratio of 55% is selected, for instance, the optical lens 58 moves to the corresponding position and the ON/OFF control timing of the inter-image lamp 141 is determined relative to the size of the original and the quantity of light of on the exposure line 56 is reduced by a predetermined quantity to a equimultiple value.

When the second IC card 131-2 is set in the IC card device 22, further, in place of the aforesaid data table of 151 contraction/magnification stages, a data table of 11 contraction/magnification stages (50%, 61%, 70%, 81%, 86%, 93%, 115%, 122%, 141%, 163%, 200%) is writing to the Ram 121E and, in reference to the 100% fixed magnification ratio already stored in the ROM 121D, the copying machine is controlled within the range of the contraction/magnification ratio. When no IC card is set, the copying machine is capable of making copies of equimagnification (100%). In this case, the data of copies of equimagnification is read from the ROM 121D to have the copy-taking operation conducted. Even if the operator presses the shift keys 101, 102 or the fixed magnification key 103 (FIG. 5), the magnification display 99 (FIG. 55) remains to display 100(%). The design of the copying machine may be changed to display a message reading "Use Card for Selecting Magnification" on the liquid crystal display 112 in such a case.

(6-4) Size of program.

The copying machine in this embodiment employs IC cards as portable storage media. Since the IC card has a relatively large storage capacity, the additional control data is also stored therein as programs for use in controlling the copying machine from various angles to positively make the most of it in this embodiment.

Table 1 as shown below represents some programs that can be stored in the IC card 131 in terms of the kinds of programs and the maximum value of storage capacity required for each program. For each copying machine, necessary programs are selected in consideration of the additional devices being used and expected to be developed in the future and written to the IC card 131. As set forth above, because the IC card 131 for use in this embodiment has a capacity of 32K bytes, a plurality of IC cards may be provided as occasion demands when the number of programs to be stored is large. The programs are then successively loaded from the IC card device 22 or otherwise a plurality of IC card devices are installed. Needless to say, it is possible to use a large capacity IC card and moreover the IC cards may be subdivided by the purposes of use in order to relatively reduce the required additional control data.

TABLE 1

| Kinds of Programs | Maximum Storage Capacity |
|---|---|
| Back lit type console panel | 1K byte |
| Liquid crystal type console panel | 32K byte |
| Console panel with CRT display | 64K byte |
| Interface circuit related to console panel | 2K byte |
| Intermediate tray | 4K byte |
| Fourth and fifth feed trays | 4K byte |
| Large capacity tray | 4K byte |
| Interface circuit related to tray | 2K byte |
| ADF | 4K byte |
| DADF | 4K byte |
| SADF | 4K byte |
| Interface circuit related to original feed device | 2K byte |
| Editor pad | 4K tyte |
| Interface circuit related to editor pad | 2K tyte |

The console panel with the CRT display in Table 1 is constituted by a CRT (not shown in FIG. 2) and a simple console panel or operating board and fitted to the copying machine. When the copy density is set, for instance, a plurality of marks prepared by density degrees are displayed on the CRT and the shift key or cursor is used to choose the copy density desired.

The SADH is a semi-automatic original feed device. If an original is manually inserted from one end of the SADH, it is conveyed up to a predetermined position of ıe platen glass plate at fixed timing and discharged nto the original discharge tray after exposure.

Although not shown in Table 1, if a program in-nded for, e.g., a finisher in addition to the sorter is ored in the copying machine proper, any user in pos-ssion of the finisher is able to attach it to the copying achine. The finisher functions as a device designed to ɔt only sort out sheets of copying paper but also auto-atically bind the copying paper stuck in each bin after ıe completion of sorting by means of a stapler.

(6-5) Transfer of Program.

On the basis of FIG. 25, the transfer of a program as ıe additional control data will be described in detail. If ıe transfer of the control program is made in error, it ill cause the misoperation of the copying machine. crupulous preventive care has therefore been taken for ıe copying machine in this embodiment.

When the IC card 131 is set in the IC card device 22, ıe base machine detects the insertion thereof and starts ading data at the predetermined timing. At this time, ıe data is transferred from the IC card 131 to the IC ırd device 22 at a transfer speed of 9,600 BPS (Bits Per econd). The IC card device 22 stores the data in the AM 511 (FIG. 23) to a predetermined degree in unit ıd checks the data for an error by the CRC method. he IC card device 22 then changes the speed to 4,800 PS, provided no error is found in the data thus trans-rred, and transfers the data in mass to the main CPU 21 as serial data. The mass transfer means the main PU 121 specializes in exchanging the data with the IC ırd device 22 by temporarily interrupting the ex-ıange of data with each additional device while stop-ing controlling copy-taking operation on the part of ıe base machine 21.

The program of the IC card 131 sent to the main CPU 21 is stored in the RAM 121E. The additional devices ı "operating condition" are controlled along the pro-rams thus selected and stored in the ROM 121D after rror checking is made by the BCC method.

The programs stored in the ROM 121D include a job ɔntrol program, a task control program, an input/out-ut control program, etc. The job control program is sed to control the order of executing the job of the rogram stored in the RAM 121E. The tanks control rogram is used to form and cancel the task as a mini-ıum unit of job that can independently be done. Fur-ıer, the input/output data control program is used to ansfer the data in the IC card onto the RAM 121E. he IC card 131 can store various kinds of data such as ıe coordinate data read by the editor pad 132, in addi-on to the programs for the respective additional de-ices. The programs for the additional devices are ored in the program storage area provided in the AM 121E or nonvolatile memory 121F (FIG. 7) for ɔme of them, whereas the various kinds of data are ritten to the data storage area of the RAM 121E (non-olatile memory 121F).

The flow of data from the IC card 131 to the copying ıachine proper has been described above and the data ored in the copying machine proper is also transferred ı mass when it is written to the IC card 131.

Modified embodiment

In the aforesaid embodiment, each IC card is pro-ided with a plurality of functions and, depending on ıe post or job of each owner, an optimum card is to be llotted to the owner, In addition, each IC card may be provided with a single function, so that the right IC card is employed in the right occasion according to the function required. In such a case as this, a function attainable should be displayed with characters on the surface of each IC card; e.g., "For Self-Diagnosis", "For English Message Display", "For Customer Program Function" or the like.

Figure 26:
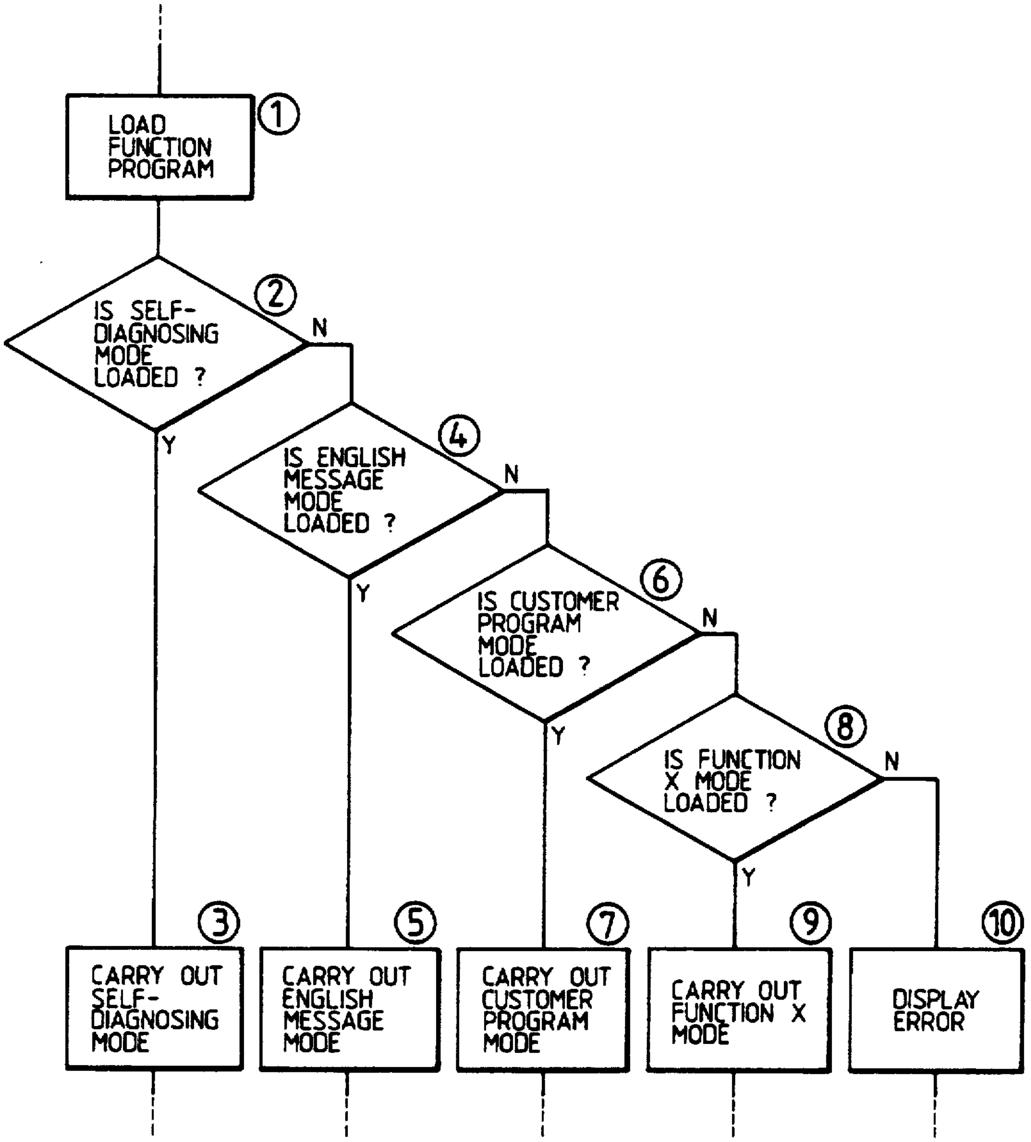
FIG. 26 is a flowchart illustrating the principal part of mode setting operation by means of IC cards in an modified embodiment of the present invention.

FIG. 26 is a flowchart illustrating the principal part of the operating of the copying machine in this case. When the program in the IC card is loaded on the RAM 121E of the copying machine proper (Step 1), the copying machine will be set in the self-diagnosing mode if the self-diagnosing function is loaded (Step 2, Y). In this self-diagnosing mode, the driving of the part specified is controlled by keyboarding the number corresponding to the part through the ten keys 80 shown in FIG. 5 to enable the serviceman to inspect whether the operation thereof is normal (Step 3). The inspection of various components and the adjustment of each parameter are made using the self-diagnosing mode on the production line of copying machines.

Figure 27:
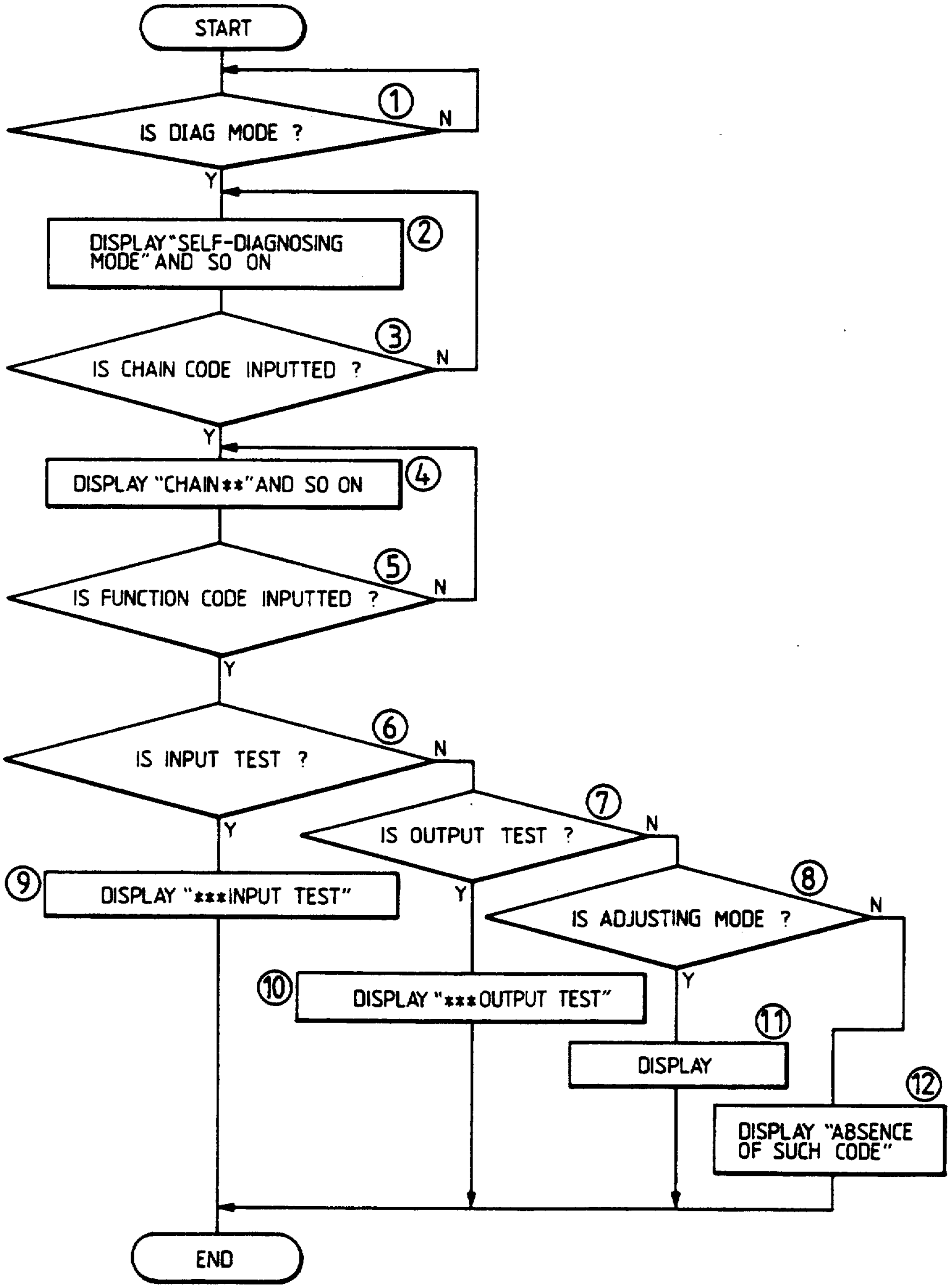
FIG. 27 is a flowchart illustrating self-diagnosing mode setting operation in the modified embodiment thereof.

FIG. 27 is a flowchart illustrating the designation of diagnosing operation in the self-diagnosing mode. When the self-diagnosing mode is set in Fog. 27 (Step 1), "This Is Self-Diagnosing Mode. Keyboard Chain Code" is displayed on the liquid crystal display (Step 2). The Chain code is a two-digit code and, together with a two-digit function code as will be described subsequently, used to specify the part intended for diagnosis.

When the chain code is keyboarded 80 by the operator and the start button 117 is pressed (Step 3), the chain code, simultaneously with "Keyboard Function Code", is displayed on the liquid crystal display 112 (Step 4). When the operator then keyboards 80 to input a function code for testing and presses the start button 117 (Step 5), either input testing (Step 6), output testing (Step 7) or an adjusting mode (Step 8) is designated according to the contents. Its contents are then displayed on the liquid crystal display 112 (Steps 9~11) and the respective test is carried out. In case a numerical value which does not fall under the function code is supplied, "Absence of Such Code" is displayed on the liquid crystal display 112 and therefore no self-diagnosis is implemented.

If trouble such as jamming occurs during copy-taking operation performed in the copying machine, data including the contents of the trouble, the size and number of sheets of copying paper involved is written to the nonvolatile memory. When the serviceman set the self-diagnosis mode of this copying machine to the mode in which data is read out, the contents are displayed on the liquid crystal display 112 and, if necessary, written to the IC card 131. More specifically, the operator need not necessarily jot down the contents thus displayed on the liquid crystal display 112 but, by having the data stored in an IC card for the serviceman, bring the IC card back to his office for the purpose of making a troubleshooting computer read and analyze what has been brought about and, if desirable, can obtain data printouts.

Referring back to FIG. 26, the description will be continued.

When additional control data is loaded from the IC card for English message display (Step 4, Y), the sentence normally displayed in the mixture of kanjis and kanas on the liquid crystal display 112 is replaceable with an English one using alphabets (Step 5). Even if copying machines installed within Japan happen to be operated by foreigners, operational instructions or the contents thus displayed can be given or confirmed. Provided a comparative list of Japanese messages and those other than English ones are made available, messages in the languages other than English can be displayed by providing IC cards classified by these countries and, in addition, such copying machines for common use contribute cost reduction.

When additional control data is loaded from the IC card for customer program function (Step 6, Y), the copying machine is set to the customer program mode (Step 7). In this customer program mode, various kinds of data corresponding to the copy-taking operation required by the customer are written to the nonvolatile memory 121F (FIG. 7) when power is supplied to the copying machine, the data including (i) selection of the kind of feed tray initially set, i.e., the kind of copying paper to which priority is given for use; (ii) selection of copy density; (iii) time setting after the completion of copy-taking operation up to shifting to the power-saving mode and prohibition of copy-taking work after the power-saving mode; and the contraction/magnification ratio set on preferential basis. For some users of the additional devices, the customer mode may be fractionalized further in order that IC cards corresponding to the subdivision are employed to control the operation of copying machines. When the copying machine is set in the customer program mode, necessary messages, input values or set values are displayed on the liquid crystal display 112.

When a new function is developed or becomes necessary for this modified example of the copying machine, the purchase of an IC card which stores the programmed function enables the user to alter or improve the function concerned. When additional control data is loaded using an IC card to implement a function X (Step 8, Y), for instance, the copying machine can be set in the mode where the function X is implemented. In case the function stored in the IC card inserted in the IC card device 22 is unapplicable to the copying machine, an error display is made in the liquid crystal display 112 (Step 11) as in the case of the aforesaid embodiment.

In the embodiment and the modified embodiment as set forth above, IC card are employed as portable storage media. As a result, the data recordable has increased by a large margin as compared with what can be stored in the magnetic card intended to store data by means of magnetic stripes and, because it is possible to carry on operations on the card or make a cipher code complex, the copying machine offers greater security. Although this copying machine is inferior in storage capacity to an optical card designed to store data by making use of reflectance in the storage layer, the excellent features of the former include rewriting capability and reading/writing data without being affected by dust or scratches on the surface of the card.

Although a description has been given of the copying machine employing IC cards, use can also be made of magnetic cards provided with magnetic strips as well as the IC cards. If only the functional data storage is attempted, the magnetic card, which is a storage medium having a relatively small capacity, may be made to satisfactorily function. Moreover, the recording apparatus is not always limited to a copying machine but an image processor such as a facsimile or printer, or a composite system including them for common use. In the case of the latter, the adoption of IC cards makes it possible to acquire desired copy density and contracted or magnified copies simply by employing facsimiles as printers.

Although emphasis has been placed on copy-taking operation in the above-described embodiment, the copying machine embodying the present invention combines the advantages of ensuring and facilitating other types of work such as maintenance and inspection, irrespective of the machine model.

As set forth above, since the additional control data is stored in the portable storage media such as IC cards when necessary, the recording apparatus now in use can be made free from becoming obsolete by altering or adding the control data. Even if the existing programs in the recording apparatus suffer from difficulties, they can readily be overcome. According to the present invention, further, the range of copy-making operation becomes definable ads the storage media are entrusted to individuals and taking copies for personal use during recess time, for instance, can be restricted. Moreover, the storage media classified by jobs provide services most fit for each category of business because copy magnification and density in line with the job involved can be selected by preference.

A description will further be given of a second embodiment of the present invention.

Figure 28:
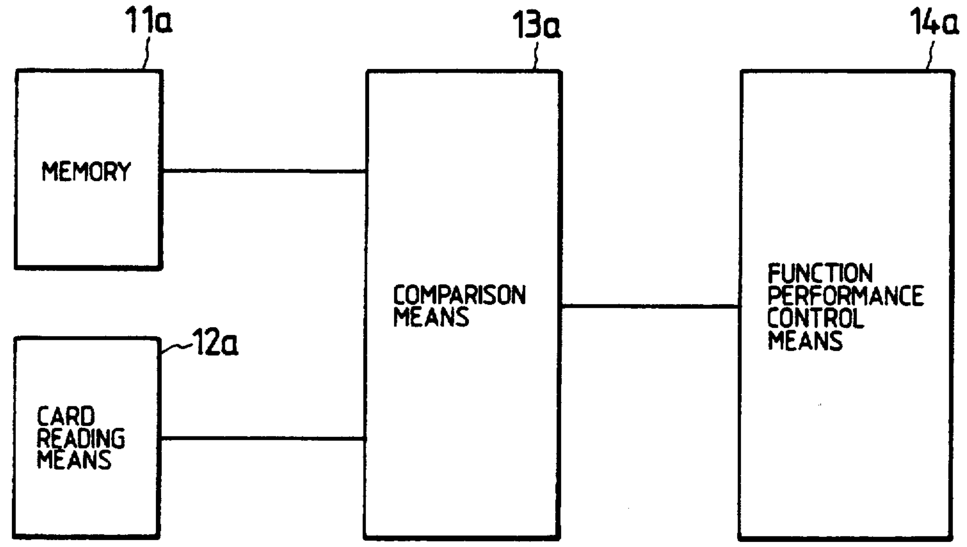
FIG. 28 is a block diagram illustrating the principle of a second embodiment of the present invention.

(0) In the second embodiment, as shown in FIG. 28 illustrating its principle, recording apparatus comprises a memory 11*a* storing recording function data representing various functions feasible therefore; card reading means 12*a* for reading data stored in IC or magnetic cards; comparing means for comparing the recording function read from the card reading means 12*a* with the recording function data stored in the memory 11*a*; and function performance control means 14*a* for setting the function proved coincident therewith by the comparing means 13*a* as the feasible function of the recording apparatus.

The data read from the carding reading means 12*a* is not limited to what represents recording function data but may be additional control data for implementing those other than the functions originally provided for the recording apparatus. The recording apparatus is then able to perform the additional functions derived from the additional control data thus read out and therefore to increase its functions. The additional control data may be control data concerning recording functions or what deals with those other than the recording functions such as control data for use in maintaining.inspecting the recording apparatus.

If a plurality of cards that can be set in the card reading means 12*a* are provided, it will be convenient for use that identifying data indicating the sorts of recording function data stored is displayed on the surface of each card.

The card reading means 12*a* may be a reader/writer capable of not only reading but also writing data. In that case, the recording apparatus itself can write desired data to the card set and thus increase the utility thereof.

Various cards such as IC, magnetic or memory cards are usable as those used for the card reading means 12*a*. The capacity of the magnetic card is slightly insufficient to store additional control data but inexpensive and suitable when only the recording function data is stored therein. Additional control data can be stored in or written by the recording apparatus to an IC card having a large storage capacity, which in turn makes possible the effective use of the recording apparatus.

Since the feasible functions of the recording apparatus in this embodiment are selected by means of cards, a recording apparatus capable of meeting the customer requirements is readily provided.

The recording apparatus in this embodiment becomes most easy to operate for each customer because it employs the additional control data supplied by the IC card and stored in the recording apparatus proper.

(1) As the system configuration of the copying machine in this embodiment is similar to that in the first embodiment, the description thereof will be omitted.

(2) Software packaqe.

(2-1) Advantage of software combination.

The system configuration of the copying machine as described above can also be detailed by reference to the software combination thereof. More specifically, since various additional devices can be fitted to the copying machine, the software is provided so that it conforms to the system configuration corresponding to an arrangement of additional devices, together with the recording function data selected by IC cards and the additional control data supplied thereby.

One of the reasons for the adoption of such software package is (i) that, if the base machine 21 is provided with a memory having a relative small storage capacity, whereas the control programs required are stored in an external memory such as an IC card, the external memory needs a relatively large storage capacity as the control program becomes complicated. The problem is that the external memory becomes costly. Further, (ii) if the control programs for operating all the additional devices are provided in the base machine 21, the memory capacity required therefor tends to become extremely large and, in addition, (iii) the ROM (Read Only Memory) in the base machine will have to be replaced or increased in number when a new additional device is developed or when the existing one is improved. Accordingly, the concept of recording function data is introduced in this copying system to decrease the load of the external memory by having the functions provided for the copying machine selected according to the recording function data and the recording function data stored in the external memory. When the external memory still allows for a margin, the functions of the copying machine are made alterable or new ones can be added by storing additional control data therein. In other words, magnetic cards having a relatively small storage capacity and IC cards having a relative large storage capacity are made usable for this copying machine, so that the right card is employed in the right occasion in accordance with the use intended.

In order to attain the aforesaid effect, the base machine 21 is provided with an basic storage area where programs prepared to control the operation of the copying machine on the part of the base machine and an additional storage area where the recording function data and the additional control data taken from the IC card. Different kinds of recording function data are supplied to the ADF 23, DADF 24 and console panel control programs. When the IC card is set in the IC card device 22 so as to store the recording function data in the additional storage area, both recording function data are compared and only the program commonly corresponding to the recording function data is treated as being effective and used to control the copying machine. Even when the control program for use in sorting by means of the sorter 38 is stored in the basic storage area in the case of the copying machine having the base machine 21 equipped with the sorter 38, the sorting control is not implemented unless the recording function data corresponding to the sorter 38 is supplied from the IC card. Since the same effect as in the case of the first embodiment is attained with reference to an example of differentiation, the description thereof will be omitted.

The description of the circuit configuration of this copying machine will be omitted as it is similar to what has been detailed in the first embodiment.

(6) Control of copying machine by IC cards.

(6-1 Kinds of control data.

Figure 29:
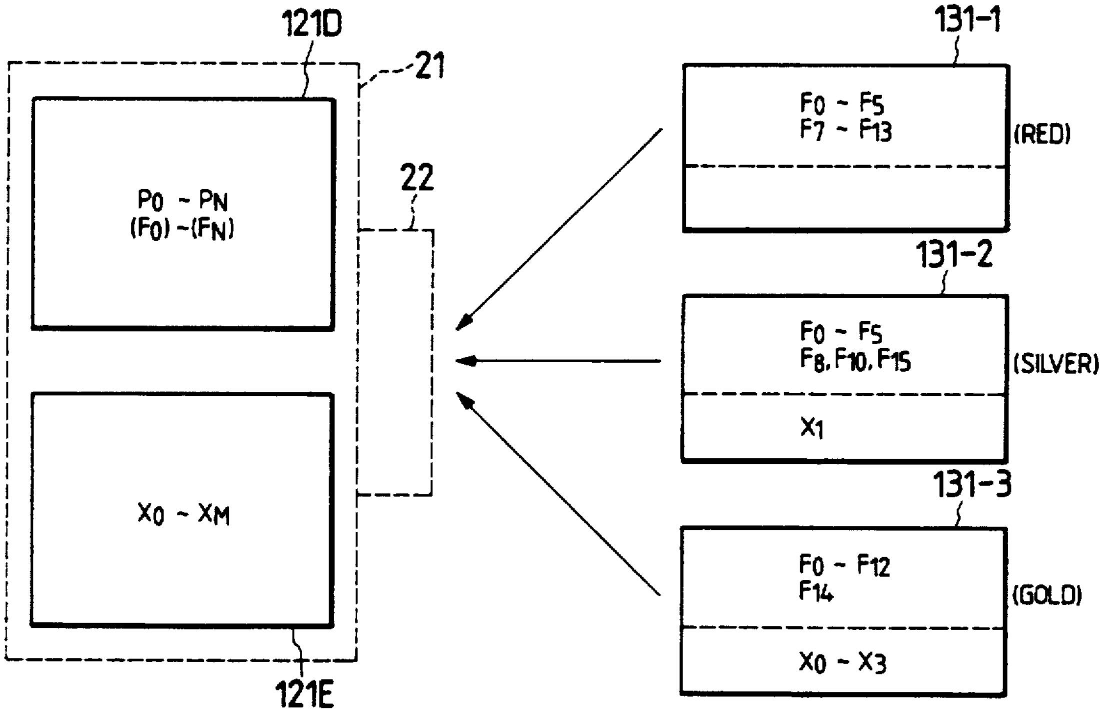
FIG. 29 is a diagram illustrating the relation between a copying machine body and control data stored in two IC cards.

FIG. 29 shows the relation between the basic control data and the additional control data for the copying machine in this embodiment. Programs $Po \sim P_N$ initially prepared as those corresponding to the recording function data $Fo \sim F_N$ to to control the operation of the copying machine, the programs $Po \sim Px$ being provided on the base machine side 21, are stored in the ROM 121D (FIG. 7) as the basic storage area. On the other hand, the recording function data $Of \sim F_N$ read from the IC card 131 set in the IC card device 22 and programs $Xo \sim X_M$ as additional Control data are written to the RAM 121E (FIG. 7) as the additional storage area.

In this case, recording function data $Fo \sim F_5$, $F_7$ and $F_{13}$ is Stored in the first IC card 131-1 that can be set in the IC card device 22, whereas no additional control data is stored therein. Further, recording function data $Fo \sim F_{12}$ and additional control data $Xo \sim X_3$ are stored in the third IC card 131-3.

Tables 1a and 2a show the relation between recording function data $Of \sim F_N$ and code data stored as what represents the former in the IC card 131. In this case, Tables 1a and 2a indicate recording function data $Fo \sim F_N$ corresponding to numeral data and what is expressed by alphanumeric codes, respectively. An alphanumeric code ASCII in Table 2a, for instance, is advantageous in that errors are hardly committed because the code is commonly used for models.

TABLE 1a

| Function: | Code (numeral) |
|---|---|
| $F_O$ | 0 |
| $F_1$ | 1 |
| . | . |
| . | . |
| . | . |
| $F_N$ | N |

TABLE 2a

| Function: | Code (alphanumeric) |
|---|---|
| $F_O$ | DADF |
| $F_1$ | SORTER |
| . | . |
| . | . |
| . | . |
| $F_N$ | RE |

The data stored in the respective IC cards 131-1 ~ 131-3 is analyzed as follows:

(i) A program $P_7$ corresponding to the recording function data $F_7$ stored in the first IC card 131-1 relates to one kind of fixed magnification (100%, equimultiple). A program $P_8$ corresponding to the recording function data $F_8$ stored in the second IC card 131-2 is a control program capable of setting 11 kinds of contractions/-magnifications (50%, 61%, 70%, 81%, 86%, 93%, 115%, 122%, 141%, 163%, 200%) in addition to the 100% fixed magnification. As for a program $P_9$ corresponding to the recording function data $F_9$ stored in the third IC card is a control program capable of setting optional magnifications ranging from 150% to 60% by 1% as a shift unit in addition to the fixed magnification.

(ii) The recording function data Of corresponding to a program Po as a control program relating to normal copy-making and one-side copying by means of the ADF 23 and DADF 24 is commonly stored in each of the IC cards 131-1~131-3. A program $P_{10}$ corresponding to the recording function data $F_{10}$ stored in the second IC card 131-3 and the third IC card 131-3 relates to the function of successively copying double-spread two pages of a bookbinding original (continuous copying function). Further, a program $P_{11}$ corresponding to the recording function data $F_{11}$ stored only in the third IC card 131-3 relates to both-side copying by means of DADF 24.

(iii) A program $P_2$ corresponding to the recording function data $F_2$ deals with one-color development control by the main developing device 59M or sub-developing device 59S. A program $P_{12}$ corresponding to the recording function data $F_{12}$ stored in the third IC card 131-1 deals with control data for use in preparing a two-color or multicolor document as in the case of marking a specific area with color.

(iv) A program $P_{13}$ corresponding to the recording function data $F_{13}$ relates to restricting the commencement of copy-taking operation. With this program $P_{13}$, copy-taking operation can be started during the time from 9 o'clock to 12 o'clock in the morning and from 1 o'clock to 5 o'clock in the afternoon. During the time other than what has been specified above, the start button 117 (FIG. 5) will not function even if copy-taking is attempted. A program $P_{14}$ corresponding to the recording function data $F_{14}$ is a program for Setting no restriction on the time during which the commencement of copy-taking operation is restricted by the program $P_{13}$. That is, the owner of the first IC card 131-1 storing the recording function data $F_{13}$ is not allOWed to make copies during a noon recess and overtime work, so that confidential or private papers are prevented from being pirated or copied during those hours. A program $P_{15}$ corresponding to the recording function data $F_{15}$ stored in the second IC card 131-2 deals with data for writing the prohibition of copy-taking operation after 7 o'clock in the afternoon, the date on which the copy-taking operation is performed and the number of sheets of copying paper to the IC card 131-2 itself.

(v) The additional control data Xo is control data relating to contraction/magnification. Apart from the program $P_9$, it is a control program capable of setting optional magnification ranging from 200% up to 50% with 1% as a shift unit. The additional control data $X_1 \sim X_3$ relates to the form of inputting coordinate data for use in the marking color processing. Of the aforesaid data, the additional control data $X_1$ deals with control of keyboarding coordinates through the ten keys 80. The additional control data $X_2$ deals with control of keyboarding coordinates at the editor pad 132. The additional control data $X_3$ deals with control of keyboarding coordinate data from other IC cards.

The recording function data and the additional control data having the widest range of applications are stored in the third IC card 131-3, whereas the recording function data and the additional control data having the secondly wider range of applications are stored in the second IC card. The first IC card 131-1 is a card which a part-time worker is allowed to carry and stores recording function data sufficient for simple copy-taking work. The surface of the third IC card 131-3 is colored gold, for instance, can readily be distinguished at a glance from the second IC card colored silver and the second IC card 131-2 colored red.

Moreover, an IC card with its surface colored green (not shown) is provided in this copying system to implement the function of self-diagnosing the copying machine.

Functions usable via each storage medium such as an IC card, simultaneously with a symbol representing the post of an employee, e.g., a division of section manage or a clerk may be displayed on the surface thereof. On the surface of the storage medium, for instance, if the symbol and [ALL] are indicated, all the functions are usable at any time;

if the symbol and [CONTRACTION/MAGNIFICATION, ADF, HCF, DUPLEX] are indicated, the contraction and magnification, and the use of the ADF 23 and the DADF 24 are possible but any functions other than those specified are not usable.

(6-2) Flow of control.

As set forth above, the functions of this copying machine are selected or altered in accordance with the kind of IC card 131 set in the IC card device. Accordingly, a proper copying form is implemented on the part of the individual owner of the IC card 131.

FIG. **30*a* is a flowchart illustrating the operating of writing recording function data and additional control data using the IC card. When power is supplied to the copying machine in this embodiment, "Set IC Card" is displayed on the liquid crystal display 112. When the IC card 131 is set in the IC card device 22 (Step 2, Y), recording function data and additional control data are loaded (Step 3). With the absence of the additional control data, only the recording function data is loaded. Upon completion of loading the data on the RAM 121E, the main CPU 121 identifies the recording function data written to the ROM 121D and the recording function data thus loaded (Step 4) and places the recording function data coinciding with each other in the condition where the program can be executed (Step 5). When no trouble such as jamming occurs, "Start Copying" is displayed on the liquid crystal display 112 (Step 6**).

The operator sets the copying machine to the mode desired and copying conditions in that state and presses the start button 117 (Step 7). When the start button 117 is pressed, the main CPU 121 determines if the copying machine (Step 8). If the mode and the conditions are judged feasible, the copying machine conducts the copy-taking operation (Step 9).

In case the presently set conditions are not in conformity with the copy-taking requirements; e.g., when the IC card 131-1 is set in the noon recess (Step 8, N), the "Start Copying" display on the liquid crystal display 112 disappears and the reason why the copy-taking operation is not possible will be displayed instead (Step 10). When the first IC card 131-1 is set during the copying prohibitive time, "Recess Time. Wait until Working Hour" or "Copy Not Taken unless Another IC Card Set" is displayed. When the sorting mode is designated notwithstanding the recording function data unable to have the sorter 38 do sorting work, a precaution reading "No Sorting with this IC card" is displayed. If the operator changes the mode (Step 11, Y), on the other hand, it is checked whether copies can be taken after the operator changes the mode (Step 8). If the conditions under which the copy-taking operation can be conducted are already accomplished (Step 9), copies will be taken, whereas if the operation is not feasible, the reason therefor will be displayed (Step 10).

(6-3) Detailed example of control.

With respect to an example of copy-taking operation carried out by setting a wide contraction/magnification range using the additional control data $X_1$ after the IC card 131 is set in the IC card device 22, the copy-taking operation has been conducted through the process similar to what has been described in the first embodiment and the description thereof will therefore be omitted. The program for the IC card 131 sent to the main CPU 121 as described in the first embodiment is constituted by the recording function data and the additional control data in this embodiment.

Figure 30A:
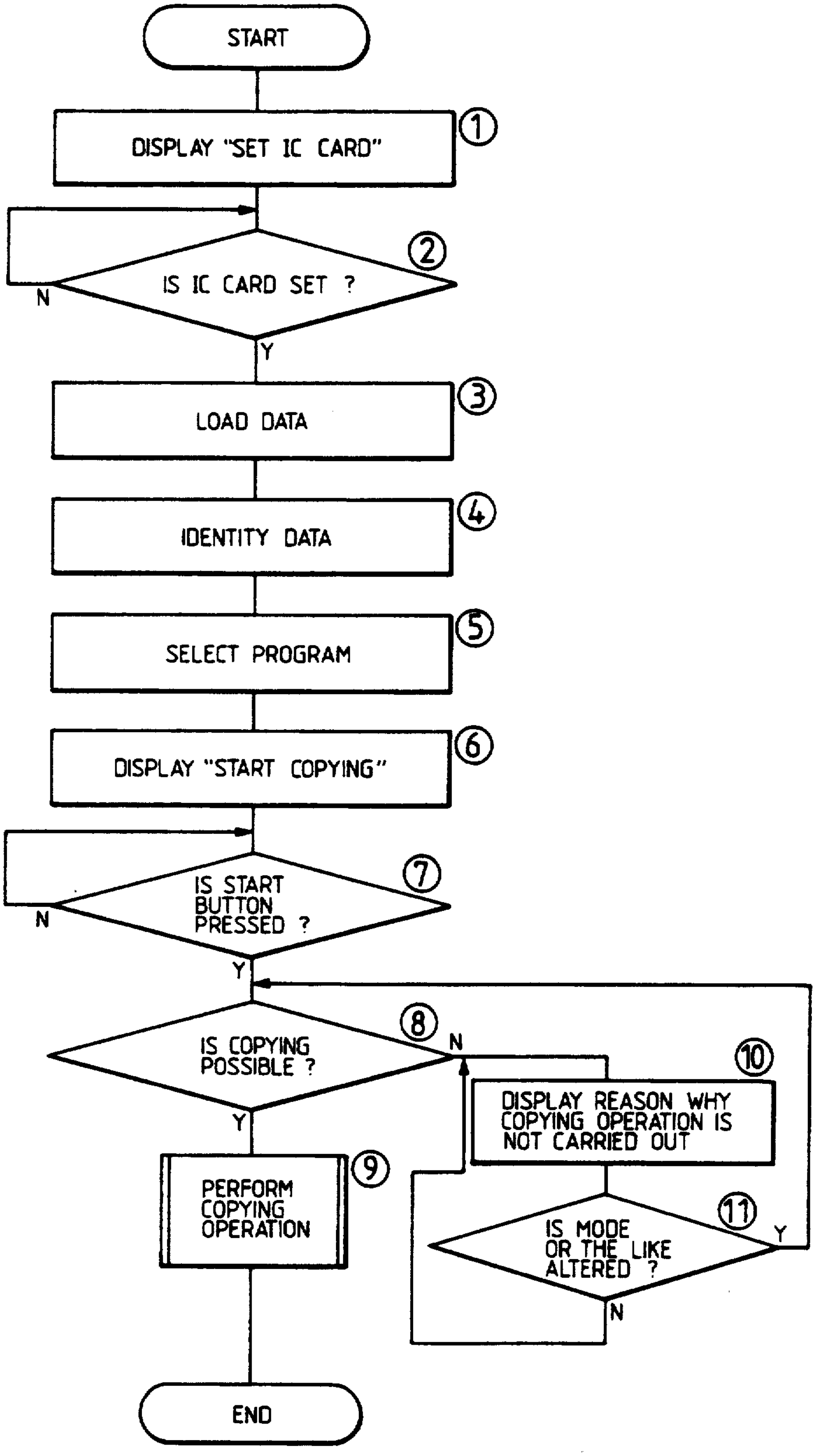
FIG. 30*a* is a flowchart illustrating a general state of copying operation using IC cards.
Figure 30B:
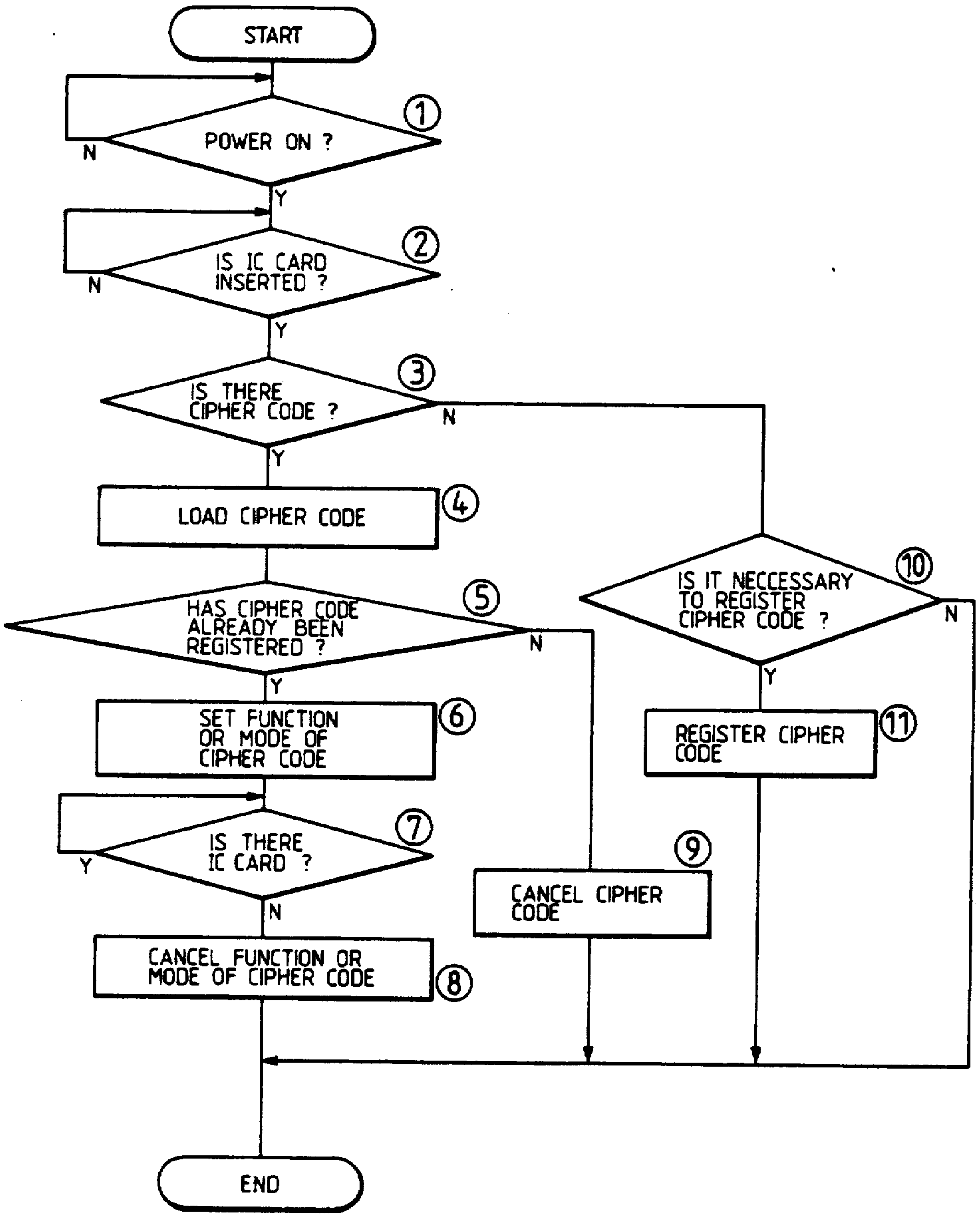
FIG. 30*b* is a flowchart illustrating recording functions and recitation code setting operation in the modified embodiment thereof.

FIG. 30*b* is a flowchart illustrating the function of setting an cipher code in the IC card of this copying system and the process of registering the cipher code. Even if the contents of operation of the copying machine are changed, it can simply be dealt with by setting a desired cipher code or changing what has been employed.

When the operator supplies power to the copying machine (Step 1), the CPU in the copying machine monitors to see if an IC card is set therein (Step 2). The copying machine checks if a cipher code is registered in the IC card while the IC card is set (Step 3). If the cipher code is found registered in the copying machine, it is loaded thereon (Step 4) and the copying machine ensures whether the cipher code thus supplied conforms to what has already been registered (Step 5). As for the cipher code already registered, the execution of its functions or mode is permitted (Step 6). At the point of time the IC card is taken out of the copying machine (Step 7, N), the copying machine frees the functions or mode set by the cipher code (Step 8). However, the functions or mode of the copying machine may be maintained until the termination of copying-taking operation even though the IC card has been pulled out.

If the cipher code thus supplied is not what has been registered in the copying machine (Step 5, N), the cipher code thus received is canceled (Step 9). In this case, copies are taken with the same functions or mode in which the IC card has not been set therein.

When a new cipher code is registered in the IC card, the cipher code has not yet been registered in the IC card set in the copying machine (Step 3, N). In this case, the copying machine searches whether or not the cipher code can be registered in the IC card from the liquid crystal display (Step 10). When the operator instructs the registration of the cipher code (Y), the cipher code keyboarded 80 is registered (Step 11). At that time the cipher code is registered, the copying machine seeks for the input of the cipher code number to check whether the operator is properly qualified and may refuse to accept the registration of the cipher code, provided it is unacceptable.

Although the copying machine employing the IC card has been described in this embodiment, the IC card may be replaced with a magnetic card provided with magnetic stripes. Particularly when the function data is stored, a storage medium such as the magnetic card having a relatively small capacity can be functioned sufficiently. Moreover, the recording apparatus is not limited to a copying machine but may be an image processor such as a facsimile or printer or a composite system which commonly makes use of them. In the case of the latter, copies having desired density or contraction/magnification can simply be taken using a facsimile as a substitute for a copying machine by employing a recording medium such as an IC card.

A description has been given of mainly the copy-taking operation in the aforesaid embodiment. However, the advantage of the copying machine above is that maintenance, inspection and other work, in addition to the copy-making operation can be effected surely and quickly without the trouble of selecting the machine model for use.

In the aforesaid embodiment or modified one, the functions of the copying machine are selected on condition that the recording function data stored in the IC card is directly identified in the base machine. However, it is also acceptable to attach an identifying code to each combination of recording function data in order to select the functions on a card basis by identifying the code.

Although the ROM and RAM in the form of a semiconductor are disposed in the base machine 21 in the aforesaid embodiment, needless to say, other storage means such as a magnetic disk or CD (Compact Disk) ROM can be employed. With respect to the card set in the copying machine, the kind and form thereof are not restricted, provided that optical data is written thereto.

It has been so arranged in this embodiment that the code data consisting of numbers and characters corresponding to the recording function data $F_o \sim F_N$ are written to the IC card. However, a format shown in Table 3a is formed on an IC card instead and data ("1" or "0") indicating the presence or absence of the aforesaid functions may be stored therein as shown in the following table.

TABLE 3a

| Recording function: | Presence "1", absence "0" |
|---|---|
| DADF | "1" |
| SADH | "0" |
| SORTER | "1" |
| STACKER | "0" |
| FINISHER | "0" |
| Contraction/Magnification on 1% shift basis | "1" |
| 200% magnification | "1" |
| Duplex copy | "1" |

Since the recording function data is stored in the card as set forth above, optimum functions can be set in the recording apparatus even though the card has a small storage capacity. Moreover, as the card allowing for a margin is capable of storing the additional control data, it can be used for a long period of time without making the recording apparatus in use obsolete because of the alteration or addition of control data. In case trouble occurs to the set program in the recording apparatus, troubleshooting is readily made. Moreover, it is possible to limit the range of copy-taking work on a card owner basis because the card according to the present invention is designed to be entrusted to each individual. Accordingly, private use of the copying machine in the noon recess or an intelligence leak can be prevented. By providing the cards classified by jobs according to the present invention, priority can be given to the selection of copy magnification and density fit for the job and this makes it possible to offer carefully thought out services to various industries.

As the expansion or restriction of the functions of the recording apparatus according to the present invention depends on the contents of each card, salable, easy to operate copying systems can be constructed because the card itself is of commercial value. Moreover, work efficiency can be improved because even each individual may allowed to carry a plurality of cards.

The recording function data stored in the card also contribute to improving work efficiency as it makes unnecessary for the operator to bear the cipher code in mind when operating the recording apparatus by setting in therein and therefore eliminates input in error.

A third embodiment will subsequent be described.

Figure 31:
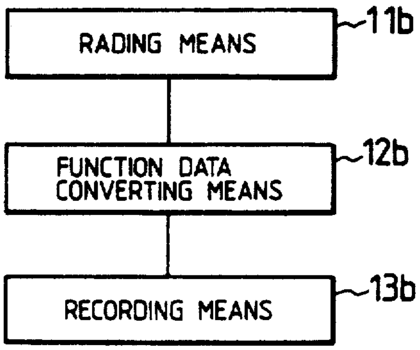
FIG. 31 is a block diagram illustrating the principle of a third embodiment of the present invention.

(0) In this embodiment shown in FIG. 31 illustrating its principle, a recording apparatus comprises reading means **11*b* for reading function data for use in controlling various functions of the apparatus from storage media such as IC cards; function data converting means for converting the function data into a feasible one for its own; and recording means for recording image data using the function data thus converted by the function data converting means 12*b***.

The reading means **11*b*** may be a reader/writer having the function of writing specified data in addition to that of reading the function data. If the storage medium is an IC card having a relatively large storage capacity, it can write necessary data from the recording apparatus such as a copying machine to the storage medium carried by each individual. It is also possible to analyze the condition of use and to control charges by writing the kinds and numbers of the devices used to the storage media.

The function data may be various conditions under which image data including setting contraction/magnification and density is recorded and data on the maintenance.inspection of the apparatus.

Moreover, data which stores programs for controlling devices set simultaneously with the function data may be written to the recording apparatus, whereby new control data and that for supporting the devices become utilizable.

The storage medium may be an IC card or magnetic card. Any portable storage media are needless to say applicable.

Further, the recording apparatus may be an electrostatic copying machine, facsimile or printer. Or otherwise, it may be a composite image processing system combining them together.

If the storage medium set is provided with a display for displaying one of the designated functions which cannot be performed, the operator will able to determine its fitness before starting the intended operation. If the data essential to implementation out of what has been stored in the storage medium is defined as essential function data, use of an recording apparatus unable to fulfill the essential function can be excluded by providing the recording apparatus with essential function decision means and record-making rejecting means for rejecting the record-making when at least one of the essential data is not feasible.

The function data for setting the recording apparatus is written to the storage medium and the data thus written is converted into what can be performed by the apparatus in which the storage medium has been set. If the storage medium is set without the knowledge of the contents of the operation of the apparatus, the recording apparatus can be set in almost nearly the condition desired by the used.

Since the system configuration, the software package and the circuit configuration of the copying machine in this embodiment are similar to those in the first and second embodiments, the description thereof will be omitted. Subsequently, the control of the copying machine by IC cards will be described.

(6) Control of copying machine by IC cards.

(6-1) Storage contents of IC card.

Figure 32:
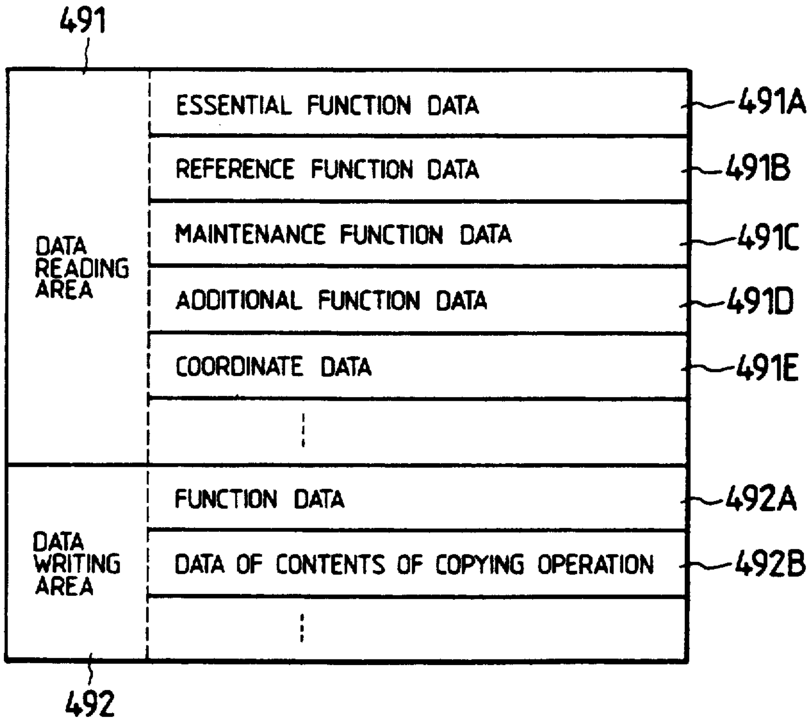
FIG. 32 is a schematic layout of storage areas of an IC card.

FIG. 32 is a diagram illustrating the storage area of an IC card. The storage area of the IC card 131 applicable to the copying machine in this embodiment is roughly divided into a reading data area 491 and a writing data area 492. In the reading data area 491 are stored essential function data 491A, reference function data 491B, maintenance function data 491C, additional control data 491D and coordinate data 491E. On the other hand, machine model data 492A and data of contents of copy-taking operation 492B are stored in the writing data area 492.

The essential function data 491A and the reference function data 491B are various kinds of function data for setting copy-taking conditions. The essential function data 491A out of them is function data that must be performed strictly during the copy-taking operation, whereas the reference function data 491B is function data other than the former. These function data 491A, 491B that can be specified for the copying machine in this embodiment are as follows;

(i) Machine model data: If this is the essential function data 491A, use of any machine models other than this one is prohibited. If a machine model number is specified, use of any machine models other than this one and what has the same lot number are prohibited. If the machine model data is the reference function data 491B, any machine model equivalent in function is allowed to be used for copy-making.

(ii) Set number of sheets: This is the number of sheets of copying paper set to take copies of one original.

(iii) Continuous page copying function: The function of copying an original one page after another when the original equivalent to two pages such as a bookbinding original is set on the platen at a time. If this is set as the reference function data 491B, a continuous page copying mode is set in the copying machine provided with the continuous page copying function, whereas copies are taken in a one-by-one copying mode in any copying machines other than that one.

(iv) Color inverting function: The function of replacing one recording color in a specific area with another specified one. If this is designated as the reference function data 491B, color inversion is effected in the copying machine in this embodiment, whereas only one color is used to take copies in an ordinary copying machine using one color toner.

(v) Stack function: Originals are stacked up in different bins on a group basis as one form of sorting. If the stack function is designated as the reference function data 491B for a copying machine without the sorter, copies are discharged onto the tray without sorting.

(vi) Gathering function: Originals are sorted in different bins on a sheet basis as one form of sorting. If this is designated as the reference function data 491B in this case, too, the performance of this function can be ignored.

(vii) Paper size: Data for specifying the size and direction of copying paper for use. Since there are several seizes of copying paper, designation is given in such a manner as to specify paper of A4 size to be vertically fed, for instance. The selection of copy paper size cannot normally be ignored and treated as the essential function data 491A in the normal case. If this function is designated as the reference function data 491B and if the copying paper involved is not set in the copying machine, an equimultiple copy is made on copying paper of aged man size. Otherwise, image data on the original is reproduced on copying paper of smaller size by contraction copying.

(viii) Contraction/magnification ratio: The contraction/magnification ratio of an original is specified. If the copying machine with the IC card set is capable of setting the contraction/magnification ratio in a wide range on a 1% shift basis, there is no problem even if this function is designated as the essential function data 491A. Provided the copying machine is able to set only the fixed magnification and that a specific contraction/-magnification ratio is designated as the reference function data 491B, a fixed ratio closest to the ratio above is executed.

In addition, function data such as binding margin setting, division between left- and right-hand binding, copy density, necessity of duplex copying, presence of a duplex original, presence of image editing, etc. can be written to the IC card for function data 491A, 491B.

These function data 491A, 491B need not be registered in the IC card 131 as only one combination of them but a plurality of them may be registered each time the copy-taking operation is performed by the owner of the card in charge. The registration like this is made by writing the copying conditions desired to the IC card after the operator of the copying machine has completed the copy-taking operation with the copying conditions above. The way of distinguishing between the essential and reference function data 491A, 491B may be designated individually by the operator or predetermined by the copying machine in line with the characteristics of the function data.

(6-2) Function data reading from IC card.

Figure 33:
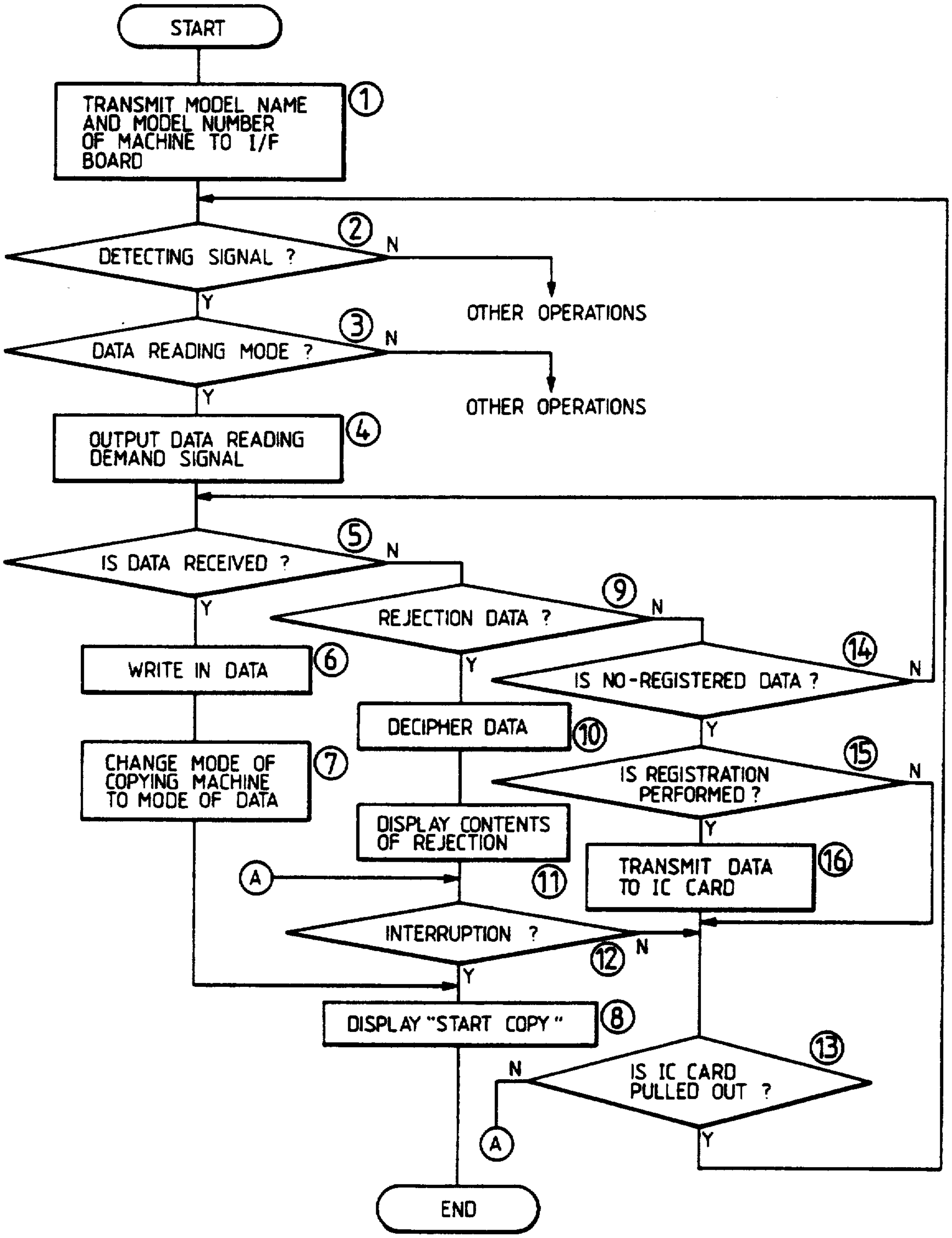
FIG. 33 is a flowchart illustration the control of the copying machine when IC cards are set in an IC card device.

FIG. 33 is a flowchart illustrating the control of the copying machine when the IC card is set in the IC card device. The copying machine sends its machine model and lot number to the interface 130 (FIG. 7) for the IC card.editor pad when power is supplied thereto (Step 1). The interface 103 for the IC card.editor pad checks and stores that data in the RAM controlled by the card CPU 129. When the IC card 131 is inserted into the IC card device 22 in that state, the interface 130 for the IC card.editor pad detects the insertion and transmits an IC card insertion detecting signal to the copying machine proper. On receiving the IC insertion detecting signal (Step 2, Y), the CPU 121 outputs a data reading demand signal for demanding data reading (Step 4) when the copying machine proper is set in the data reading mode (Step 3, Y). In any case other than this, the predetermined copy-making operation is conducted.

Upon receiving the data reading demand signal, the interface 130 for the IC card.editor pad determines if the IC card 131 set has stored the data receivable by the copying machine. When such data has been registered, the interface 130 for the IC card.editor pad requires the IC card 131 to load the data. When the data is supplied, the interface 130 therefor temporarily stores the data in the RAM and then converts the data form into what conforms to the machine model of the copying machine proper.

Assuming copy density $D_A$ has been instructed to the IC card 131 and the copy density specified by the copying machine of model B is $D_B$ and further that copy densities are defined by the IC card 131 and the copying machine of model B as shown in Table 16. In this case, the conversion of the copy density $D_A$ to $D_B$ is conducted according to Table 26.

TABLE 1b

| IC card: | | Machine model B | |
|---|---|---|---|
| 0 | light | 0 | light |
| . | | . | |
| . | | . | |
| 7 | ordinary | 3 | ordinary |
| . | | . | |
| . | | . | |
| 14 | dark | 5 | dark |

TABLE 2b

| Copy density $D_A$ | → | Copy density $D_B$ |
|---|---|---|
| 0~2 | → | 1 |
| 3~6 | → | 2 |
| 7 | → | 3 |
| 8~11 | → | 4 |
| 12~14 | → | 5 |

If the copy density DA designated by the IC card 131 is "5", for instance, the interface 130 for the IC card.editor pad converts the copy density to "2" according to Table 26 and sends out the value thus converted to the copying machine proper.

When the designation of the copy density $D_A$ is designated as the essential function data, the interface 130 for the IC card editor pad rejects the copy-taking operation unless the copying machine proper is able to set the copy density is 15 stages from "0" to "14". In this case, it transmits to the copying machine proper the data indicating the contents of rejection of the copy-taking operation in order to inform the operator of the copying machine to that effect.

The copying machine proper is monitoring the reception of the data from the interface 130 for the IC card-.editor pad (Step 5) and, if the data indicating the contents of the copy-taking operation is received, stores it in the RAM 121E (Step 6) and further changes the mode of the copying machine proper to what has been specified by the data (Step 7). More specifically, the copying machine proper sets the copy density at "2" and lights the corresponding display lamp 82 on the copy density panel 77. Regarding other copying conditions, the data directed to the copying machine proper is converted likewise and set in the converted mode. If the copy-taking operation is possible in that state, "Start Copying" is displayed on the liquid display 112 (Step 8). In addition, the operator can alter the mode thus set, depending on the then condition of the original.

When the aforesaid rejection data, instead of the data indicating the contents of the copy-taking operation, is received (Step 9, Y), the main CPU 121 deciphers the data (Step 10) and sends it to the display CPU 127 to have the liquid crystal display 112 display the contents thereof (Step 11). In the case of this example, "Unable to Take Copy Because Copy Density Not Set at Desired Value" is displayed. When the operator presses the interruption button 115 (FIG. 5) in that state (Step 12, Y), the copying machine is allowed to take copies (Step 8). When the operator pulls out the IC card 131 from the IC card device 22 (Step 13), the copying machine proper again returns to the standby position to wait for the IC card to be set (Step 2).

In Step 4 again, a description will be given of a case where no data to be read has been registered in the IC card 131, despite the fact that the main CPU 121 has demanded to read data. In this case, the interface 130 for the IC card.editor pad sends out unregistered data to the copying machine proper. On receiving the unregistered data (Step 14), the copying machine proper has the liquid crystal display 112 display a question about whether the then data registered in the copying machine proper should be registered in the IC card and waits for the operator's answer (Step 15). When the data is registered (Y), the data is transmitted via the interface 130 for the IC card.editor pad to the IC card (Step 16). Upon completion of writing the data with the removal of the IC card (Step 13), the aforesaid standby state is restored in order to wait for the setting of the IC card 131. If a new IC card that has not been used is to be set in the IC card device 22, data writing operation is performed.

When the data is not written to the IC card 131 (Step 15, N), on the contrary, the pulling out of the IC card 131 is instantly checked (Step 13).

(6-3) Additional data reading from IC card.

Although the process of reading data from the IC card has been described, with function data as a central figure, it is possible to expand and alter the functions of the copying machine proper while the additional data is being written to the IC card.

Supposing the DADF 24 shown in FIG. 2 is not installed at the point of purchase of the copying machine in this embodiment but that the ADF 23 ready for use is fitted to the base machine 21. No program for controlling the DADF 24 exists on the part of the base machine 21, provided the DADF 24 is purchased thereafter. Consequently, the company marketing the copying machine writes the program of the DADF 24 to the unused storage area (data reading area 491) of the IC card 131 and sells the program in combination with the DADF 24. On the other hand, the user of the copying machine is allowed to use the DADF 24 by setting that IC card 131 in the copying machine.

Thus the program can be elaborately improved or a new one can be added by writing additional control data to the IC card 131 without replacing the ROM 121D in the copying machine proper. Moreover, control data of a low standard is stored in the copying machine proper as basic control data, whereas control data at a level corresponding to the respective requirements is written to the IC card used by each user, whereby the coverage of use of the copying machine can be limited.

FIG. 21 referred to in the first embodiment may be employed as an example showing the relation between the basic control data and the additional control data for the copying machine in this embodiment. Since the IC card applied in this embodiment is of the same construction as what has been shown in the first and second embodiments of FIG. 23, the description thereof will be omitted.

(6-4) Data writing to IC card.

Figure 34:
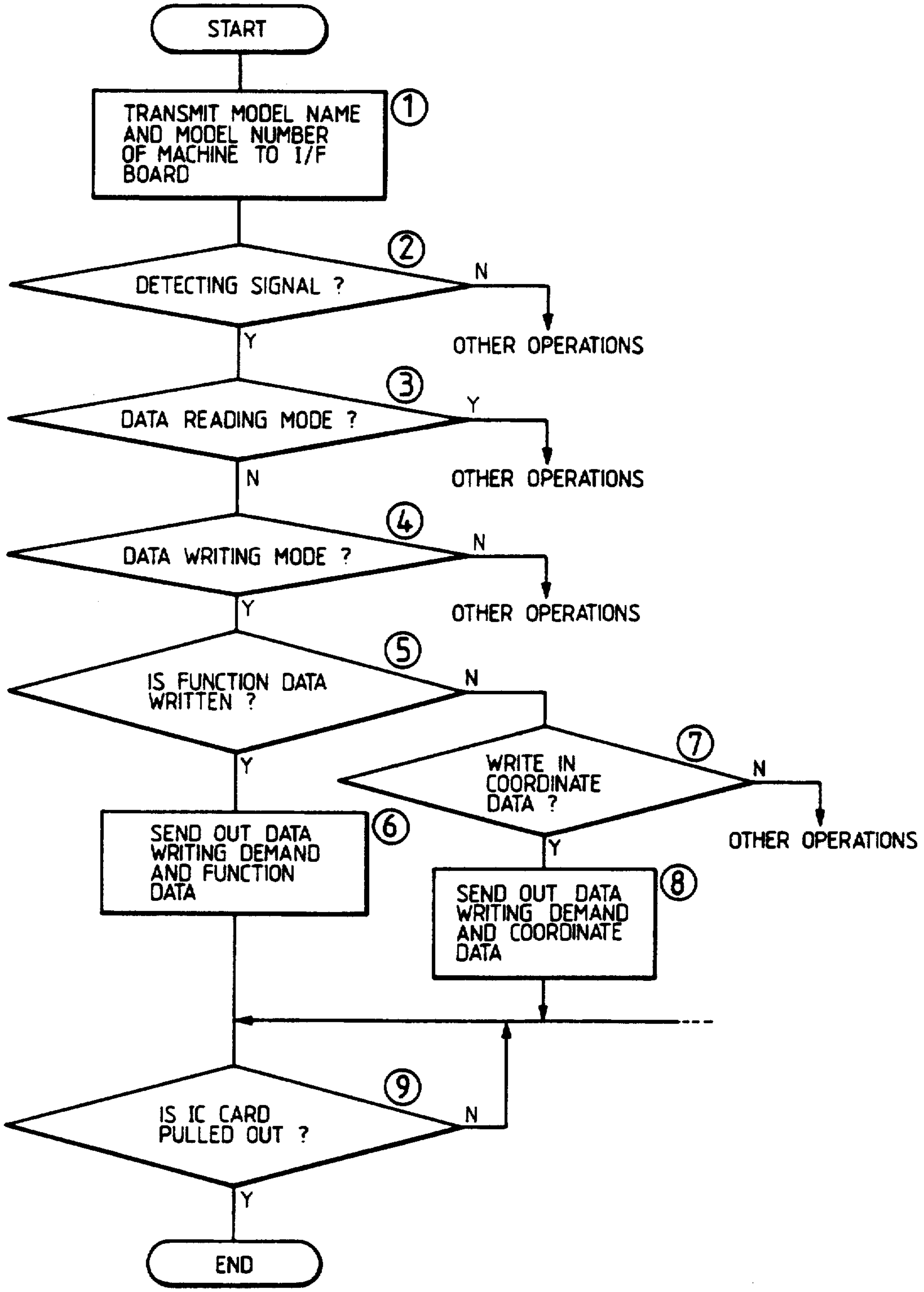
FIG. 34 is a flowchart illustrating the operation of writing data to the IC card.

FIG. 34 is a flowchart illustrating the operating of writing data to the IC card.

As described in FIG. 33, the machine model and lot number are sent to the interface 130 for the IC card.editor pad (FIG. 7) (Step 1) when power is supplied to the copying machine proper. The interface 130 for the IC card.editor pad checks the data and has the RAM 511 operating under the CPU 129 store the data. When the IC card 131 is inserted in the IC card device 22 in that state, the interface 130 for the IC card.editor pad detects the IC card thus inserted and sends the IC card insertion detecting signal to the copying machine proper. On receiving the IC card insertion detecting signal (Step 2, Y), the main CPU 121 determines what kind of data is written to the IC card 131 while the copying machine proper is set in the data writing mode (Step 3, N; 4, Y).

If it is specified that function data is written thereto (Step 5, Y), a demand for the data to be written and the corresponding function data are sent out (Step 6). The interface 130 for the IC card.editor pad converts the function data received to what is used for the IC card 131 and stores the data thus converted in the IC card. Some copying machines are designed so that the essential data out of the function data can specifically designate on the console panel.

Table 3b shows an example of the operation of converting copy density as function data performed in the interface 130 for the IC card.editor pad.

Assuming the copy density $D_B$ has been specified by the aforesaid copying machine of model B, the copy density $D_B$ is converted to $D_A$ according to Table 3b.

TABLE 3b

| Copy density $D_B$ | → | Copy density $D_A$ |
|---|---|---|
| 1 | → | 1 |
| 2 | → | 4 |
| 3 | → | 7 |
| 4 | → | 9 |
| 5 | → | 13 |

Accordingly, if the copy density $D_B$ specified by the copying machine B is "2", the interface 130 for the IC card.editor pad converts the copy density to "4" according to Table 3 stored in the ROM 512 and sends out the copy density thus converted to the IC card 131.

The function data sent out in Step 6 of FIG. 34 includes data indicating the copying conditions presently set in the copying machine and the copying conditions already stored in the nonvolatile memory 121F (FIG. 7) in the copying machine proper. The operator is able to select which one of the data is written to the IC card. If the copying conditions already stored in the copying machine is written to the IC card 131 as function data, the copying conditions of the copying machine already in use can simply be set in a newly installed copying machine, for instance.

Instead of writing the function data, it is possible for various kinds of data shown in FIG. 32 to be written to the IC card. When coordinate data is designated to be written (Step 7, Y of FIG. 34), for instance, a writing demand and the coordinate data are sent out (Step 8). Upon completion of transmission of the data to be written to the interface 130 for the IC card.editor pad, the main CPU 121 monitors whether the IC card 131 is pulled out of the IC card device 22 and terminates a series of data writing operations at the point of time it has been pulled out.

Although a copying machine employing the IC card has been described in the aforesaid embodiment, a magnetic card with stripes instead of the IC card may be used. A storage medium such as a magnetic card having a relatively small capacity may be made to function satisfactorily particularly when the function data is only to be stored. The recording apparatus is not limited to a copying machine but may be an image processor such as a facsimile or printer or a composite system commonly utilizing both of them. In the case of the latter, a facsimile is usable as a substitute for a copying machine and copies of desired density and contraction/magnification can simply be taken using storage media such as IC cards.

The copy-taking operation has mainly been described in the above-described embodiment. However, it is also advantageous that other kinds of operation such as maintenance.inspection can be conducted surely and quickly without bothering about which one of the machine models should be selected.

Since the IC card is used as a storage medium in the aforesaid embodiment, a sufficient margin is still left in storage capacity and not only additional data but also copying machine control data can be stored in that margin. Accordingly, it becomes possible to add a new function to the copying machine or demand payment of the charge for the service; in other words, functions most suitable for each user can be materialized.

Moreover, since data absolutely necessary out of the function data is designated as essential function data in this embodiment, the copy-taking operation which will have to be performed under severe copying conditions can also be fulfilled.

Further, the interface for the IC card.editor pad is used for the conversion of function data in this embodiment, so that the program for data conversion can be altered or modified.

Figure 35:
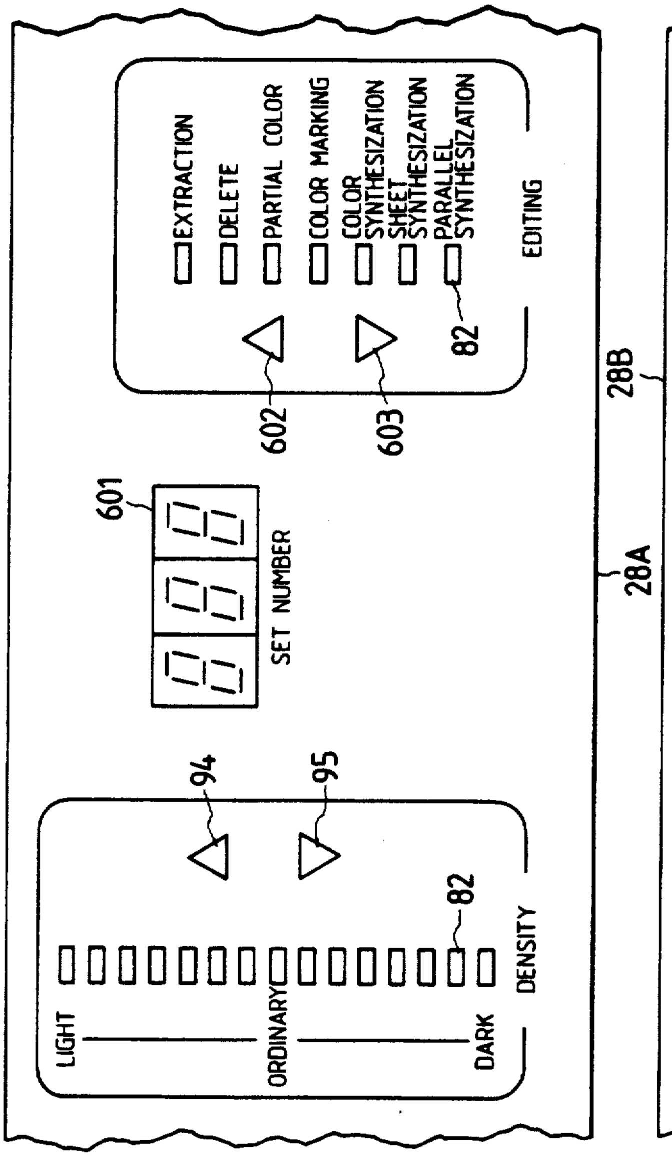
FIG. 35~48 are illustrative of the modified embodiment thereof.
Figure 36:
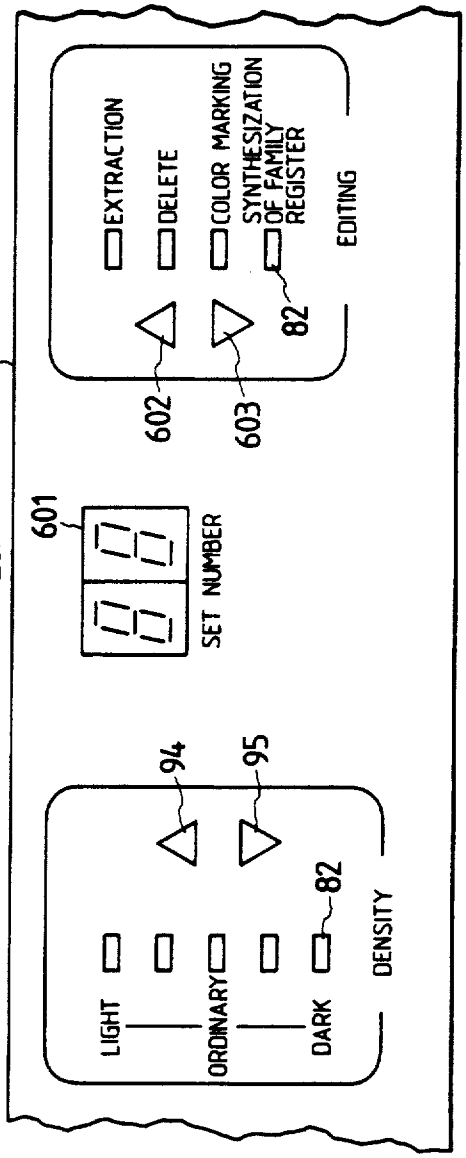

FIGS. 35～48 are intended to describe a modified embodiment of the present invention. Of these drawings, FIG. 35 is a top view of part of a console panel of a machine model A, whereas FIG. 36 is a top view of part of a console panel of a machine model B. There are 15 display lamps 82 for setting a copy density on the console panel 28A and the copy density can be regulated in 15 stages by pressing shift keys 94, 95. On the other hand, five display lamps 82 for setting a copy density are disposed on the console panel 28B of the machine model B and the copy density can be regulated in f stages likewise by the scanning of shift keys 94, 95. While a display 601 for displaying the set number of copies can display maximum 999 sheets in the case of the console panel 28A of the machine model A, the console panel 28B of the machine model B can display maximum 99 sheets.

Further, editing functions, e.i., deletion, extraction, partial coloring, color-marking, color-synthesizing, sheet-synthesizing and parallel-synthesizing can be selected on the part of the console panel 28A of the machine model A, whereas extraction, deletion, color-marking and census registration can be carried out on the part of the console panel 28B of the machine model B. The selection of these functions is implemented by lighting the display lamp 82 corresponding shift keys 602, 603.

Of the functions shown in FIGS. 35, 36, those which have not yet been described are as follows:

(i) Sheet-synthesizing is the function of recording the first and second originals both superposed on one copy. In the copying machine in this embodiment, up to five areas can be specified for the first original. Moreover, this copying machine is capable of copying the first and second originals with respectively different colors using the monochromatic color switch 91 (FIG. 5).

(ii) Parallel-synthesizing is the function of making a synthesized copy using one sheet of copying paper by attaching the whole of the first original to that of the second original. The original is sent out of the ADF 23 or DADF 24. Unless one of the ADF or DADF is installed in the copying machine, this parallel-synthesizing function is unusable.

(iii) Census registration is the function of extracting the necessary portion of one's family register for the preparation of the copy thereof. For this purpose, the image editing function is used.

Figure 37:
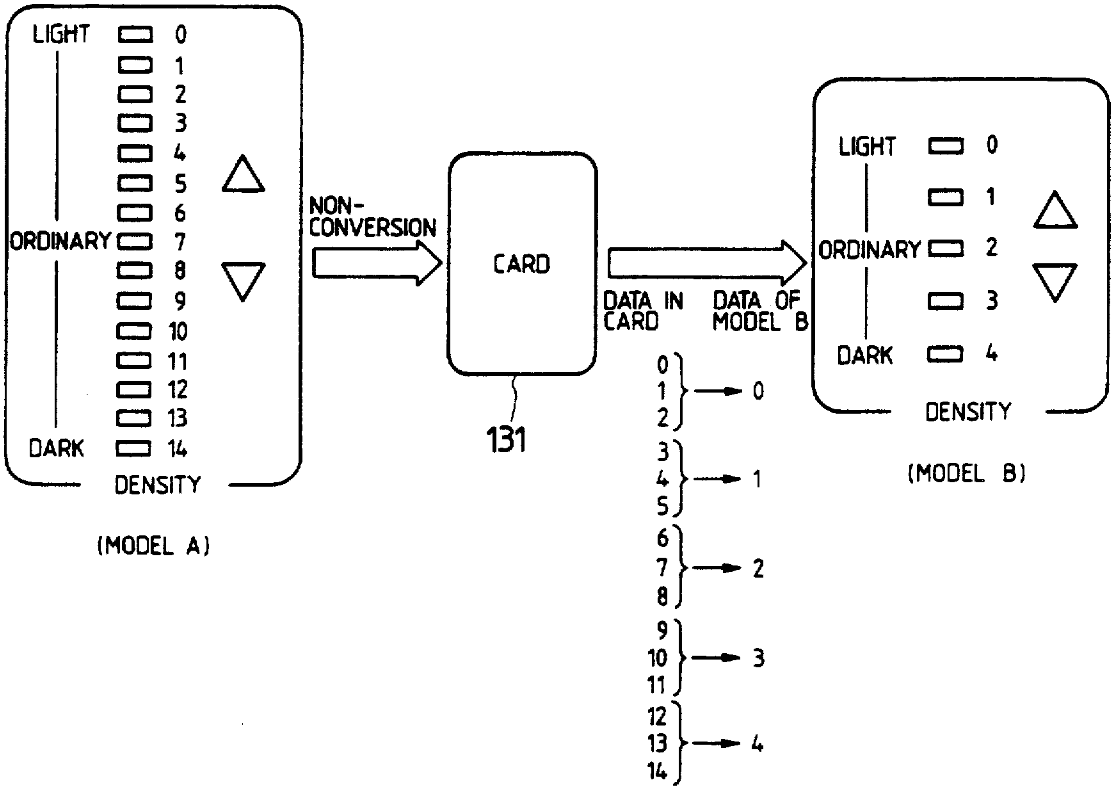

FIG. 37 is a diagram illustrating the mode of converting the density in model A to that in model B. In this manner, the copy density as it is, i.e., the density data in 15 stages is stored in the IC card 131. When it is converted into the function data of the machine model B, the data stored in the IC card 131 ranging from "0"～"2" is converted to "0" and the data ranging from "3"～"5" to "1". In the same way, "12"～"14" is converted to "4".

Figure 38:
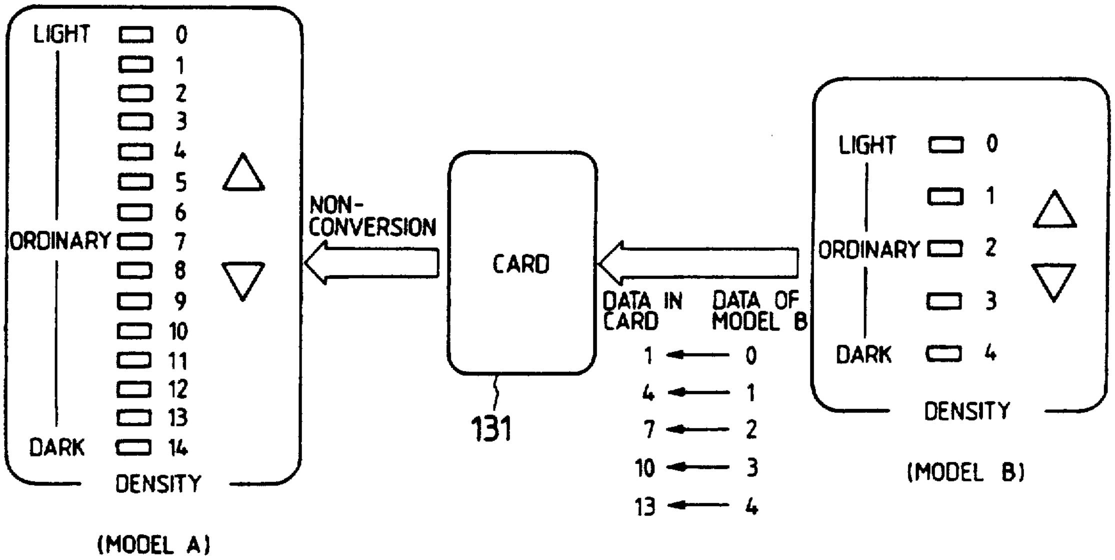

FIG. 38 shows an opposite case. In this case, the function data of the machine model B is converted what is stored in the IC card 131. The copy density "0" in the machine model B is converted to "1" and stored in the IC card 131 and so forth as shown in FIG. 38.

Figure 39:
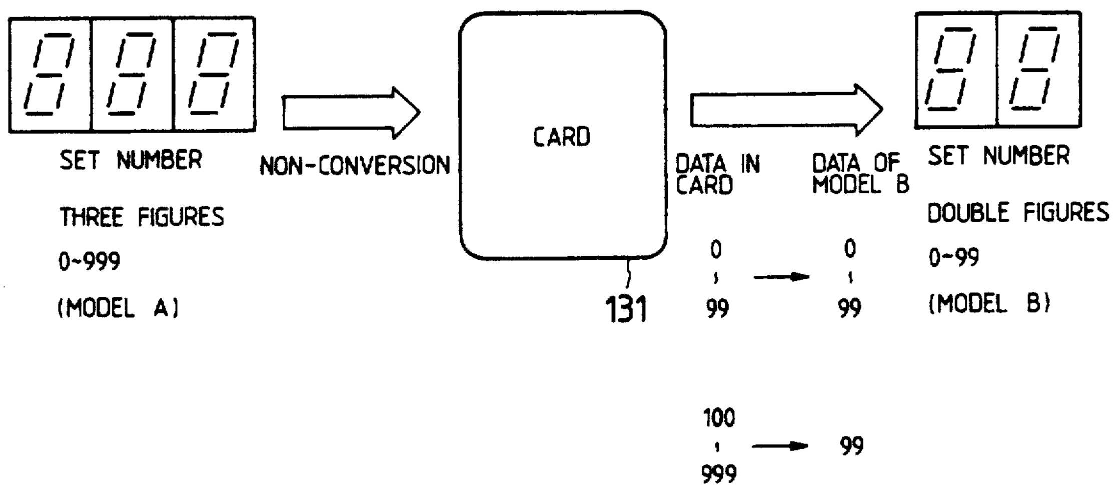

FIG. 39 shows the process of changing the number of sheets set in the machine model A to what is set in the machine model B. In the machine model A, the number of sheets in three digits, i.e., from 0 to 999 sheets are set and the number of sheets thus set is stored in the IC card 131. When the IC card 131 is set in the machine model B, the value set therein is set in the machine model B, provided the data stored in the IC card 131 represents the value ranging from "0" to "99". On the other hand, the number of sheets exceeding 100, i.e., the number of sheets exceeding what can be stored in the machine model B, is converted to 99 and stored in the machine model B. In this case, a precaution reading "Number of Sheets Exceeds Limit" may be displayed on the display panel of the machine model B, if necessary.

Figure 40:
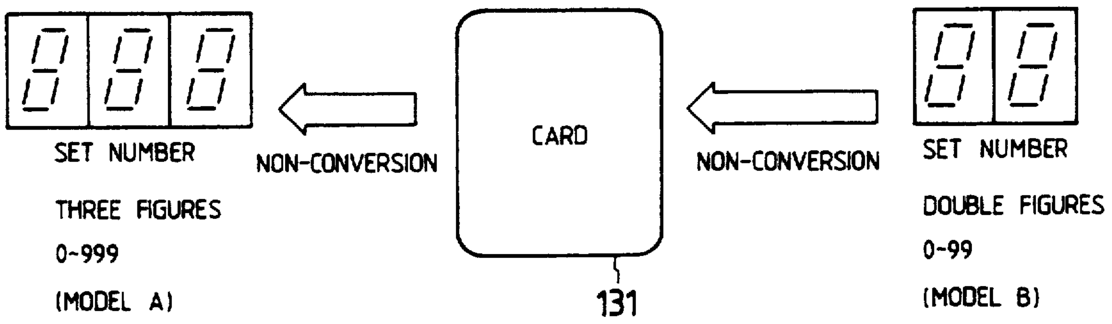

FIG. 40 is a diagram illustrating the conversion of the number of sheets set in the machine model B to that in the machine model A. The number of sheets as set in the machine model B is stored in the IC card 131, the value of which is also set in the machine model A.

Figure 41:
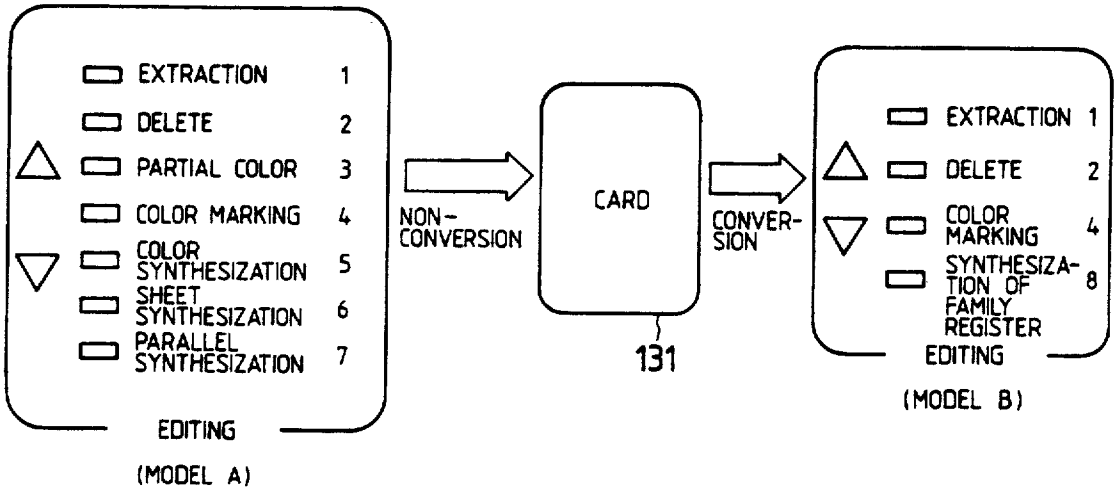

FIG. 41 is a diagram illustrating the editing function specified by the machine A for the machine model B. The editing function as specified by the machine model A is stored in the IC card 131. In this case, the contents of the editing function are codified as shown in TABLE 4b

| Editing function | → | Code |
|---|---|---|
| Extraction | → | 1 |
| Deletion | → | 2 |
| Partial Color | → | 3 |
| Color Marking | → | 4 |
| Color Synthesizing | → | 5 |
| Sheet Synthesizing | → | 6 |
| Parallel Synthesizing | → | 7 |

The editing function is correspondingly converted according to Table 5b in the IC card device 22 of the machine model B.

TABLE 5b

| Data in the card | → | Data in machine model B |
|---|---|---|
| 0 | → | 0 |
| 1 | → | 1 |
| 2 | → | 2 |
| 3 | → | 0 |
| 4 | → | 4 |
| 5 | → | 0 |
| 6 | → | 0 |
| 7 | → | 0 |
| 8 | → | 8 |

In Table 5b, the data "0" means there is provided no data corresponding to the editing function, whereas the data "8" represents the editing function of synthesizing family registers existent only in the machine model B but not in A.

Figure 42:
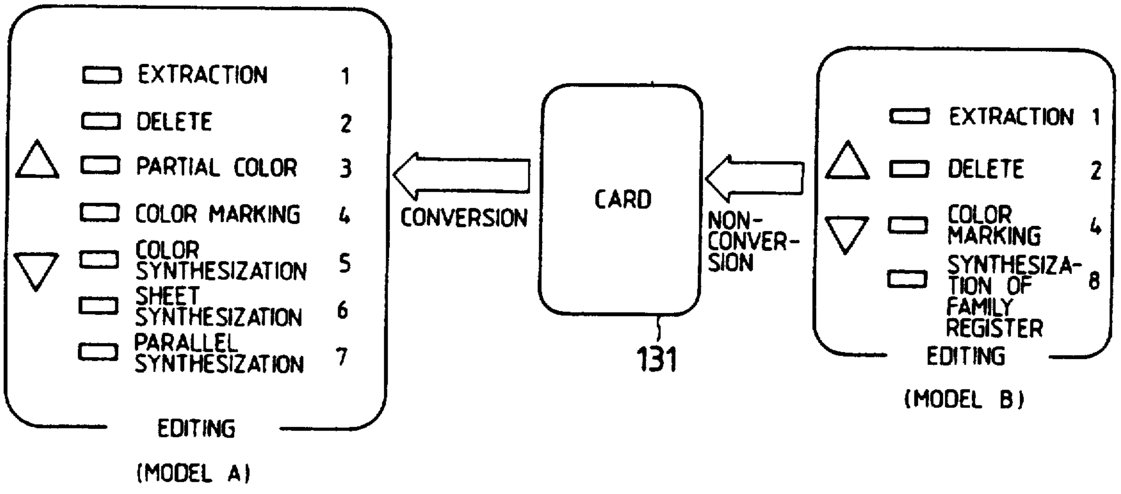

FIG. 42 is a diagram illustrating the conversion of the editing function reversely from the machine model B to A. When data is stored data from the machine model B to the IC card 131, the editing function as specified in the machine model B is stored according to Table 4. When the data is stored from the IC card 131 to the machine model A, the data from "0" up to "7" is stored in the machine model B without alteration. As for the data "8", it is converted to "0" when stored in the machine model B.

Figure 43:
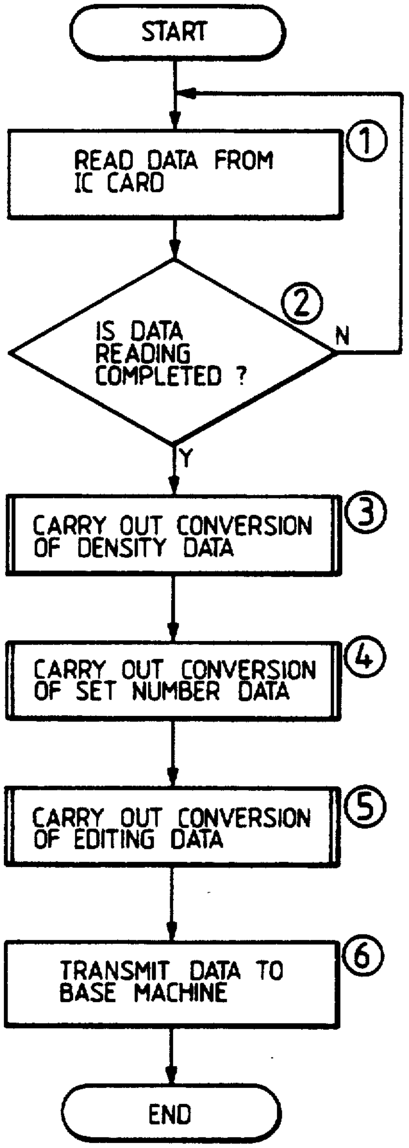

FIG. 43 is a flowchart illustrating the operation of the IC card device when data is read from the IC card in the model B. The IC card device 22 keeps reading data until data reading from the IC card 131 is judged completed (Step 1, 2). When the data reading is completed (Step 2, Y), the conversion of density data is carried out (Step 3). Subsequently, the conversion of the data of the set number of sheets is made (Step 4) and finally that of the editing data is carried out (Step 5). Upon completion of the aforesaid conversion, the data is transmitted to the main CPU 121 in the base machine 21 (Step 6).

Figure 44:
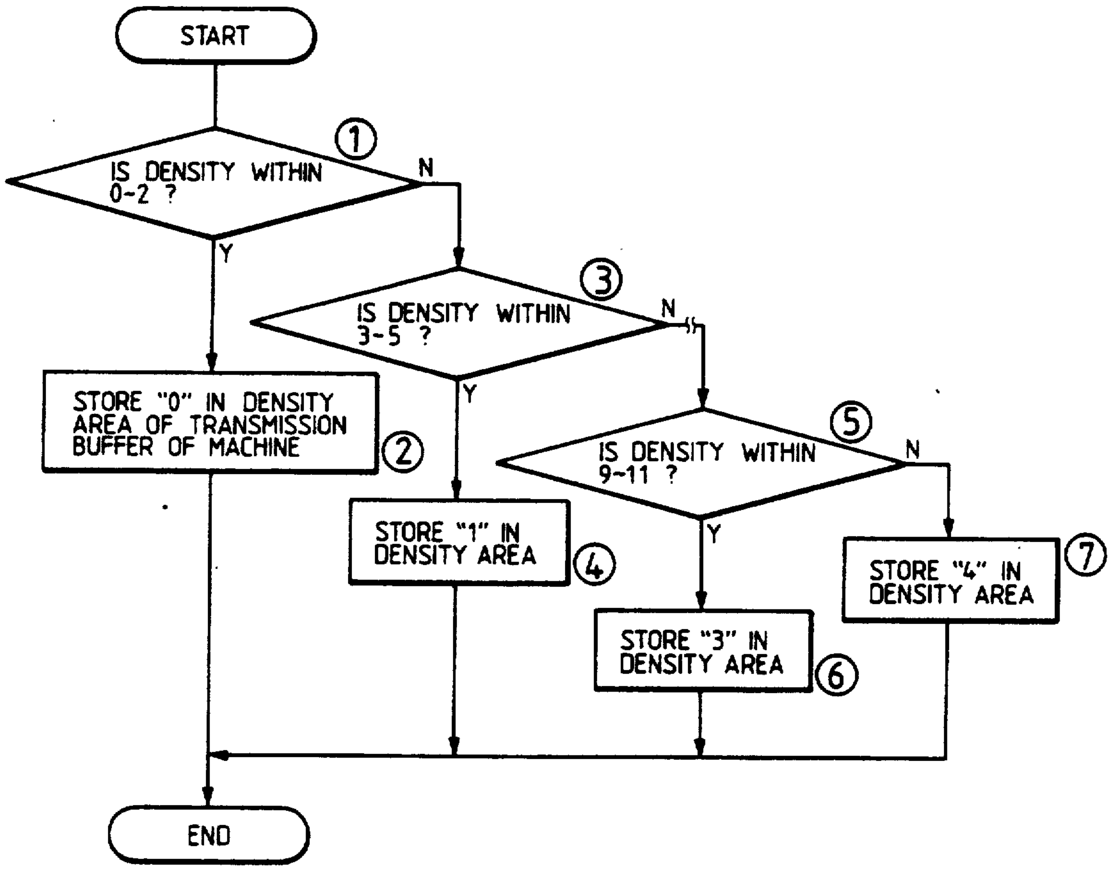

FIG. 44 is a flowchart illustrating the mode of converting the density data. In this mode of converting the density data, the density specified by the IC card 131 is identified with the one within the range of "0"~"2" (Step 1). If it is within the range (Y), the data "0" is stored in the density area in the transmission buffer of the machine proper provided in the RAM 511 of the IC card device 22 shown in FIG. 24 (Step 2). If the density specified by the IC card 131 is within the range of "3"~"5" (Step 3, Y), the data "0" is stored in that density area (Step 4). In the same manner, if the density specified by the IC card 131 is within the range of "9"~"11" (Step 5, Y), data "3" is stored in the density area (Step 6). If the density does not fall under the aforesaid category (Step 5, N), data "4" is stored in the density area (Step 7). The conversion of the density data supplied from the IC card 131 is thus completed.

Instead of converting the density data in that manner, the density data may directly be computed and converted. In other words, because the machine model B sets the density three times rougher than that on the part of the IC card 131, it is allowed to divide the density value read from the IC card by 3 and write the resultant product to the density area within the transmission buffer of the machine proper as density data.

Figure 45:
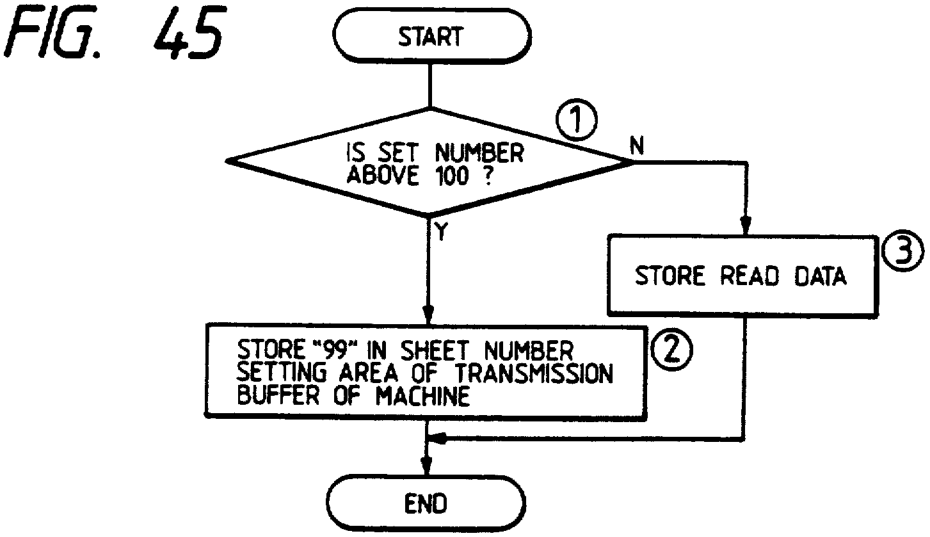

FIG. 45 is a flowchart illustrating the detailed mode of converting the set number of sheets. The card CPU 129 determines whether the set number of sheets supplied from the IC card 131 exceeds 100 (Step 1) and, if it exceeds 100 (Y), inputs data "99" in the sheet number setting area in the transmission buffer of the machine proper (Step 2). If the set number of sheets supplied from the IC card 131 is smaller than 100 (Step 1, N), the set number of sheets as read therefrom is stored in the sheet number setting area (Step 3).

Figure 46:
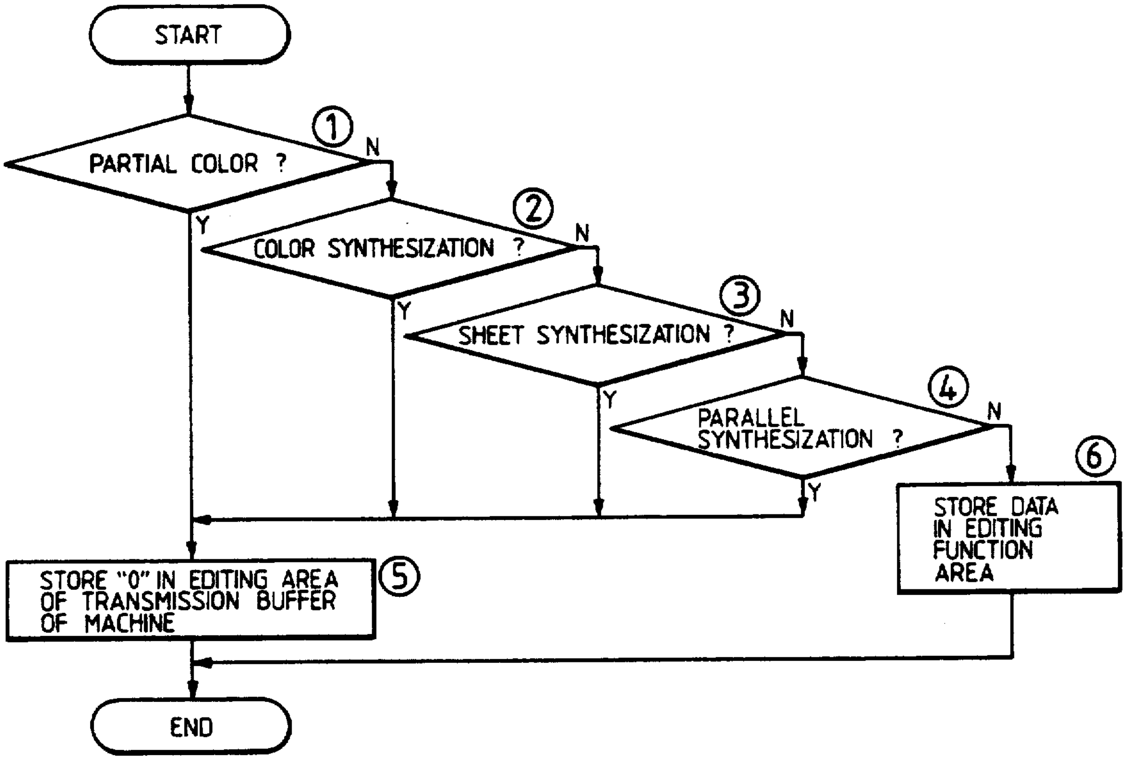

FIG. 46 is a flowchart illustrating the detailed mode of converting the editing function. If the editing function relates to the partial color, color synthesizing, sheet synthesizing or parallel synthesizing (Step 1~4, Y), data "0" is stored in the editing function area within the transmission buffer of the machine proper provided in the RAM 511 because no editing function corresponding to that of machine model B (Step 5). If the contents of an editing function other than those in Steps 1~4 are specified (Step 4, N), the data as read from the IC card 131 is stored in the editing function area (Step 6).

Figure 47:
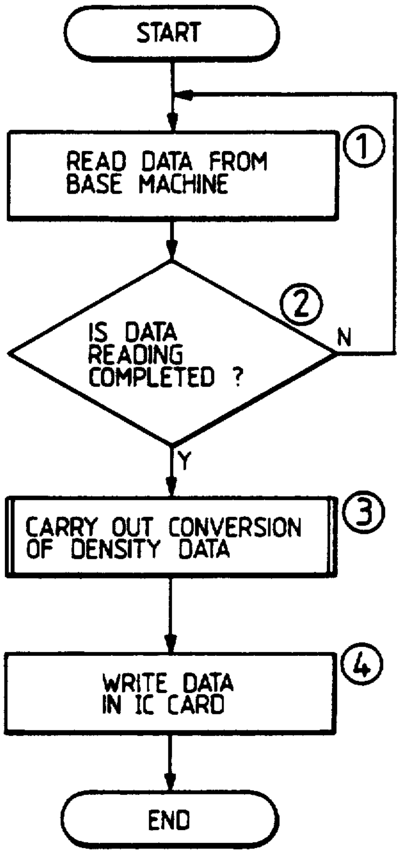

FIG. 47 is a flowchart outlining the operation of writing data to the IC card in the machine model B. When data is transmitted from the main CPU 121 to the card CPU 129, the data is written to and kept in the RAM 511 until the completion of the execution thereof (Steps 1, 2). Then the conversion of the density data only is carried out (Step 3) and, upon completion of the conversion, the data is written to the IC card 131 (Step 4).

Figure 48:
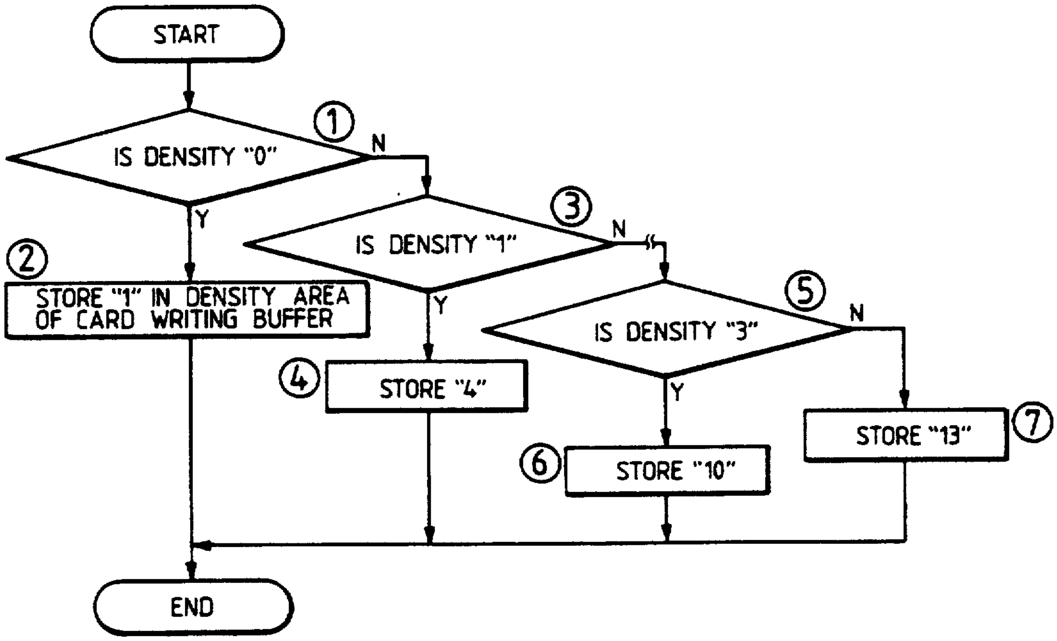

FIG. 48 is a flowchart illustrating the detailed mode of converting the density data when it is written to the IC card. In this mode of conversion, whether or not the density data sent from the machine proper is "0" (Step 1). If it is "0", data "1" is stored in the density area of the card-writing buffer provided in the RAM 511 (Step 2). If the density data supplied from the machine proper is "1" (Step 3, Y), on the other hand, data "4" is stored in the density area of the card-writing buffer (Step 4).

The conversion mode is thus implemented further. If the density data sent from the machine proper is "3" (Step 5, Y), data "10" is stored in the density area of the card-writing buffer (Step 6) and data "13" is stored in any other cases (Step 5, N).

A description has been given of data conversion when the mode is designated relative to three functions; namely, the copy density setting, the number of sheets setting and the editing functions. The contents of the function data intended for data conversion is not limited to those above-described. Instructions concerning the following function data may be given via the IC card to the counterpart copying machine. Otherwise, the function data is convertible to almost nearly the same one.

(i) Intermediate erasing quantity: Like book-binding originals, each original covering two pages is mounted on the platen glass plate once and the left- and right-hand sides thereof may often automatically copied one page after the other. In this case, images in the boundary portion of the original divided into left- and right-hand parts are erased so as to prevent a boundary line or shadow from being produced therein. However, it poses a serious data-conversion problem how the image-free breadth set in a copying machine is applicable to another copying machine.

(ii) Synthesizing tray: When images are synthesized, the copying paper used for copying once is temporarily placed aside before being fed again and this copying operation is repeated. The problem is how the data designated in a copying machine so as to specify a tray for temporarily storing the copying paper therein is converted for use in another copying machine. If the counterpart machine model is equipped with the intermediate tray described in this embodiment, for instance, the intermediate tray may be used as what temporarily keeps the copying paper.

(iii) Paper cover tray: When copying paper different from what is used for the body is employed, the copying paper for use as the cover is placed on a predetermined feed tray beforehand and, when the copy-making operation is conducted for the cover, the copying paper is sent out from the particular try (paper cover tray). It is necessary which one of the tray should be specified as the cover tray for the purpose. Consequently, the tray thus specified may have to be properly changed in order that it fits the opposite copying machine.

(iv) Paper tray: When a plurality of paper trays for feeding copying paper to a copying machine exist, the tray for use in its copy-making operation may be specified sometime. In this case, the tray is changed to fit the corresponding tray in the opposite copying machine in consideration of the size of paper accommodated in the former tray.

(v) Paper discharge face: In a copying machine provided with a mechanism for switching the side of copying paper being discharged, whether the copying paper discharged with the copied side up or down can be selected. Data conversion becomes necessary like wise when no instructions are exchanged between copying machines.

Since the function data stored in the storage media is made convertible so that the function data fit for each copying machine is used for copying-taking operation in this embodiment, not only the copying-taking operation desired but also maintenance.inspection is possible without bothering about which one of the machine models or manufacturers sometimes should be selected for use. Admittedly, error-free business processing can be conducted even though its user is adequately trained to handle the copying machine or facsimile.

As storage media applicable to a plurality of machine models, it is unnecessary to carry more than one IC card. Therefore, the storage media are quite easy to be taken in custody.

In the aforesaid first embodiment, the additional control data for controlling the copying machine from the IC card is combined with the basic control data prepare din the copying machine proper beforehand for the purpose of controlling the copying machine. In other words, the use of the additional control data being supplied from the IC card in possession of each user to the copying machine proper makes materializable the easiest-to-handle copying functions.

The copying machine thus proposed has posed the following problems:

(i) In this copying machine, the potential functions of the copying machine may be restricted, depending on the contents of the additional control data read from the IC card, so as to materialize only those each user desires. When users respectively wanting the functions A and B have this copying machine for common use, it will have to perform both the functions potentially. Consequently, this copying machine should have many functions and it is large-sized and therefore expensive.

(ii) When a plurality of users have the proposed copying machine for common use, the charge for its use depends on the additional control data stored in the IC card own by each, i.e., the higher the multiplicity of the function desired, the greater the expenses shared for the use of the copying machine, so that common interests among the users can be adjusted. As the owner of the IC card which stores the additional control data for adjusting the contraction/magnification of an original in 11 stages enables him/her to use the copying machine in a way much more sophisticated than the owner of the IC card storing the additional control data for adjusting the contraction/magnification thereof in 5 stages, for instance, the expenses can be shared impartially among the purchasers of the copying machine by setting the share of the former greater than the later. Notwithstanding, users without bearing proper expenses may make the most of the copying machine freely by using the IC card storing high-grade additional control data intended for the same copying machine (e.g., the additional control data for making possible free contraction/magnification) by stealth or if the card is a resold one or otherwise if the contents thereof are those pirated.

(iii) Assuming a user who desires copying-paper sorting by means of the sorter and another who desires no such sorting employ the functions of the copying machine in their own ways intended, the sorter is usually attached to the copying machine. The latter desiring no sorting operation will have the copying-paper always discharged on the uppermost bin of the sorter. However, if the latter inadvertently causes a certain trouble to the bin of the sorter, it poses a serious problem on which user is responsible for bearing the repair or replacement cost. This is because the sorter is not needed in the case of the latter and because the trouble like that would have not occurred if the copying machine had been provided with a simple discharge tray.

On the other hand, there has been proposed a copying machine to which various additional devices can be attached selectively. The ADF or sorter is fitted to the copying machine proper when the user so desires. However, the copying machine to which a 10-bin sorter can be connected may often differ in model from that to which up to a 20-bin sorter can be attached. Accordingly, one who has bought the former will have to replace it when he/her needs the 20-bin sorter. By this is meant that the kind and scale of the electronic circuit used in one copying machine are different from those used in the other and there is the difference in design concept therebetween. Although they have additional devices (the 10-bin sorter in this case) for common use, they are often defined as products whose characteristics are entirely different from each other.

Although a description has been given of the copying machine, other recording apparatus such as facsimiles and printers has posed similar problems.

The present embodiment has been made in order to solve the above-described problems and a copying machine in this embodiment permits its user to freely select additional devices, so that it fits user requirements.

(0) Basic principle of a fourth embodiment.

Figure 49:
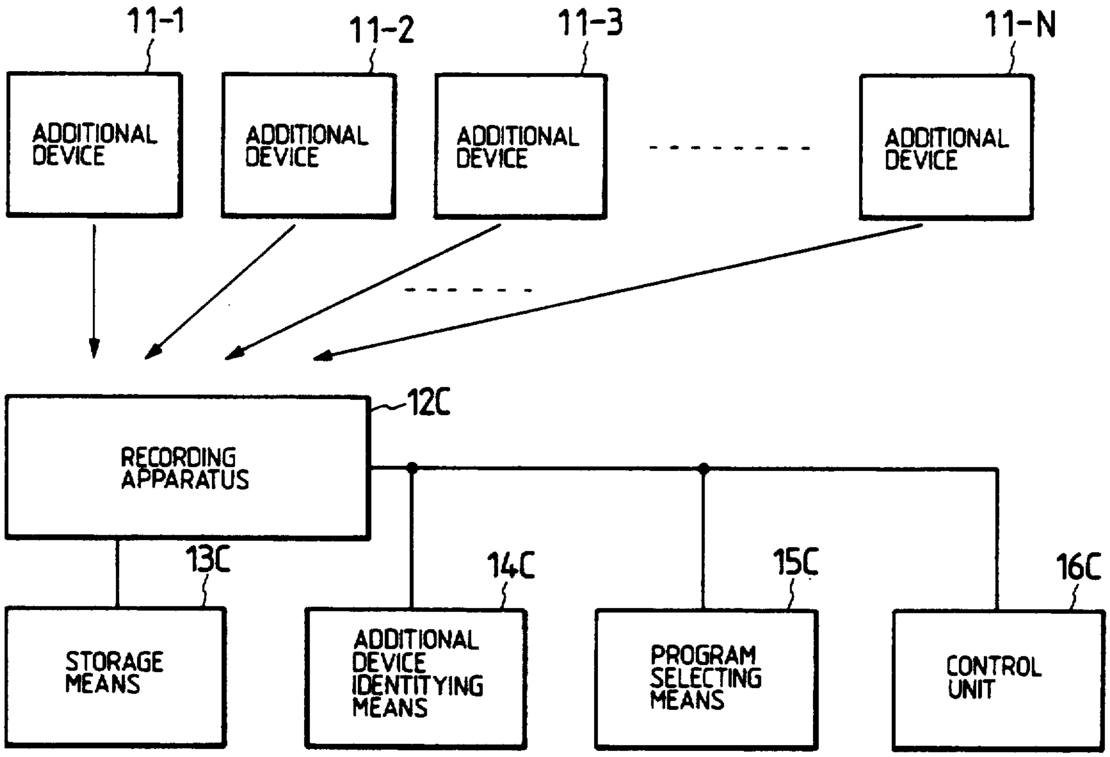
FIG. 49 is illustrative of the principle of a fourth embodiment of the present invention.

As shown in FIG. 49 which illustrates the principle of the fourth embodiment, a recording apparatus comprises a recording apparatus proper 12C to which additional devices 11-1~11-N can be fitted; storage means 13C for storing programs for controlling the additional devices 11-1~11-N; additional device identifying means 14C for identifying the kinds of additional devices (e.g., 11-1, 11-2) fitted to the recording apparatus proper 12C, the additional devices being ready for operation; program selecting means 15C for making effective the programs for the additional devices 11-1, 11-2 identified by the additional device identifying means 14C as being ready for operation; and control unit 16C for controlling the recording apparatus using the programs selected by the program selecting means 15C and a program for controlling the recording apparatus proper.

The storage means 13C may be an read only memory arranged in the recording apparatus proper 12C or an external storage device such as a portable storage medium. An typical example of the latter is an IC card. Provided the storage means 13C is a rewritable memory such as a nonvolatile memory backed up by a battery, it can be contained in such a state that a program for controlling a newly developed additional device has been added. Moreover, although the additional device may be identified as being ready for operation instantly while it is being fitted to the recording apparatus, the additional device itself should not be detached frequently if it is large-sized or must be handled with care. In that case, a key is provided for each additional device, which is designed to be usable by specified users. Or otherwise, the portable storage medium such as an IC card may be stored with the kinds of additional devices that are usable. A cipher code may be set in the storage medium at that time in order that the recording apparatus prohibits any of the additional devices from being used if the cipher codes do not coincide. In so doing, the additional devices are prevented from being used without warning by means of a storage medium intended for another recording apparatus.

In this embodiment, the program for controlling each additional device attachable to the recording apparatus is stored in the storage medium and selected for use correspondingly to the additional device fitted to the recording apparatus. Accordingly, if the additional devices thus arranged are fitted to the recording apparatus, its fabrication will be completed instantly as what is most suitable for the user. If the user changes the layout of additional devices, the function of the recording apparatus also changes proportionally.

(1) System configuration of copying machine.

Since the system configuration of the copying machine in this embodiment is similar to those described in the first to third embodiments, the description thereof will be omitted.

(2-1) Advantage of software combination.

The system configuration of the copying machine in this embodiment can also be detailed by reference to the software combination thereof. More specifically, since various additional devices can be fitted to the copying machine, the software is provided so that it conforms to the system configuration corresponding to an arrangement of additional devices.

One of the reasons for the adoption of such software package is (i) that, if control programs for use in operating all of the additional devices are to be provided in the base machine 21, the memory capacity required would become enormous Another reason is (ii) that, when additional devices are newly developed in a future or when any improvements are made in the existing ones, they can be utilized without the replacement of the ROM (Read Only Memory) in the base machine 21 or the addition of a new one.

Accordingly, there are provided two areas: a copying condition designating area having a plurality of storage areas $M_1 \sim M_N$ for registering various recording conditions; and a program storage area for storing additional programs. The base machine 21 contains a memory having a basic storage area for use in controlling the basic part of the copying machine; an additional storage area where the programs read from IC cards are stored; and a recording condition storage area where the recording conditions received from the IC card recording condition designating area are stored. In the additional storage area, various programs for controlling the ADF 23, the DADF 14 the console panel 28, etc. are stored. When an IC card is set in the IC card device 22 after the predetermined additional devices are fitted to the base. machine 21, a program necessary for copy-making operation is read out and loaded on the additional storage device. The program thus loaded is used to control the copy-making operation in cooperation with the program written to the basic storage area or as what is given priority over the other.

(2-2) Examples of differentiation.

The program stored in the IC card controls the functions of the copying machine in this embodiment and the recording conditions corresponding to the functions designated by the basic storage area of the copying machine proper and the IC card program storage area are designated in the recording condition designating area. Accordingly, one mode of using the copying machine can be differentiated from the other by replacing the card with a new one which stores a different program. A description will subsequently be given of the differentiation by referring to some examples.

As a first example, a copying machine for common use is installed in a building housing a number of independent business institutions or in a company or factory having different departments or sections. The installation of a copying machine for common use in the latter case is required in view of budget control and an instrument such as a copy-riser is normally employed to control service conditions on a department or section basis.

It is also assumed that the copying machine has a relatively high-grade system configuration comprising, as shown in FIG. 2, a base machine 21, an IC card device 22, a DADF 24, a sorter 38, a console panel 28, second-fifth feed trays 31-2~31-5 and an intermediate tray 33. The joint users or sections include those who need no DADF 24, sorter 38 nor additional devices.

If all the expenses for the use of the copying machine were to be divided among the users or sections whose operational requirements differ with the copying volume, those taking copies of little volume would be very much opposed to introducing a copying machine equipped with various additional devices and this makes it extremely difficult to mediate between the high- and low-degree users or sections.

Such a problem can be solved by allowing an IC card to each user or section according to the operation rate so as to let the users or sections wishing high-grade functions bear greater basic expenses in proportion to the operation rate. In this manner, many functions can be utilized. The owner of the highest grade IC card, for instance, is allowed to freely use the DADF 24, the sorter 38, the second~fifth feed trays 31-2, 31-5 and the intermediate tray 33 by operating the copying machine while the IC card is set in the IC card device 22 to ensure the improved efficiency of business. On the other hand, the user who does not want to have copying paper sorted can save the expenses by setting an IC card lacking a sorting program and employing the uppermost bin of the sorter 38 as a discharge tray.

As a second example, assuming that a trader is running a self-copy service store using IC cards.

There are a plurality of copying machines disposed in the store, the copying machines being equipped with IC card devices, respectively. Each customer asks for an IC card corresponding to the desired mode of service, so that he can take copies on a self-service basis by setting the IC card in the desired copying machine. The customer who is unfamiliar with the operation of a copying machine may be given an IC card incorporating an operational instruction display function in the program and, by setting the IC card, can take copies errorlessly according to the operational data displayed on the console panel 28. Whether or not the use of the DADF 24 or the execution of multicolor recording is possible can be determined by a lend-lease IC card, whereas the storekeeper is capable of assigning a copying machine at a proper rate to a particular customer by limiting the copying machines for use. Moreover, the storekeeper is also able to take careful though out measures such as offering copying-charge discount service to regular visitors because he can instantly charge them therefor by writing copy-making data to the IC card, the data including the number of sheets, the size of copying paper used and so on.

As a third example, a description refers to service using an IC card storing programs intended for a specific user. In patent attorneys' offices, copies of relatively large magnification, e.g., 200% magnified copies are often taken because of the necessity for making full-scale copies when patent gazettes contracted by the photomechanical process are examined. Moreover, the original drawings will have to be contracted or magnified fractionally as requested by the government agency when they are submitted thereto. In the resident-card copy-making sections of municipal offices or ward offices, on the other hand, certified copies or abstracts of the originals are prepared with the deletion of image data in columns thereof where the data should be treated in confidence so as to protect the data of persons other than those claimed and their privacy.

In that manner, some users may demand to use copying machines in the special modes of use. If the functions of copying machines are set to meet such requirements, their console panels will becôme complicated in construction and moreover the ROMs inside the copying machines also become large in size. Consequently, IC cards classified by special users are used to provide copying machines having functions most suitable for such users by letting them set the IC cards therein.

In the case of patent attorneys offices, for instance, the purchase of IC cards for special use allows them to simply select 200% contraction/magnification in addition to several ordinary kinds of contraction/magnification as fixed ones. It also becomes possible for them to set contraction/magnification at a rate of, e.g., 1% within a range of required fine adjustments. A console panel for special use may be fitted to the base machine 21, if necessary, at that time in order to provide every convenience for the operational purpose.

In the aforesaid resident-card copy-making sections, instructions concerning kinds of resident cards, columns and items to be deleted, etc. can be given on liquid crystal displays by pressing keys such as ten keys and, by pressing the start key, the desired range of the original may be copied or the necessary contents thereof are edited before being recorded.

As set forth above, the differentiation in the use of the copying machine can be made distinct by adding a certain display to the surface of the IC card 131 as a storage medium and this prevents a user from carrying a card belonging to another by mistake. Even if someone modifies the program stored in the IC card 131 to obtain functions of higher grade, it is possible to find out the unfair practice from its external appearance. The surface of the IC card 131 should preferably be colored gold, silver, red or blue relative to the functions involved.

Functions usable via each storage medium such as an IC card, simultaneously with a symbol representing the post of an employee, e.g., a division or section manager or a clerk may be displayed on the surface thereof. On the surface of the storage medium, for instance, if the symbol and [ALL]are indicated, all the functions are usable at any time;

if the symbol and [CONTRACTION/MAGNIFICATION, ADF, HCF, DUPLEX] are indicated, contraction/magnification, and the use of the ADF 23 and the DADF 24 are possible but any functions other than those specified are not usable.

(3) Configuration of apparatus ~ (5) circuit configuration of copying machine.

As the circuit configuration in this embodiment is also similar to what has been described in the first ~ third embodiment except for the following, the detailed description thereof will be omitted.

Although a RAM (Random Access Memory) 121E of 56K bytes is provided in the base machine 21 of a smallest copying system in this embodiment, the number of RAM 121E is increased, depending on the possibility of attaching additional devices. In this embodiment, a RAM 121E of 112K bytes is used in this copying machine. Data equivalent to a plurality of IC cards is written via the IC card device 22 to the RAM 121E and further data needed at the time of controlling the copying machine is temporarily stored. The data written by the IC card is mainly a control program relating to each additional device and its interface circuit.

(6) Program stored in copying machine.

Table 1c shows kinds of programs stored in the IC card 131 and the maximum values of the memory capacity required to store each program with respect to some of them. The additional devices employed now and necessary programs are selected by taking future development into consideration and written to the IC card 131 in each copying machine. As the IC card 131 in this embodiment has a capacity of 64K bytes, a plurality of IC cards, if necessary, are provided when the number of programs being stored is large and successively loaded from the IC card device 22 or a plurality of IC card devices are installed. Needless to say, an IC card having a larger capacity may be used and, by storing the programs in the form of a ROM for the basic additional devices in the copying machine proper, the quantity of the data written from the IC card 131 can be reduced.

TABLE 1c

| Kinds of programs: | Maximum storage capacity: |
|---|---|
| Back lit type console panel | 1K byte |
| Liquid crystal type console panel | 32K bytes |
| Console panel with CRT display | 64K bytes |
| Interface circuit related to console panel | 2K bytes |
| Intermediate tray | 4K bytes |

TABLE 1c-continued

| Kinds of programs: | Maximum storage capacity: |
|---|---|
| Fourth & fifth trays | 4K bytes |
| Large capacity tray | 4K bytes |
| Interface circuit related to trays | 2K bytes |
| ADF | 4K bytes |
| DADF | 4K bytes |
| SADH | 4K bytes |
| Interface circuit related to original feeder | 2K bytes |
| Editor pad | 4K bytes |
| Interface circuit related to editor pad | 2K bytes |

The console panel with the CRT display (not shown in FIG. 2) consists of a CRT and a simple console panel or operating board fitted to the copying machine. When the copy density is set, for instance, a plurality of marks provided by densities are displayed on the CRT and the copy density required is selected by the shift keys or cursor.

The SADH is a semiautomatic original feeder. When an original is manually inserted at one end of the SADH, it is conveyed to a predetermined position on the platen glass plate at fixed timing an discharged on the original discharge tray after exposure.

Although not shown in Table 1c, a program for a finisher in addition to the sorter is stored in the copying machine proper so that the purchaser of the finisher may attach it to the copying machine proper. The finisher is a device having the function of not only sorting copying paper but also automatically binding sheets of copying paper with a stapler when they are stacked in each bin after being sorted.

(7) Storage of program in copying machine.

Figure 50:
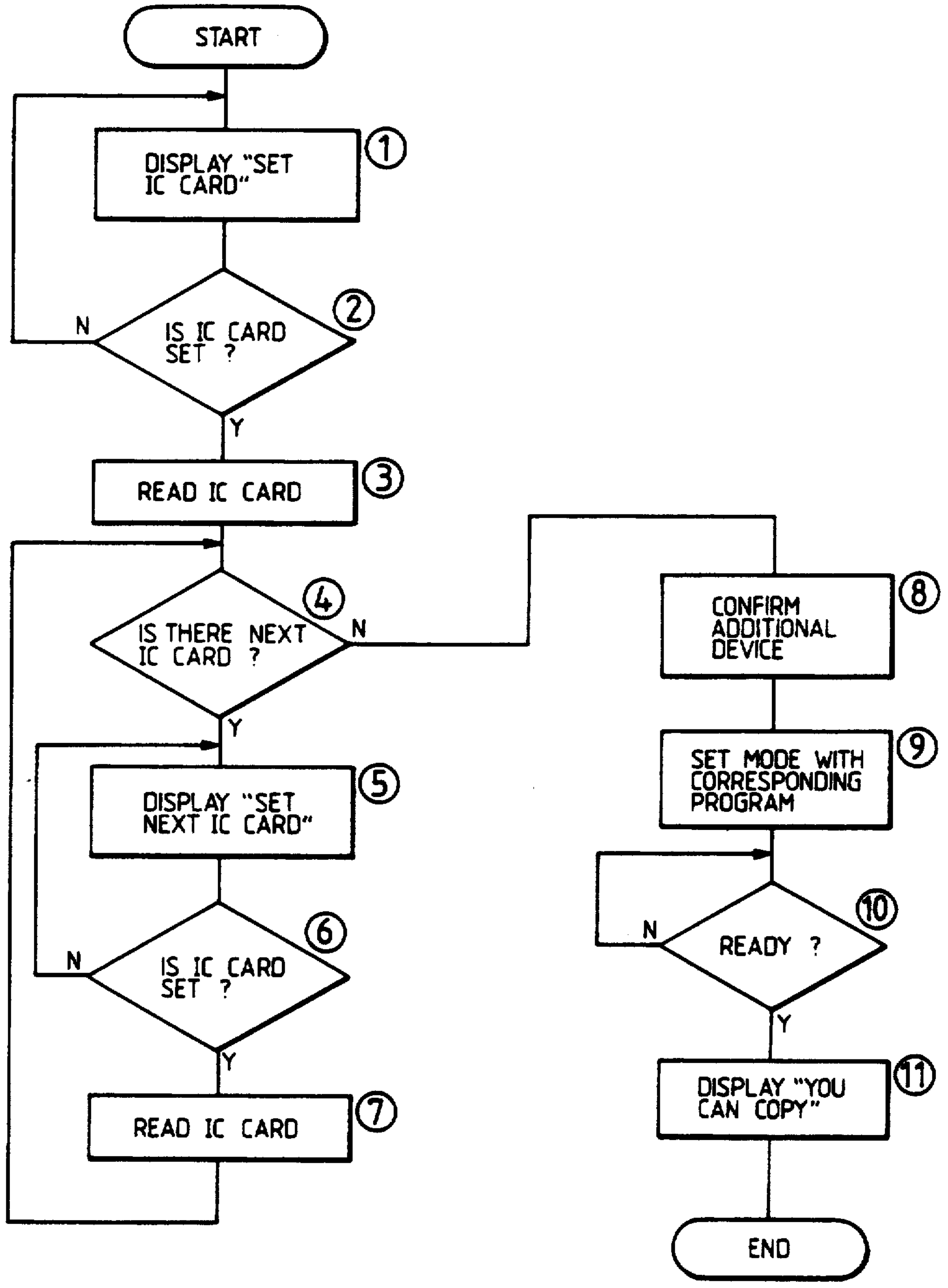
FIG. 50 is a flowchart illustrating the mode of reading data from IC cards to a copying machine body.

FIG. 50 is a flowchart illustrating the mode of writing programs after the IC card is inserted. When power is supplied to the copying machine in this embodiment, "Set IC card" is displayed on the liquid crystal display 112. When the IC card 131 is set, it is read (Step 3). At this time, "Card Reading" is displayed on the liquid crystal display 112. The length of time required to read a sheet of IC card is very much short because the data is transferred from the IC card 131 to the copying machine proper in a large capacity transfer mode as will be described later. Consequently, the "Card Reading" display can be omitted.

When the reading of the IC card 131 is completed, the main CPU 121 identifies the predetermined data written to the IC card 131 and determines whether it is necessary to read other cards following the first one (Step 4). IF programs have to be read by the plurality of IC cards 131 (Y), the CPU instructs the liquid crystal display 112 to set the next card (Step 5). At this point of time, the IC card 131 set previously has been removed from the IC card device 22. When the second IC card 131 is set (Step 6, Y), data is read from that IC card 131 likewise (Step 7).

When the reading of the data stored in these IC cards 131 is completed (Step 4, N), the main CPU 121 confirms the additional device ready for operation (Step 8). In this copying machine, a detection signal for detecting the additional device fitted is compared with the data representing the kind of each of the additional devices written by the owners and, when both conform to each other, the corresponding additional device is identified as what is "ready for operation." At this time, a cipher code common to the IC card for use in this system may be written to the nonvolatile memory 121F in the base machine and also to the IC card 131 in order to identify the coincidence between them when the additional device is identified as being usable or the IC card 131 is set in the IC card device 22 (Steps 2, 6). When the coincidence is not obtained, the additional device is regarded as being not usable to prohibit the use of the copying machine itself to ensure that an IC card intended for use in another or a different copying machine is prevented from being unfairly used.

Figure 51:
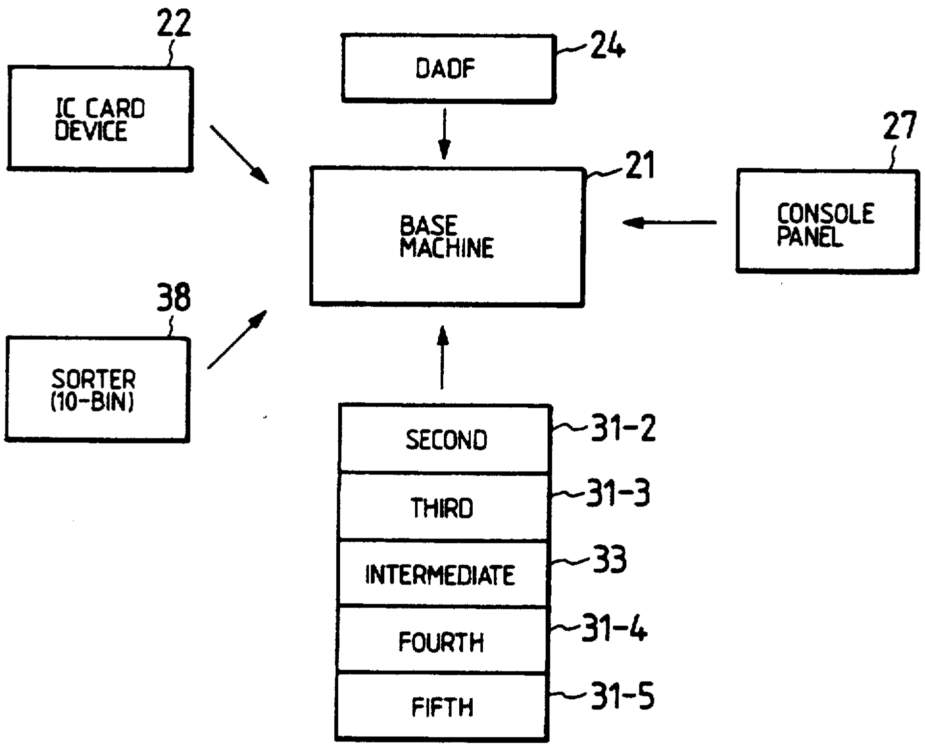
FIG. 51 is a system configuration of a copying machine in this embodiment.
Figure 52:
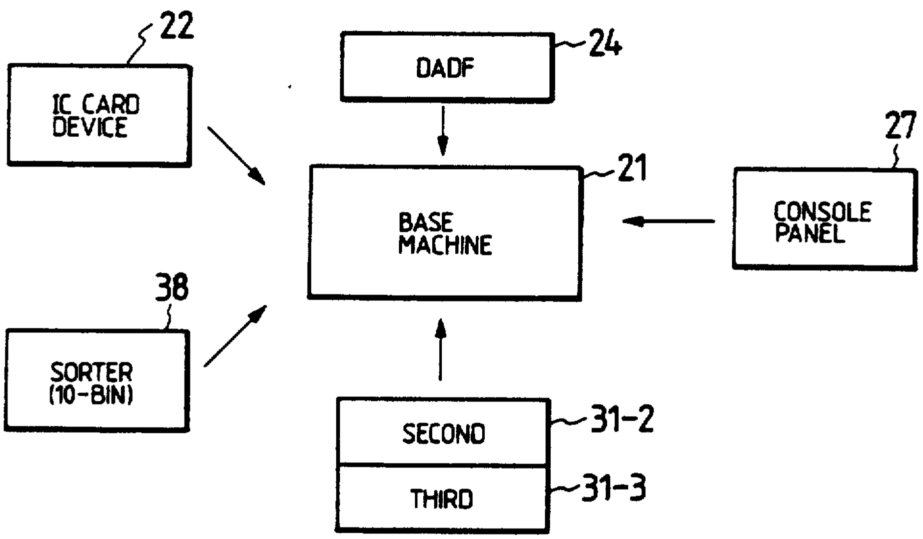
FIG. 52 is a system configuration wherein some of the additional devices have been removed from the copying machine shown in FIG. 51.

FIGS. 51, 52 are diagrams illustrating different system configurations of the copying machine by setting whether the additional device is usable or not. FIG. 22 shows the system configuration of the copying machine as installed in the embodiment of FIG. 2. If the intermediate tray 33 and the fourth and fifth feed trays 31-4, 31-5 are unnecessary in this system configuration, the copying machine is constructed as shown in FIG. 52.

The programs for all of the additional devices 22, 24, 27, 31-2~31-5, 33, 38 shown in FIG. 51 are stored from the IC card in the base machine 21. If data defining these additional devices 22, 24, 27, 31-2~31-5, 33, 38 as "usable" has been written to the IC card, copy-taking operation is performed by the copying machine having the functions shown in FIG. 51. Duplex copies and those with recording colors superposed or multicolor marking are obtainable using the intermediate tray 33, for instance.

Assuming data specifying only the additional devices 22, 24, 27, 31-2, 31-3, 38 shown in FIG. 52 as being "usable" has been written to the IC card 131, on the other hand, the copying machine functions as shown therein. When the additional devices 22, 24, 27, 31-2, 31-3, 38 shown in FIG. 52 are coupled and even if the IC card 131 which stores data designating all of the additional devices 22, 24, 27, 31-2~31-5, 33, 38 shown in FIG. 22 as being "usable" is used, the nonexistent additional devices 31-4, 31-5, 33 are needless to say not controlled. In other words, it never happens that the conveyance of copying paper 60 (FIG. 4) is so controlled as to make the intermediate tray 33 usable by mistake or that multicolor marking is implemented on the console panel 27.

Referring to FIG. 50 again, the description will be continued. When the main CPU 121 confirms the additional devices (Step 8), it makes effective the programs applicable among the additional devices kept usable as described above and sets the copying machine in the mode of the respective functions (Step 9).

Further, when the copying machine becomes ready for copy-taking operation as the temperature of the heat roll 66 shown in FIG. 4 reaches the prescribed degree (Step 10, Y), "Start Copying" is displayed on the liquid crystal display 112 (Step 11).

(8) Upgrading of functions of copying machine.

Figure 53:
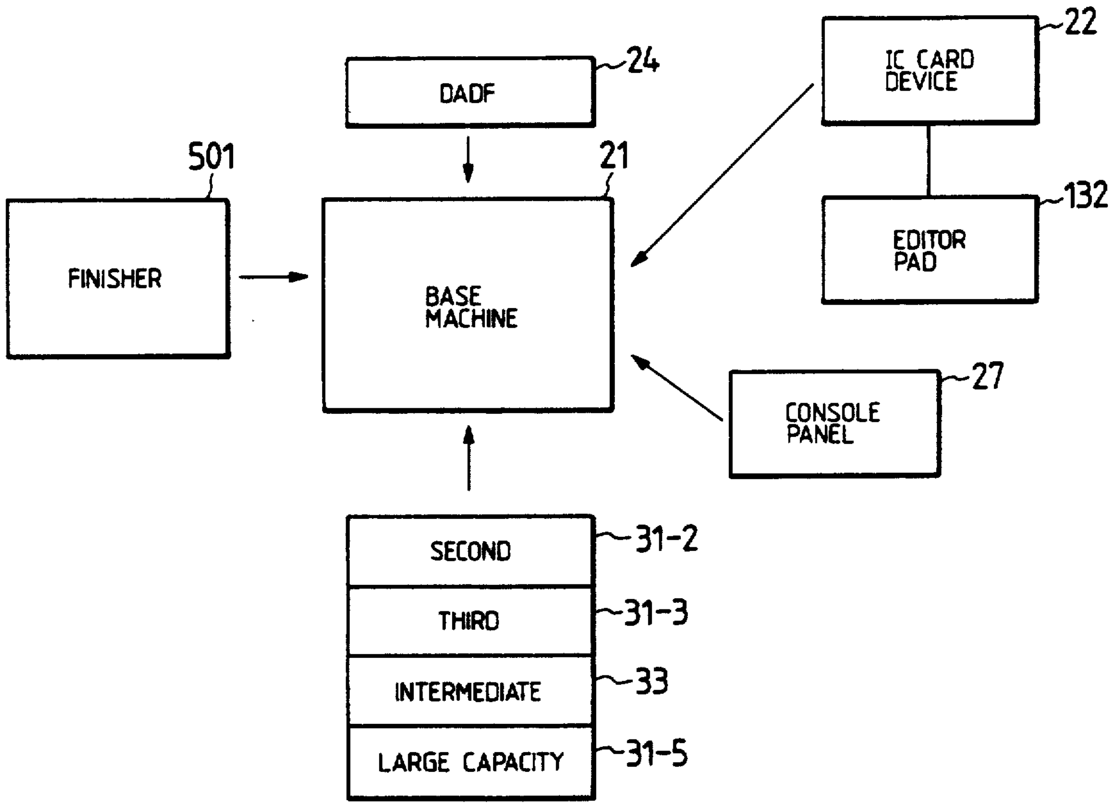
FIG. 53 is a system configuration wherein additional devices have newly been added to and some of the additional devices have been removed from the copying machine shown in FIG. 51.

It may sometimes become necessary to upgrade the copying system shown in FIG. 51 or largely alter the system configuration thereof. Taking a copying machine shown in FIG. 53 as an example, a finisher 501, and editor pad 131 (FIG. 6) and a large capacity tray 471 have newly been added to the copying machine as additional devices, whereas the 10-bin sorter 38 and the fourth and fifth feed trays 31-4, 31-5 have been removed.

Provided the programs for the newly added additional devices 511, 132 and 471 have been written to the IC card 131, these additional devices can instantly be usable. However, if programs for every and all additional devices are initially provided, the capacity of the storage medium such as an IC card tends to become excessively large and this imposes a useless burden on the user of the copying machine. Moreover, supposing the finisher 510 is developed after the purchase of the copying machine, no program for use in taking copies by incorporation the device has not yet been developed at that point of time. Consequently, programs should be added or altered when the functions of the copying machine are upgraded.

As illustrate in FIG. 50, new program are stored in the RAM 121E of the copying machine on each of such occasions by means of the IC card. When a program is added, the corresponding contents of the IC card 131 are accordingly altered. When the total quantity of programs has increased because of the alteration of the programs, the number of RAM 121E should be increased as occasion demands.

In such a copying machine so constructed as to store the programs in the copying machine proper, on the contrary, the data is to be rewritten when the storage media such as the ROM 121D, CD.ROM themselves are replaced or when the data is stored in rewritable memories such as the nonvolatile memory 121F of the copying machine proper and floppy disks. An eternal storage medium or IC card 131 is used as means for transferring the program after being altered.

(9) Data reading by IC card.

(9-1) Advantage of IC card.

The IC card 131 is employed as a storage medium for use in exchanging data with the copying machine in this embodiment. There are storage media in the form of at least a card; representative media include (i) a magnetic card, (ii) an IC card and (iii) an optical card.

Of those cards, (i) magnetic cards store data in magnetic stripes and are mainly used as cash cards in banking institutions and various credit cards. The magnetic card generally has a storage capacity of 72 bytes and is capable of storing 72 characters. The magnetic card can read and write data using a magnetic head and is repeatedly usable. Although the card itself is inexpensive but disadvantageous in that no operations are possible on the card and that the storage capacity thereof is very small.

On the other hand, (ii) IC cards each incorporated CPUs (Central Processing Units) and memories therein. The IC card has a storage capacity of as large as, e.g., 2.8K bytes and is capable of storing as many as several million characters. Moreover, the IC card can read and write data and is repeatedly usable. Accordingly, the IC cards are expected to be used as emergency medical cards, shopping cards, etc. Although operations on the card is possible, its disadvantage is high production cost.

Lastly, (iii) optical cards are used to write data by the photomechanical process and to read the data by means of optical sensors. The optical card has an extremely large storage capacity, e.g., ranging from 400K bytes to 2M (mega) bytes. Its production cost would considerably decrease if they were to be mass-produced. However, operations and the addition of data are impossible on the optical cards but they are expected to be used for books, dictionaries, telephone directories, educational software, etc.

Capabilities of storage media that the present invention anticipates include reading and writing data set in readers.writers. Accordingly, optical cards are excluded from the recording media in the present invention. IC cards are employed as storage media for copying machines instead in the embodiments of the present invention because the IC card has a storage capacity larger than that of the magnetic card and is excellent in view of security as compared with the latter.

Other storage media applicable to the present invention further include 3.5 inch floppy disks, magnetic tapes and magnetic bubble memories.

(9-2) Construction of IC card device.

The circuit configuration in the connection of the IC card in the IC card device is shown in FIG. 23 as in the case of first to third embodiments. The IC card device 22 is, as shown in FIG. 6, equipped with the card CPU 129. The card CPU 129 consists of the RAM 511 having a storage capacity of 4K bytes and the ROM 512 also having a storage capacity of 4K bytes. The ROM 512 in this case is a memory storing programs for controlling the IC card device 22, whereas the RAM 511 is a scratch pad memory for temporarily storing various kinds of data.

The card CPU 129 is connected to two serial/parallel converters 513, 514. The first serial/parallel converter 513 exchanges serial data with the IC card 131 set in the IC card device 22 and also exchanges parallel data with the card CPU 129. The second serial/parallel converter 514 exchanges serial data with the base machine 21 and, by effecting serial/parallel conversion or parallel/serial conversion, exchanges parallel data with the card CPU 129. Two clock generating circuits 515, 516 are provided in the IC card device 22. The first clock generating circuit 515 supplies a clock signal of 4.9152 MHz to the IC card, whereas the second clock generating circuit 516 supplies a clock signal of 7.3728 MHz to the card CPU 129.

The card CPU 129 supplies voltages Vo and $V_{pp}$ via an output port 518 to the IC card and also supplies a reset signal RST. Moreover, the card CPU 129 receives an insert signal INS and a card signal CARD from the IC card via an input port 519.

(9-3) Data reading.

Figure 25:
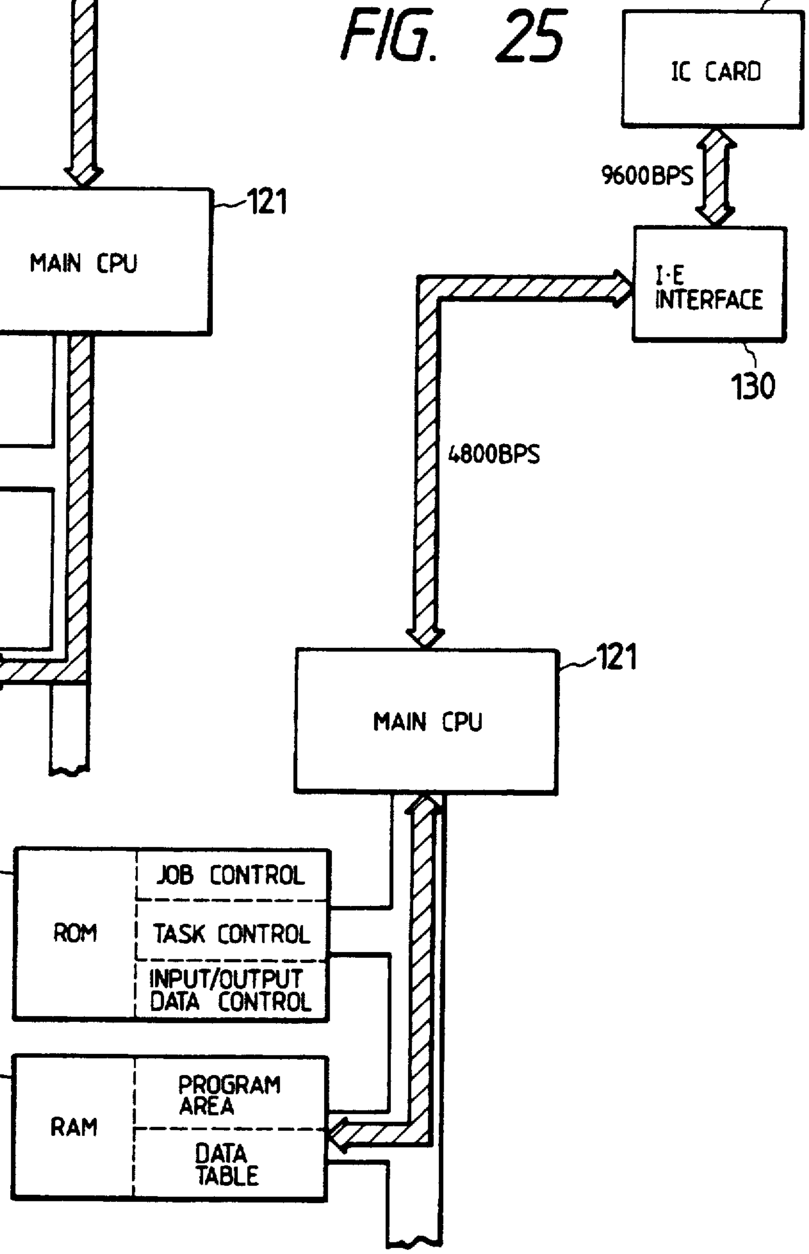

Referring to FIG. 25 employed to illustrate the first embodiment, the flow of data read while the IC card 131 is set in the IC card device. When the IC card 131 is set in the IC card device 22, the base machine 21 detects the setting thereof and starts reading the data at predetermined timing. At this time, the data is transferred from the IC card 131 to the IC card device at a transfer speed of 9,600 BPS (Bits Per Second). That speed is converted into 4,800 BPs in the IC card device 22 so that the data is transfer in mass to the main CPU 121 as serial data. By the mass transfer is meant that the main CPU 121 specializes in exchanging the data with the IC card device 22 by temporarily interrupting the exchange of data with each additional device while stopping controlling copy-taking operation on the part of the base machine 21.

Japanese Patent Application No. 097440/87 entitled "Serial Communication Control Method", filed on Apr. 22, 1987, by the present applicants discloses the details of the mass transfer.

The program of the IC card 131 sent to the main CPU 121 is stored in the RAM 121E. The additional devices in "operating condition" are controlled along the programs thus selected and stored in the ROM 121D after error checking is made by the BCC method.

The programs stored in the ROM 121D include a job control program, a task control program, an input/output control program, etc. The job control program is used to control the order of executing the job of the program stored in the RAM 121E. The task control program is used to form and cancel the task as a minimum unit of job that can independently be done. Further, the input/output data control program is used to transfer the data in the IC card onto the RAM 121E. The IC card 131 can store various kinds of data such as the coordinate data read by the editor pad 132, in addition to the programs for the respective additional devices. The programs for the additional devices are stored in the program storage area provided in the RAM 121E or nonvolatile memory 121F (FIG. 7) for some of them, whereas the various kinds of data are written to the data storage area of the RAM 121E (nonvolatile memory 121F).

The flow of data from the IC card 131 to the copying machine proper has been described above and the data stored in the copying machine proper is also transferred in mass when it is written to the IC card 131.

Since the IC card is used to store programs for the additional devices in the copying machine in this embodiment, various kinds of data can be written by making use of the IC card and consequently copying charges can readily be controlled with an individual or section as a unit. As the basic control program is stored in the copying machine proper, the quantity of data being stored in the IC card is reduced more or less. Further, programs are written from the IC card to the copying machine proper and this is advantageous in that the improvement or alteration of the program can simply be dealt with in comparison with the case where the programs are totally provided in the copying machine proper.

Moreover, since the "usable condition" of each additional device is set via a double step of the actual installation of the copying machine and reference to the data stored in the IC card, the functions of the copying machine can be altered in various ways without detaching the additional devices. The cipher code assigned to each copying machine in this embodiment prevents the unfair use of the copying machine by attempting to upgrade the functions thereof using an IC card intended for use in another machine, so that the control of the copying machine is conducted accurately on a section basis.

(10) Modified embodiment.

In the embodiment above, a description has been given of the case where various additional devices are attached to the common base machine; that is, the IC card is applied to the copying machine wherein the copy-taking operation including exposure, developing and fixing is commonly processed. However, the present invention is not limited to the main process. More specifically, the storage media such as the IC cards are commonly usable among recording apparatuses. The operator who desires to conduct the automatic handling of originals by means of the ADF, for instance, can implement the automatic original feeding by inserting the IC card into the IC card devices of various copying machines, even though they are entirely different in construction, provided the following two conditions are satisfied: namely, the ADF is attachable to the copying machine involved and that the IC card is acceptable thereby.

In addition, the function of mutually utilizing the IC card can be set so that it is commonly usable for both entirely different recording apparatuses such as the copying machine and a printer or the printer and a facsimile. Assuming a copying machine and a facsimile commonly have the function of the ADF and that the operator also has an IC card for use in implementing the function of "automatically feeding originals and taking copies of them using the ADF". The operator is capable of automating the operating of taking the copies of originals by setting the IC card in the copying machine. When no copying machine is at one's elbow or the copying machine is unusable because of trouble, the IC card is set in a facsimile, which automatically feeds originals one after another by means of the ADF and takes copies of the originals by sending the image data read to its recording unit using an image sensor.

The operator can make use of the recording apparatus effectively without worrying about the machine model thereof only by confirming that the IC card is acceptable thereby and that, if necessary, essential additional devices have been installed.

In that case, the necessary data has to be registered in the IC card in order that the additional devices of different machine models can be put for common use therebetween. If the recording apparatus capable of sorting is otherwise restricted by the storage medium such as an IC card, the IC card is usable only between the machine models thus restricted.

(10-1) Outline of copying machine system.

Subsequently, a description will be given of the common use of an IC card for the copying machine in the above-described embodiment and another defined as what is entirely different from the former in view of copying speed and functions.

Figure 54:
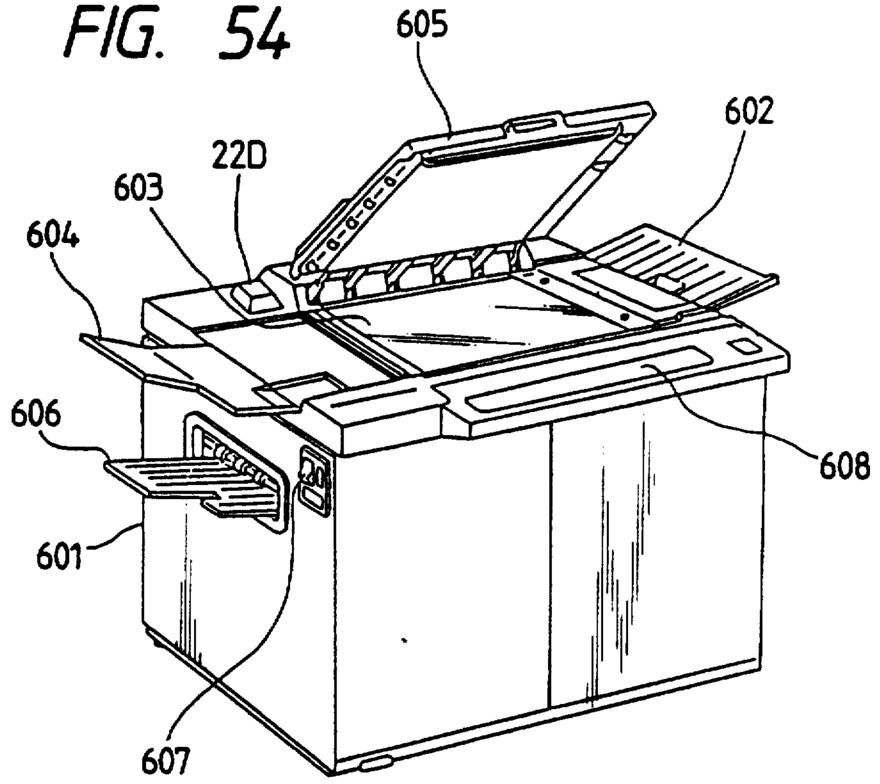
FIG. 54 is a perspective external view of a copying machine M as a medium-speed machine.
Figure 55:
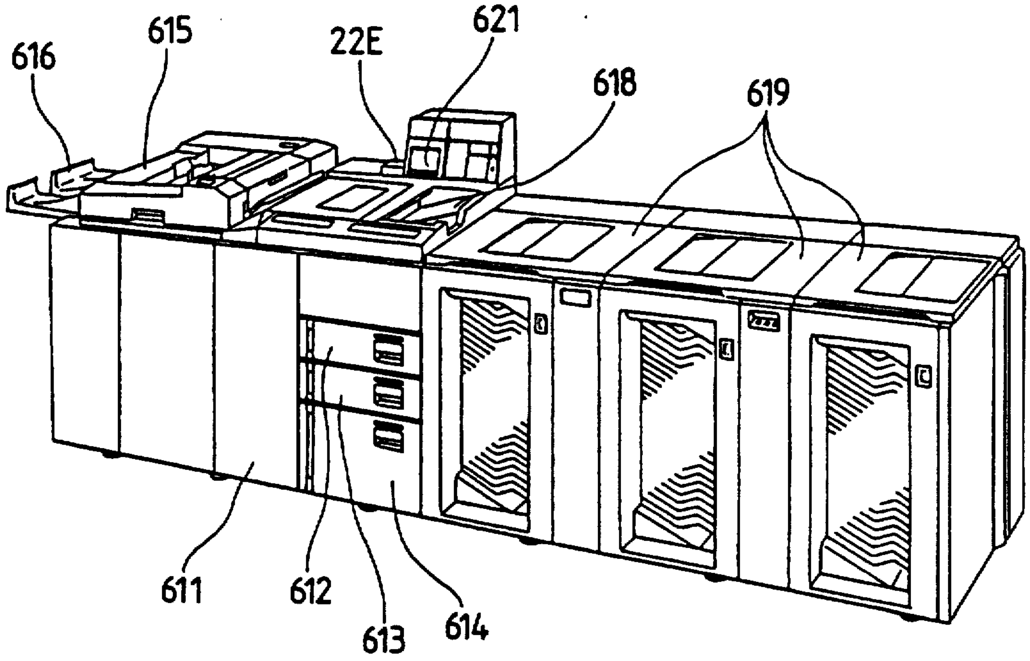
FIG. 55 is a perspective external view of a copying machine M as a high-speed machining.

FIG. 54 is an external view of a copying machine M different from the copying machine (hereinafter referred to as L) in the embodiment. FIG. 55 is an external view of another copying machine H. The copying machine L is designed for users who need only a small number of copies usually, whereas the copying machine H which is installed in a copying room and intended for users who take a large number of copies at a time. The copying machine M is intermediately positioned between both the copying machines L and H.

The copying machine M shown in FIG. 54 has a copying machine proper 601 equipped with two feed trays and one intermediate tray and, like the copying machine L, can take duplex copies. An original is fed by a SADH (semiautomatic original feeder) 602 onto a platen glass plate 603 and automatically discharged on an original discharge tray 604 after its copy is taken. A thick or frail original may be mounted manually on the platen glass plate 603. On the right side of the copying machine proper are arranged a copying paper discharge tray 606 and a power supply switch 604. As the discharge tray 606 is removable, a 10- or 20-bin sorter can be connected to the copying machine proper instead. A console panel 608 for operating the copying machine is arranged on the upper this side of the copying machine proper 601. An IC card device 22D is disposed to the left of the hinge of a platen cover 605.

The copying machine M shown in FIG. 54 is classified into three machine models M1 ~ M3 in view of their functions and selling prices. The specifications of these copying machine M1∼M3 are shown in Table 2c, wherein mark O means additional devices can be mounted, whereas mark x means they cannot.

TABLE 2c

| Function/machine model: | | Copying machine M (medium speed) M1 | M2 | M3 |
|---|---|---|---|---|
| Input device | RDH | x | x | |
| | DADF | x | | |
| | SADH | x | | |
| Output device | 10-bin sorter | x | x | x |
| | 20-bin sorter | x | | |
| | finisher | x | x | |
| Processor | No. of set sheets | 2 digit | 2 digit | 2 digit |
| | Copy density | 5 | 5 | 7 |
| | Magnification/ Contraction | | | |
| | (fixed) | nil | 5 | 7 |
| | (zoom) | nil | nil | zoom |
| | Editing | nil | nil | present |
| | Discharge side | nil | present | present |
| | Cover tray | nil | present | present |
| | HCF | nil | present | present |

RDH is a recycle document handler and an additional device used to take the desired number of copies by circulating originals. The sidcharge side means whether the presence or absence of an additional device having the function of discharging copying paper with its upside down. The cover tray is a tray for accommodating special paper for use as covers.

The copying machine L illustrated in the embodiment can be classified into the following three machine models.

TABLE 3c

| Function/Machine model: | | Copying machine L (low speed) L1 | L2 | L3 |
|---|---|---|---|---|
| Input device | RDH | x | x | x |
| | DADF | x | x | |
| | SADH | x | | |
| Output device | 10-bin sorter | x | | |
| | 20-bin sorter | x | x | |
| | finisher | x | x | x |
| Processor | No. of set sheets | 1 digit | 2 digit | 2 digit |
| | Copy density | 3 | 3 | 5 |
| | Magnification/ Contraction | | | |
| | (fixed) | nil | nil | 5 |
| | (zoom) | nil | nil | zoom |
| | Editing | nil | nil | present |
| | Discharge side | nil | nil | nil |
| | Cover tray | nil | nil | nil |
| | HCF | nil | nil | present |

FIG. 55 shows the copying machine H with its sorter. The copying machine H has a copying machine proper 611 equipped with three kinds of feed trays: feed trays 612∼614 and one intermediate tray (not shown). This copying machine H is different from the copying machines L and M and provided with a photoreceptor belt as a photosensitizer and used to form an electrostatic latent image by exposing the original set by an ADF 615 to flash light. The original fed from the ADF 615 is discharged onto an original discharge tray 616. In the copying machine H, sheets of copying paper used for copy taking operation are discharged onto a discharge tray 618 on the copying machine proper or sorted by a sorter 619. As illustrated, the sorter 619 can couple up to 60 bins with 20 bins as a unit. A console panel 621 for operating this copying machine H is arranged on the side where the discharge tray 618 is placed. The IC card device 22E is placed on the left-hand side of the console panel 621.

TABLE 4c

| Function/Machine model: | | Copying machine H (high speed) H1 | H2 | H3 |
|---|---|---|---|---|
| Input device | RDH | | | |
| | DADF | | | |
| | SADH | | | |
| Output device | 10-bin sorter | x | x | x |
| | 20-bin sorter | | | |
| | finisher | x | | |
| Processor | No. of set sheets | 3 digit | 3 digit | 3 digit |
| | Copy density | 5 | 7 | 7 |
| | Magnification/ Contraction | | | |
| | (fixed) | 5 | 7 | 7 |
| | (zoom) | nil | zoom | zoom |
| | Editing | present | present | present |
| | Discharge side | present | present | present |
| | Cover tray | present | present | present |
| | HCF | nil | nil | nil |

The above-described three kinds of copying machine L, M, H are equipped with IC card devices 22, 22D, 22E accepting the IC card 131. Subsequently, the function off the IC card will be described in reference to the connection of the sorter to the devices.

The sorter 38 that can be connected to the copying machine L is detachably fitted to the upper side of the copying machine as shown in FIGS. 3, 15 and compact in size, the sorter 38 having legs in contact with the floor. On the other hand, the sorter 619 for the copying machine H shown in FIG. 28 is a machine relatively large in size and installed on the floor. The sorter (not shown) for the copying machine M is also a relatively large machine installed on the floor. The sorter for the copying machine M is different in size from the sorter 619 of the copying machine H. However, the specifications of both the sorters correspond to each other in terms of connector forms, the number of signals, timing at which copying paper is accommodated and the method of connecting the sorter to the copying machine proper. In this manner, the sorter of the same floor-mounting type may be integrated as far as electrical and mechanical connections are concerned, so that the sorter can be selected freely for use between copying machines having the same size or roughly the same functions. In other words, the CPU, the harness, the connector and the signal level on the copying machine side are integrally set up, whereby one sorter may be used as what can be fitted to the other copying machine if software including program languages, communication protocols, etc. are integrated.

Accordingly, the sorter 619 equivalent to 20 bins is removed from the copying machine H and connected to the copying machine M, whereas the IC card 131 is set in the IC card device 22D of the copying machine M, so that copying paper sorting becomes possible in the copying machines M1∼M3 without the sorter for special use. Provided the copying machines M1∼M3 are equipped with the sorter for special use, the sorting operation can be conducted with the system configuration originally intended by connecting the sorter to the copying machine proper and setting the IC card 131 in the IC card device 22D of the copying machine M.

With respect to the copying machine L, the 10- or 20-bin sorter 38, 39 is fitted thereto in place of the discharge tray 37 and the IC card 131 is set in the IC card device 22 so as to have the sorting operation conducted with the system configuration originally intended. In this case, the sorter for the copying machine M or H cannot be connected to the copying machine L because the position in which it is connected to the copying machine M or H is different. For the same reason, the sorters 38, 39 for the copying machine L cannot be connected to the copying machine M, H.

The IC card 131 used to have a certain function performed generally stores (i) a command for instructing the copying machine to perform the function (e.g., sorting); data (ii) concerning the combination of the kind of an additional device (e.g., sorter) usable when the function is performed; and a control program (iii) required when an additional device other than what is for special use (e.g., a sorter originally used for a different machine model) is connected to the copying machine proper.

Figure 56:
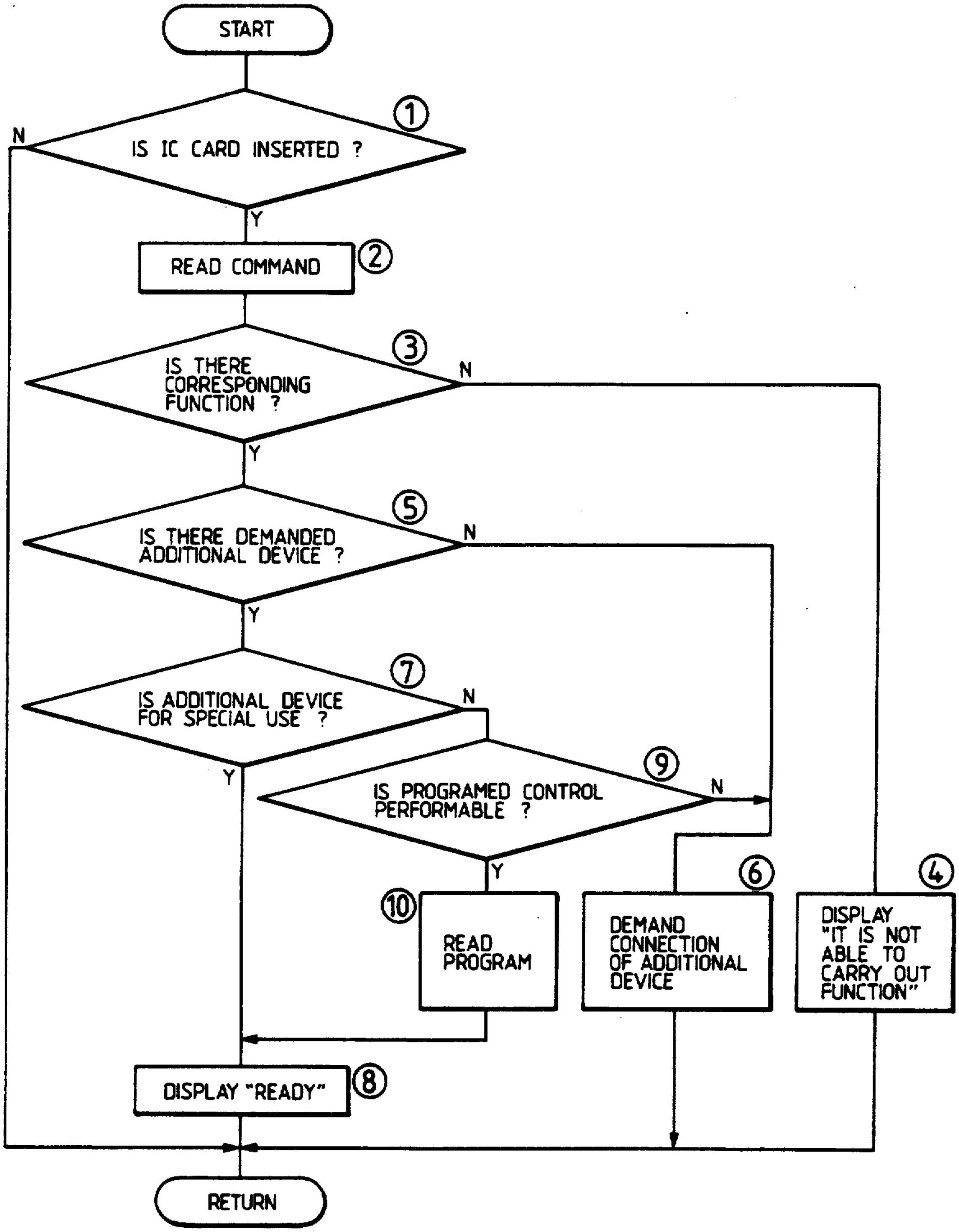
FIG. 56 is a flowchart illustrating the mode of converting copying conditions.

FIG. 56 is a flowchart illustrating the general control of the copying machine when such an IC card is set in the IC card device of the copying machine. When the IC card 131 is set, (Step 1), the copying machine reads the command (Step 2) and determines if the copying machine has the function in line with the demand (Step 3). When the IC card is set in the copying machine L or M despite the fact that the function of RDH is demanded, those copying machines are unable to perform the function, for instance, as shown in Tables 2c to 4c. This is also the case with the lowest-priced copying machine L1 in which the IC card is set when the function of sorting up to 10 bins is demanded. When the function of sorting up to 20 bins is demanded, not only the copying machine L1 but also the copying machine L2 is unable to perform the function. In this case, the copying machine displays an unexecutional display on its console panel (Step 4). Subsequently, the operator realizes that the copying machine is not eligible and inserts the IC card in another copying machine, i.e., a copying machine generally higher in grade.

Even if the copying machine potentially has the function involved, the additional device for fulfilling the function may not be installed. In such a case (Step 5, N), a demand for the connection of the additional device is made on the console panel (Step 6). When the connection of the 10 bin sorter is needed, for instance, "Connect Up 10-bin Sorter" is displayed on the console panel. The operator at this time either connects the additional device which falls under the category or resets the IC card in a copying machine equipped with the device.

When the additional device required to perform the function involved has been set or the setting thereof has been completed, the copying machine determines whether or not the additional device is for special use (Step 7). By the additional device for special use means the additional device as connected to the copying machine proper is capable of performing the function without trouble. When the additional device for special use is set (Y), a ready display reading "Start Copying" is displayed on the console panel of the copying machine.

When an additional device other than what is for special use is set (step 7, N), the copying machine determines whether the function of the additional device is controllable by the program (Step 9). Like the case of the control of conveying timing of copying paper at the time of sorting as described above, a decision is made on whether or not the additional device is controllable by means of the delay process by the control of the CPU. The decision on whether the programmed control is possible can be made by referring to the data written to the IC card 131 to that effect or the data written to the ROM or nonvolatile memory of the copying machine.

As a result, if the programmed control is unable to operate the additional device properly (N) even when an additional device other than what is for special used, a demand for the connection of the additional device is made again against the console panel (Step 6) The operator therefore tries to attach an additional device of another type to the corresponding copying machine or to carry out copy-taking operation again by mounting the IC card 131 in a copying machine of a different type.

If the programmed control is able to operate the additional device even when an additional device other than what is for special use is connected (Step 9, Y), on the other hand, the program is read from the IC card 131. However, the program may have already been stored in the copy machine proper, depending on the contents thereof and, in this case, the reading of the program from the IC card 131 can be omitted. When the program is read from the IC card 131 or copying machine proper and stored in the designated storage area, the copying machine displays "Start Copying" on the console panel (Step 8).

If the form of the connector connected to the copying machine proper, the number of signals, the voltage level, the method of detaching the device, etc. for use in the additional devices having the same function are coordinated, simultaneously with the integration of software including program languages and communication protocols, most of the additional devices become mutually utilizable, irrespective of the manufactures. When the operator is to use the IC card and the additional device for the copying machine which he has not expected to use then, it becomes possible for him to operate the copying machine with the functions desired. The use of the additional device such as a sorter provided for special use in the copying machine needless to say tends to make the copying paper processing rate higher and to have the other effective functions demonstrated in the copying machine. However, a copying machine not being used can be operated with additional devices not in use now. In this case, the operator need not have detailed knowledge about the copying machine and additional devices. The IC card 131 with copying conditions stored therein, including the copy density, the number of sheets of copying paper, etc. permits the operator only to press the start button in order to take copies desired.

As set forth above, the additional devices independently developed for three kinds of conventional copying machines L, M, H can be placed for compatible use without obstacles deriving from the difference in machine model among them. Moreover, by coordinating the forms of connectors and making use of the programs stored in IC cards, the additional devices of copying machines developed by a company become applicable to those manufactured by another company. In this way, the effective applications of copying machines and additional devices can be increased by leaps and bounds.

Needless to say, IC cards for use in copying machines of a company A can be set in IC card devices of facsimiles of a company B to take copies or edit image data freely. Additional devices may be exchanged between printers and other recording apparatus or transferred to and from the couterparts. If the connecting parts of copying machines produced by various manufactures are standardized, they can mutually be adapted to use, irrespective of the copying machines, facsimiles or other apparatus. From the standpoint of the users of recording apparatus, they will be able to carried out business processing as they desire without entirely bothering about selecting the machine model for use. It therefore becomes possible to fabricate image processing system excellent in both economy and efficiency.

Free choice of recording apparatus for the purpose of image processing certainly adds convenience. However, if variations in copy density and contraction/magnification occur, depending on the machine used, operators will be unable to obtain images as they desire and will have to rely upon a specific copying machine or recording apparatus. In the modified example of the copying machine, detailed desirous copying conditions are registered in the IC card to prevent such conditions such as the copy density from varying even though a different machine model is employed. Table 5 below shows an example of data stored in the memory area of the IC card.

TABLE 5c

| |
|---|
| Mode data converting program area: |
| Machine model identifying.reading.writing identifying program; |
| Mode data converting program at the time of reading; |
| Mode data converting table at the time of reading; |
| Mode data converting program at the time of writing; |
| Mode data converting table at the time of writing; |
| Mode data storage area: |
| Mode data area requiring conversion: |
| Copy density; |
| Set number of sheets; |
| Editing function; |
| . . . |
| Mode data area requiring no conversion: |
| Presence or absence of continuous page copying; |
| Presence or absence of AE; |
| . . . |
| Additional program data area: |
| Copying machine control program data area: |
| Zoom function program data; |
| Duplex copy program data; |
| . . . |
| Special copying machine control program data area: |
| Self-diagnosis program data; |
| Customer program data. |

The contents of each data written to the mode data storage area in Table 5 are protected in each copying machine, whereby the uniformity of images obtained between the copying machines is secured. The presence or absence of AE in the data, however, indicates the presence or absence of Auto Exposure, i.e., an automatic exposure mechanism when an original is exposed. The original set in a copying machine equipped with the AE mechanism is developed by another also equipped with the AE mechanism to reproduce an image. The most favorable image reproduction thus becomes possible.

As will be noticed in the previous Tables 2c~4c, the copying conditions have not necessarily been integrated into standards applicable to all copying machines. Each of the copying conditions applicable to copying machines tends to become detailed in general as the grade of the copying machine is set higher. In the "copy density" stored in the mode data storage area of Table 5, for instance, the density is made adjustable in 5 stages in the copying machines L2, L3, M1, M2, H1. The density is adjustable in 3 stages in the copying machine L1, whereas it is adjustable in 7 stages in the copying machine M3, H2, H3. Accordingly, even though the copy density is specified as "3" in a copying machine, the meaning of the display differs with the copying machine for use because it is unclear whether that display is made in the copying machine offering the density adjustment in 3, 5 or 7 stages.

In this modified embodiment of the system, the operation of converting data is carried out in both cases where the data is written to the IC card and where the data in the copying machine with the IC card set, so that copies are taken under the copying conditions desired in each copying machine.

Figure 57:
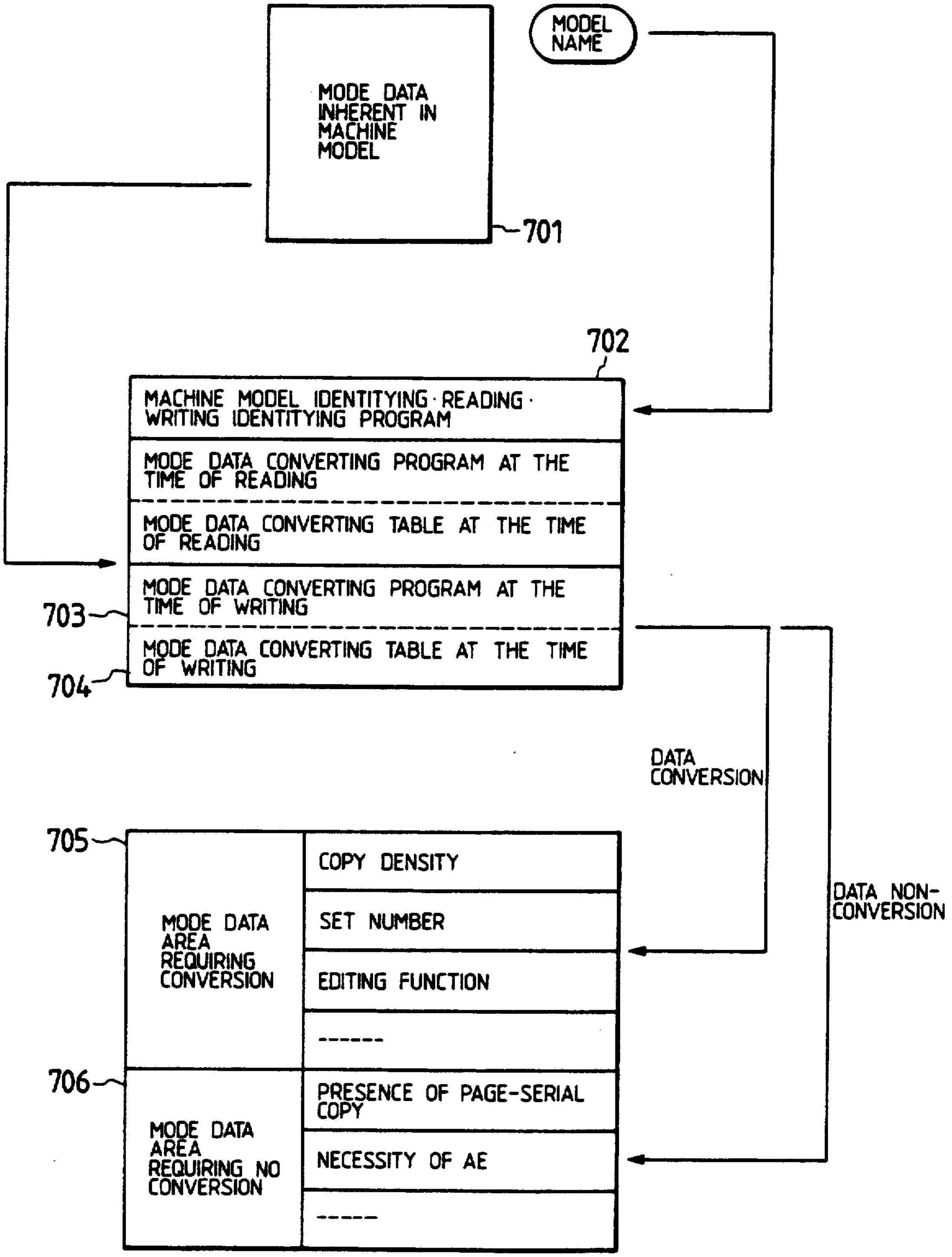
FIG. 57 is a diagram illustrating the operation of converting mode data in a model into IC cards in order to store the data.

FIG. 57 is a diagram illustrating data writing to the IC card in that case. Mode date 701 as copying conditions is independently set on a copying machine basis. Of the mode date, the machine model is recognized by the "machine model identifying.reading.writing identifying program" 702 shown in Table 5. On the other hand, the "mode data converting program at the time of writing" 703 is employed for the other mode data and the converting operation is conducted by reference to the "mode converting table at the time of writing" 704. Consequently, the data subjected to conversion is written to the "mode data area requiring conversion" 705 of the IC card 131 shown in Table 5c and the data not subjected to conversion is written to the "mode data area requiring no conversion" 706.

Figure 58:
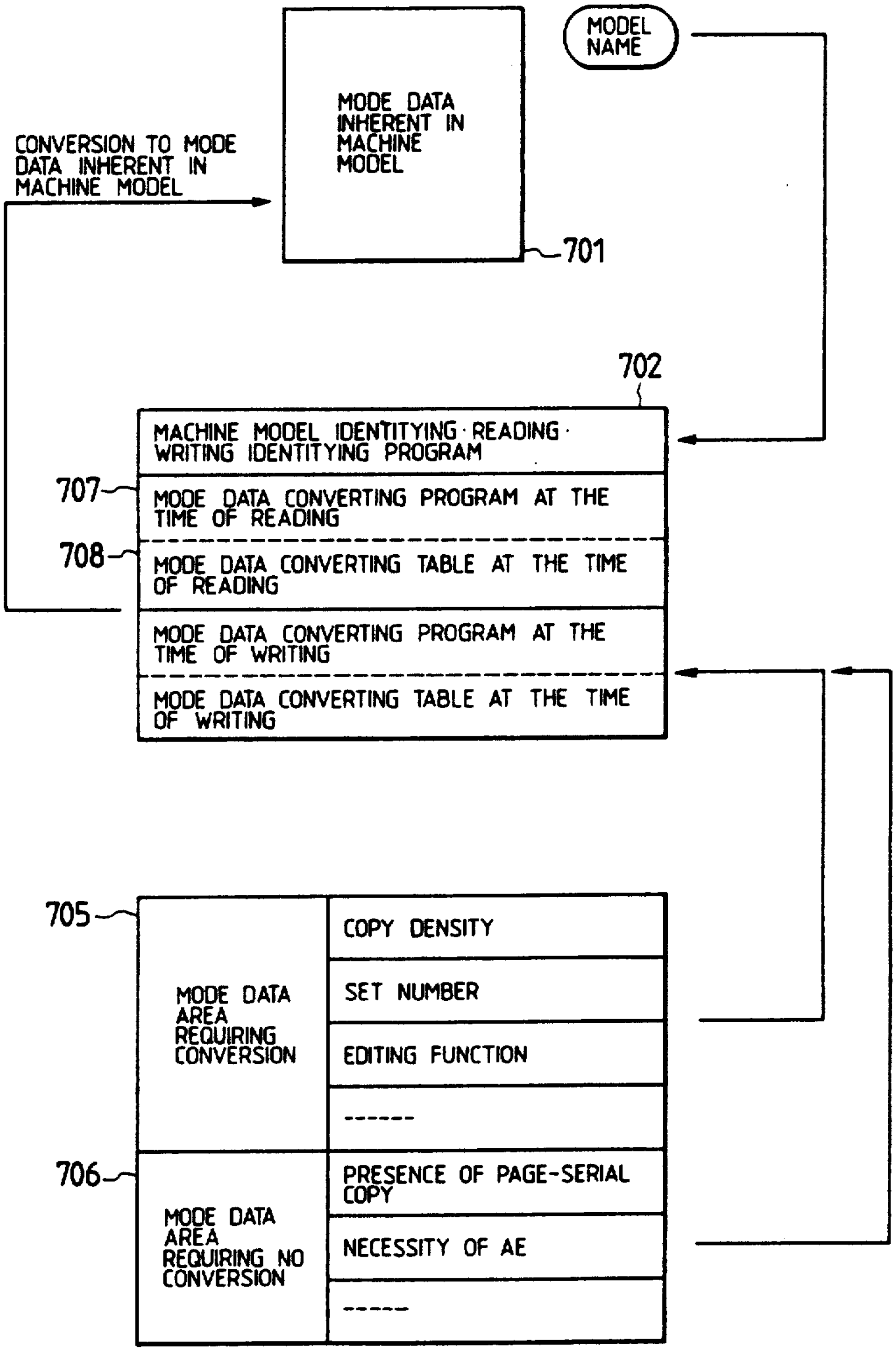
FIG. 58 is a diagram illustrating the operation of converting the mode data stored in IC cards to mode data for a copying machine for use.

FIG. 58 is a diagram illustrating the operation of converting the mode data stored in IC card to mode data for a copying machine for use. The mode data written to the "mode data area requiring conversion" 705 and the "mode data area requiring no conversion" 706 of the IC card 131 is converted by the "mode data converting program at the time of reading" 707 by reference to the "mode data converting table at the time of reading" 708. At this time, the machine model of the copying machine on the part receiving the data converted is recognized by the "machine model identifying.reading.writing identifying program" 702 and referred to at the time the data conversion is made. The operation of converting to the mode data on the discreate machine model for use then is conducted. The mode data 709 thus converted is supplied to the interface board of the IC card device 22 and sent to the control unit in the copying machine proper where it is used to set the copying conditions of the copying machine involved.

In the above-described embodiment, the data on whether each additional device is put in a "usable" state is written to the IC card. However, mechanical or electronic keys may be used to control the additional devices. Although the programs are stored in the IC card in the embodiment and modified one, any portable external storage media are usable, whereas storage media for storing those programs may be disposed in the recording apparatus body such as the copying machine proper. In this case, any storage media being not portable may be employed. There are portable storage media, other than IC cards, such as CD.ROMs, memory cards, magnetic tapes, magnetic disks, optical disks and magnetic bubble devices. However, the portable storage media for use are needless to say not limited to those enumerated.

As set forth above, the additional devices desired within a range of set programs are attached to the recording apparatus in this embodiment so as to freely transform the recording apparatus. Accordingly, the recording apparatus most suitable for each user can readily be fabricated. When the requirements on the part of user are altered, new requirements can be met satisfactorily by adding new additional devices. Accordingly, efficient copy-taking operation can always be implemented. As it is unnecessary to replace the recording apparatus, the economical use thereof becomes possible. Moreover, parts for common use such as the base machines 21 and various additional devices are mass-producible, whereby the recording apparatus itself can be manufactured less costly. Further, the advantage of the recording apparatus in this embodiment is that it contributes to the effective utilization of resources because the additional device which has become unserviceable may be usable in another recording apparatus.

The present invention will contribute to the effect of helping the progress of placing additional devices and apparatus proper of various manufacturers for common use, whereby the standardization of recording apparatus, to say nothing of cost reduction, becomes feasible.

What is claimed is:

1. A recording apparatus for performing operational functions that are inherent to said recording apparatus as well as operational functions that are extrinsic to said recording apparatus comprising:

reading means for reading additional control data from portable storage means, said additional control data representing said extrinsic operational functions;

an additional control data storage unit for storing said additional control data read by said reading means;

a basic control data storage unit for storing basic control data representing said inherent operational functions; and a recording apparatus control unit for controlling said recording apparatus by reading said basic control data stored in said basic control data storage unit and said additional control data stored in said additional control data storage unit and by instructing said recording apparatus to perform said extrinsic operational functions represented by said additional control data and to perform said inherent operational functions represented by said basic control data other than inherent operational functions represented by basic control data that is substantially the same as said additional control data.

2. The recording apparatus as claimed in claim 1, wherein identifying data for describing the extrinsic operational functions represented by said additional control data is displayed on a surface of said portable storage means.

3. The recording apparatus as claimed in claim 1, wherein said portable storage means comprises an IC card.

4. The recording apparatus as claimed in claim 1, wherein said reading means comprises a reader and writer for reading and writing predetermined data from said recording apparatus to said portable storage means.

5. The recording apparatus as claimed in claim 1, wherein said additional control data represents extrinsic operational functions associated with recording functions of said recording apparatus.

6. The recording apparatus as claimed in claim 5, wherein said additional control data represents extrinsic operational functions associated with recording functions other than those of maintaining and inspecting said recording apparatus.

7. The recording apparatus as claimed in claim 1, wherein said recording apparatus comprises an image processor including a copying machine, a facsimile, and a printer.

8. The recording apparatus as claimed in claim 7, wherein said recording apparatus comprises an electrostatic copying machine.

9. A recording apparatus for performing operational functions comprising:

a memory unit for storing recording function data representing operational functions;

reading means for reading control data from portable storage means, said control data representing operational functions;

comparing means for comparing said control data read from said reading means with said recording function data stored in said memory unit and for determining which of said control data in substantially the same as said recording function data; and function performing control means for instructing said recording apparatus to perform the operational functions represented by said control data determined by said comparing means to be substantially the same as said recording function data.

10. The recording apparatus as claimed in claim 9, wherein said control data read by said reading means includes said recording function data and additional control data, said additional control data representing operational functions other than those represented by said recording function data, and wherein said function performing control means instructs said recording apparatus to perform said operational functions represented by said additional control data.

11. The recording apparatus as claimed in claim 9, wherein said portable storage means comprises an IC card, and wherein identifying data for describing said operational functions represented by said control data is displayed on a surface of said portable storage means.

12. The recording apparatus as claimed in claim 9, wherein said control data represents operational functions associated with recording functions.

13. The recording apparatus as claimed in claim 9, wherein said control data represents operation functions associated with recording functions other than those of maintaining and inspecting said recording apparatus.

14. The recording apparatus as claimed in claim 11, wherein said reading means comprises a reader and writer for reading and writing predetermined data from said recording apparatus to said portable storage means.

15. The recording apparatus as claimed in claim 11, wherein said reading means is capable of reading IC cards.

16. The recording apparatus as claimed in claim 11, wherein said reading means is capable of reading magnetic stripe portions of said IC card.

17. The recording apparatus as claimed in claim 9, wherein said reading apparatus comprises an electrostatic copying machine.

18. The recording apparatus as claimed in claim 9, wherein said reading apparatus comprises an image processor including a copying machine, a facsimile, and a printer.

* * * * *